US008370243B1

(12) United States Patent
Cernyar

(10) Patent No.: US 8,370,243 B1
(45) Date of Patent: Feb. 5, 2013

(54) FINANCIAL PLANNER AND PORTFOLIO SIMULATOR

(75) Inventor: Eric William Cernyar, Cripple Creek, CO (US)

(73) Assignee: Prospercuity, LLC, Cripple Creek, CO (US)

(*) Notice: Subject to any disclaimer, the term of this patent is extended or adjusted under 35 U.S.C. 154(b) by 620 days.

(21) Appl. No.: 12/547,175

(22) Filed: Aug. 25, 2009

Related U.S. Application Data

(60) Provisional application No. 61/093,432, filed on Sep. 1, 2008, provisional application No. 61/233,413, filed on Aug. 12, 2009, provisional application No. 61/233,476, filed on Aug. 12, 2009.

(51) Int. Cl.
*G06Q 40/00* (2012.01)
(52) U.S. Cl. ........................... 705/36 R; 705/35
(58) Field of Classification Search .............. 705/37, 705/36 R
See application file for complete search history.

(56) References Cited

U.S. PATENT DOCUMENTS

| | | | |
|---|---|---|---|
| 5,918,217 A | 6/1999 | Maggioncalda et al. | |
| 6,012,044 A | 1/2000 | Maggioncalda et al. | |
| 6,021,397 A | 2/2000 | Jones et al. | |
| 6,125,355 A | 9/2000 | Bekaert et al. | |
| 6,292,787 B1 | 9/2001 | Scott et al. | |
| 7,016,870 B1 | 3/2006 | Jones et al. | |
| 7,062,458 B2 | 6/2006 | Maggioncalda et al. | |
| 7,249,080 B1 * | 7/2007 | Hoffman et al. ........... 705/36 R |
| 7,249,081 B2 | 7/2007 | Shearer et al. | |
| 7,321,871 B2 | 1/2008 | Scott et al. | |

OTHER PUBLICATIONS

Moshe A. Milevsky and Chris Robinson, "A Sustainable Spending Rate without Simulation," Financial Analysis Journal, Nov./Dec. 2005, pp. 89-100, vol. 61, No. 6, CFA Institute.

Elroy Dimson, Paul Marsh, and Mike Staunton, "Global Evidence on the Equity Risk Premium," Sep. 2002, pp. 1-17.
James M. Poterba and Lawrence H. Summers, "Mean Reversion in Stock Prices: Evidence and Implications," NBER Working Paper No. 2343, Aug. 1987, pp. 1-48.
MCRetire 1.2 User Manual, Copyright 2000-2007, pp. 1-33, Efficient Solutions, Inc.
MCRetire Appendices, Copyright 2000-2007, pp. 1-16, Efficient Solutions, Inc.
Dean Fikar, "Enhanced Monte Carlo Simulation," (Date Uncertain), pp. 1-3.
Robert Serfling, "Efficient and Robust Fitting of Lognormal Distributions," North American Actuarial Journal, Oct. 2002, pp. 95-116, vol. 6, No. 4.
Moshe A. Milevsky and Anna Abaimova, "Instruction Manual for the Retirement Probability Analyzer," Jul. 26, 2004, pp. 1-39, The IFID Centre.
Moshe A. Milevsky, "A Gentle Introduction to the Calculus of Retirement Income: What is Your Risk Quotient?," Nov. 25, 2005, pp. 1-24.
Robert D. Arnott and Peter L. Bernstein, "What Risk Premium Is 'Normal'?" Financial Analysts Journal, Mar./Apr. 2002, pp. 64-85, vol. 58, No. 2.

(Continued)

*Primary Examiner* — James Vezeris
(74) *Attorney, Agent, or Firm* — Eric W. Cernyar, P.C.

(57) ABSTRACT

A financial planner and portfolio simulation system projects the simulated cumulative risks and rewards of one or more mixed portfolios in relation to the expected risk and reward of a minimum-risk or relatively risk-free baseline portfolio. As a user enters portfolio input parameters, the system immediately computes, displays, and graphs an inflation-adjusted retirement budget that a baseline portfolio fully invested in minimum-risk assets would be able to sustain. The system also generates—through simulation—a probability distribution of average retirement budgets that the mixed portfolio(s) would be projected to sustain, and graphs various percentile-ranked samples from that distribution on the same computer-generated plot that displays the sustainable retirement budget supported by a baseline (minimum risk) portfolio. The statistical and graphical comparisons of the mixed portfolio(s) to the baseline portfolio assist investors in choosing mixed portfolios best suited to their retirement goals and risk tolerance.

20 Claims, 35 Drawing Sheets

OTHER PUBLICATIONS

Jingxian Wu, Neelesh Mehta, and Jin Zhang, "A Flexible Lognormal Sum Approximation Method," Mitsubishi Research Labs., Nov. 2005, pp. 1-7.
Neelesh Mehta, Andreas Molisch, Jingxian Wu, and Jin Zhang, "Approximating the Sum of Correlated Lognormal or Lognormal-Rice Random Variables," Mitsubishi Research Labs., Jun. 2006, pp. 1-8.
Peter Ponzo, "Average v. Annualized Gains," (Date Unknown), pp. 1-6.
Peter Ponzo, "SWR mods," (Date Unknown), pp. 1-2.
Peter Ponzo, "The Rebalancing Bonus," (Date Unknown), pp. 1-4.
Peter Ponzo, "The Rebalancing Bonus: Part II," (Date Unknown), pp. 1-5.
Peter Ponzo, "Distributions . . . continuing from Safe Withdrawal Rates," (Date Unknown), pp. 1-10.
Peter Ponzo, "Distributions: Part II," (Date Unknown), pp. 1-6.
Peter Ponzo, "Distributions, Part III," (Date Unknown), pp. 1-9.
John P. Greaney, "Using Treasury Inflation Protected Securities (TIPS) to increase your safe withdrawal rate," Aug. 1, 2000, pp. 1-4.
John P. Greaney, "'2002 Edition' Safe Withdrawal Calculator Download Free Software," Dec. 9, 2002, pp. 1-8.
Rob Bennett, "Retirement Calculator Smashes Safe Withdrawal Rate Myths," Apr. 28, 2007, pp. 1-3.
Rob Bennett, "About Our Unique Retirement Planning Calculator," Jul. 8, 2007, pp. 1-4.
"RetireNow Software and User Manual," Aug. 20, 2001, pp. 1-131.
David B. Loeper, "Modern Portfolio Reality (MPR): The Failures of Modern Portfolio Theory," Dec. 30, 2000, pp. 1-6.
David B. Loeper, "Are You Modeling What You Intended?: Building Capital Market Assumptions for Monte Carlo Simulation," Aug. 15, 2003, pp. 1-16.
David B. Loeper, "Understanding Monte Carlo Simulation," Feb. 23, 2005, pp. 1-15.
"Wealthcare Profile," Apr. 17, 2009, pp. 1-25.
John J. Spitzer, Jeffrey C. Strieter, and Sandeep Singh, "Guidelines for Withdrawal Rates and Portfolio Safety During Retirement," Journal of Financial Planning, Oct. 2007, pp. 1-11.
"Retirement Lifestyle Plan," Sep. 17, 2008, pp. 1-187, Money Guide Pro.
Karla Curtis and Eric Harrell, "MoneyGuidePro (MGP) Response to Wall Street Journal Article on Monte Carlo Simulations," 2009, pp. 1-17.
"NaviPlan Comparative Analysis," Jul. 22, 2008, pp. 1-40.
"Silver Financial Planner," 2001, pp. 1-42, Money Tree Software, Ltd.
Mark Snodgrass, "Introduction to Monte Carlo: Probability Based Modeling Concepts," (Date Unknown), pp. 1-29, Money Tree Software, Ltd.
"Monte Carlo Explained," (Date Unknown), p. 1.
Mark Snodgrass, "Dynamic Behavioral Analysis from Money Tree Software," Jan. 9, 2007, pp. 1-2.
"When-if?," (Date Unknown), pp. 1-5, Money Tree Software, Ltd.
"Withdrawal Methods: From Bogleheads," (Date Uncertain), pp. 1-5.
"Variable Withdrawals in Retirement," (Date Uncertain), pp. 1-11.
Jim Otar, Otar Retirement Calculator (OTR)—2006 Final Edition: Strategic Asset Allocation—User's Guide, 2006, pp. 1-84.

* cited by examiner

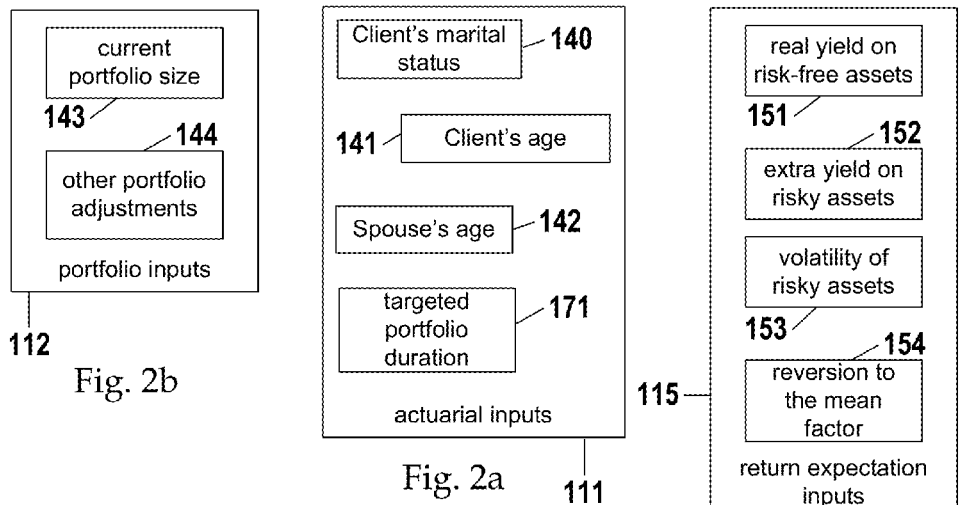
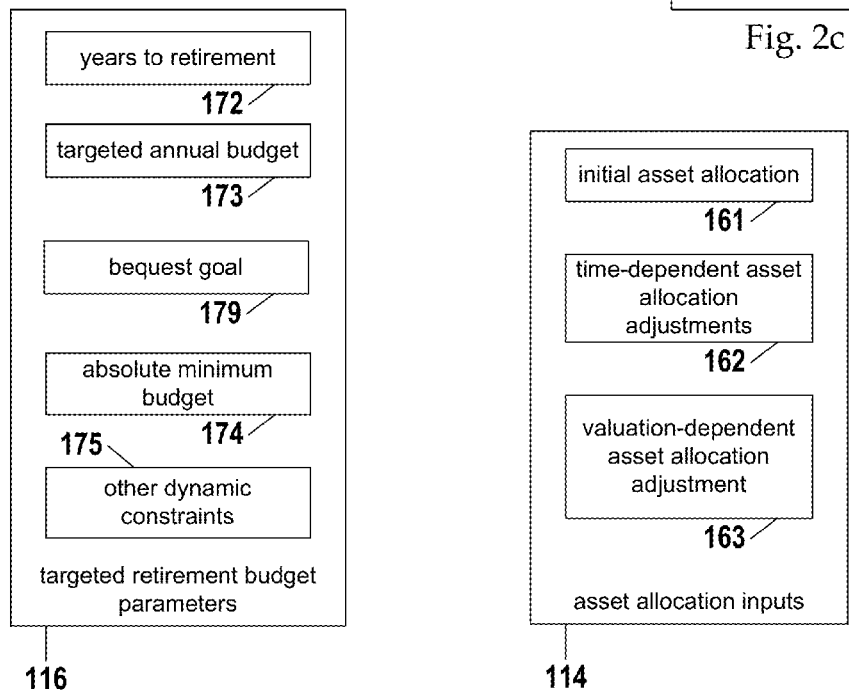
Fig. 2b
Fig. 2a
Fig. 2c
Fig. 2e
Fig. 2d

| Your Life Status | | | Your Savings Goals | |
|---|---|---|---|---|
| Married man | | | Current savings: | $ 100,000 |
| Your age: | 35 | Spouse age: 35 | Add $/yr until retirement: | $ 20,000 |
| Savings should last this many yrs: | 50 | | Asset Allocation | |
| | | | Click to test a range of asset allocations | |
| There is a 62% chance that you or your spouse will live at least 50 more yrs | | | Initial % AA in stocks | 70% |
| Social Security | | | Combined expected initial return, with rebalancing bonus: | *3.11%* |
| Years until Social Security: | 30 | | Decrease AA by this %/yr | 0.0% |
| Expected Soc. Sec. benefits: | $ 20,000 | | Buy low/sell high: increase AA this % for every 1% market drop | 0.1% |

Additional Portfolio Inputs

| | Description | Amount | Yrs 'till event |
|---|---|---|---|
| | Anticipated Inheritance | $ 250,000 | 25 |
| | PV = $152,383 | | |
| | Anticiapted college expenses | $ (20,000) | 10 |
| | PV = -$65,628 | | |
| 550 | Reverse Mortgage | $ 10,000 | 40 |
| | PV = $41,495 | | |
| | | | |
| | PV = $ | | |
| | | | |
| | PV = $ | | |

| Your Return Expectations | | | Reserved |
|---|---|---|---|
| Real return on TIPS: | 2.0% | ▲▼ | *for specifying additional inputs when simulating returns with normal or lognormal distributions* |
| Extra expected return on stocks: | 1.0% | ▲▼ | |

| Retirement Budget Goals | | Retirement Budget Constraints | | |
|---|---|---|---|---|
| Retire & start draws in this many yrs: | 20 ▲▼ | Absolute minimum retirement budget: | $ 40,000 | |
| Targeted annual retirement budget: | $ 50,000 | Max bear market budget: | 100% | ▲▼ |
| Leave this much for your kids/heirs: | $ - | Min bull market budget: | 100% | ▲▼ |

Reserved and Outputs?  ☑ Check if yes

| Type | # of Years | Increase/Decrease by real % per year |
|---|---|---|
| Lump Sum ▲ / Annually for n years / Until both H and W die ▽ | 1 | |
| Lump Sum ▲ / Annually for n years / Until both H and W die ▽ | 4 ▲▼ | 2.0% ▲▼ |
| Lump Sum ▲ / Annually for n years / Until both H and W die ▽ | 10 | 0.0% |
| Lump Sum ▲ / Annually for n years / Until both H and W die ▽ | 1 | |
| Lump Sum ▲ / Annually for n years / Until both H and W die ▽ | 1 | |

| Retirement Feasibility Estimates | |
|---|---|
| $ 48,523 | Est. retirement budget a 100%-TIPS portfolio would support |
| $ 56,368 | Est. median budget a 70%-stock portfolio would support |
| $ 55,503 | Est. median budget a 100%-stock portfolio would support |

Your Simulation Model

Sample past S&P 500 return series ▼

Run Simulation
View progress on status bar

Run 5,000 iterations ▼

PV of infl-adj longevity annuity: Amt=see manual/yr; Start=50 yrs;
Joint Life w/ no death benefit=$45,654
☐ Buy Annuity?

Enter expenses and temporary supplements to your retirement draw as negatives. These will be added to your targeted and absolute minimum draws for those years.

Any expenses or portfolio additions are assumed to be in today's $'s, and if periodic, to grow or shrink in real terms by the amt you enter in col. J Life expectancies:
Husband: 45 more yrs
Wife: 49 more yrs
Husband and Wife: 39 more years
Husband or Wife: 53 more years

Your Life Status

Married man

Your age: 50    Spouse age: 50

Savings should last this many yrs: 50

[ There is a 5% chance that you or your spouse will live at least 48 more yrs ]

Social Security

Years until Social Security: 17

Expected Soc. Sec. benefits: $ 18,000

Your Savings Goals

Current savings: $ 1,100,000

Add $/yr until retirement: $ 20,000

Asset Allocation

Click to test a range of asset allocations

Initial % AA in stocks: 60%

Combined expected initial return, with rebalancing bonus: 2.92%

Decrease AA by this %/yr: 0.0%

Buy low/sell high: increase AA this % for every 1% market drop: 0.1%

Additional Portfolio Inputs

Sustainable Retirement Expenditures a 100%-TIPS Retirement Portfolio Would Support (in real $)

Probability H or W Still Living

615

612

610

Years From Now

| Your Return Expectations | | Add'l Return Model Parameters | |
|---|---|---|---|
| Real return on TIPS: | 2.0% | Annual std dev of stock returns: | 16.3% |
| Extra expected return on stocks: | 1.0% | Expected reversion-to-the-mean time (yrs): | 25 |

| Retirement Budget Goals | | Retirement Budget Constraints | |
|---|---|---|---|
| Retire & start draws in this many yrs: | 5 | Absolute minimum retirement budget: | $ 48,000 |
| Targeted annual retirement budget: | $ 60,000 | Max bear market budget: | 100% |
| Leave this much for your kids/heirs: | $500,000 | Min bull market budget: | 100% |

Reserved and Outputs?  ☐ Check If Yes

Projected Size (in real $) of a 100%-TIPS Retirement Portfolio — 625

620  Years From Now

Fig. 6a-2    600

| Retirement Feasibility Estimates | |
|---|---|
| $ 48,631 | Est. retirement budget a 100%-TIPS portfolio would support |
| $ 60,145 | Est. median budget a 60%-stock portfolio would support |
| $ 60,282 | Est. median budget a 100%-stock portfolio would support |

Your Simulation Model

Double lognormal return distribution ▼

Run Simulation
View progress on status bar

Run 5,000 iterations ▼

| Simulation Results: | |
|---|---|
| Last Run: 5.4% | Cumulative shortfall risk |
| Last Run: 96.1% | Prob. that diversified portfolio will support a larger retirement budget than a 100%-TIPS portfolio |
| Last Run: $60,384 | Expected average annual retirement budget |
| Last Run: $885,802 | "Average" final estate size |

Your Life Status 641

140
- 141 — Married woman
- Your age: 50
- 142 — Spouse age: 50
- Savings should last this many yrs: 50
- 171 — There is a 3% chance that you or your spouse will live at least 50 more yrs

Social Security

- 653 — Years until Social Security: 17
- 654
- Expected Soc. Sec. benefits: $ 18,000

Your Savings Goals 642

- Current savings: $ 1,100,000 — 143
- Add $/yr until retirement: $ 20,000 — 651

Asset Allocation 649

Click to test a range of asset allocations

- Initial % AA in stocks: 60% — 161
- 655 — *Combined expected initial return, with rebalancing bonus:* 2.99%
- Decrease AA by this %/yr: 0.0% — 162
- *Buy low/sell high: increase AA this % for every 1% market drop*: 0.1% — 165

Fig. 6b

Your Return Expectations — 644

- 151 — Real return on TIPS: 2.0%
- 152 — Extra expected return on stocks: 1.0%

Add'l Return Model Parameters — 647

- Annual std dev of stock 153 — returns: 16.3%
- 154 — Expected reversion-to-the-mean time (yrs): 25

Retirement Budget Goals — 645

- Retire & start draws in 172 — this many yrs: 5
- 173 — Targeted annual retirement budget: $ 60,000
- Leave this much for your kids/heirs: $500,000 — 179

Retirement Budget Constraints — 648

- Absolute minimum retirement budget: $ 48,000 — 174
- 178 — Max bear market budget: 100%
  as % of the est. median budget your depleted, stay-the-course portfolio would subsequently support
- 176 — Min bull market budget: 100%
  as % of the budget your fattened portfolio, if converted to TIPS, would subsequently support

Fig. 6c

646
| Retirement Feasibility Estimates | |
|---|---|
| $ 48,631 | Est. retirement budget a 100%-TIPS portfolio would support — 181 |
| $ 60,145 | Est. median budget a 60%-stock portfolio would support — 183 |
| $ 60,282 | Est. median budget a 100%-stock portfolio would support — 184 |
Fig. 6d
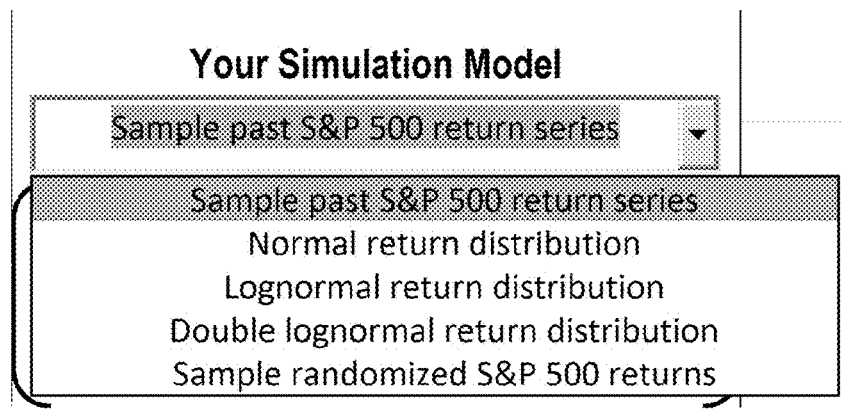
Fig. 6e
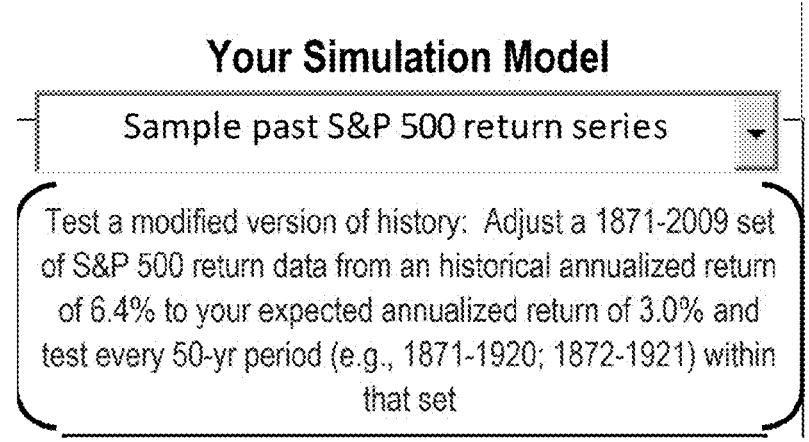
Fig. 6f

Your Simulation Model

| Normal return distribution ▼ |

With this option, TIP$TER will simulate the stock portion of your portfolio by randomly sampling a normal distribution that has a geometric mean return of 3.0% and a standard deviation of 19.7%

Fig. 6g

Your Simulation Model

| Lognormal return distribution ▼ |

With this option, TIP$TER will simulate the stock portion of your portfolio by randomly sampling a lognormal distribution having a geometric mean return of 3.0% and a standard deviation of 19.7%

Fig. 6h

Your Simulation Model

Double lognormal return distribution

With this option, TIP$TER will simulate the stock portion of your portfolio by randomly sampling a 'double lognormal' centered at 3.0% with a standard deviation randomly selected from another distribution centered at 16.3% and with a SD of 7.3%

Fig. 6i

Your Simulation Model

Sample randomized S&P 500 returns

Randomly sample returns from the 1871-2009 set of S&P 500 returns. This is very different from option #1, which samples long intervals of unscrambled S&P 500 data.

Fig. 6j

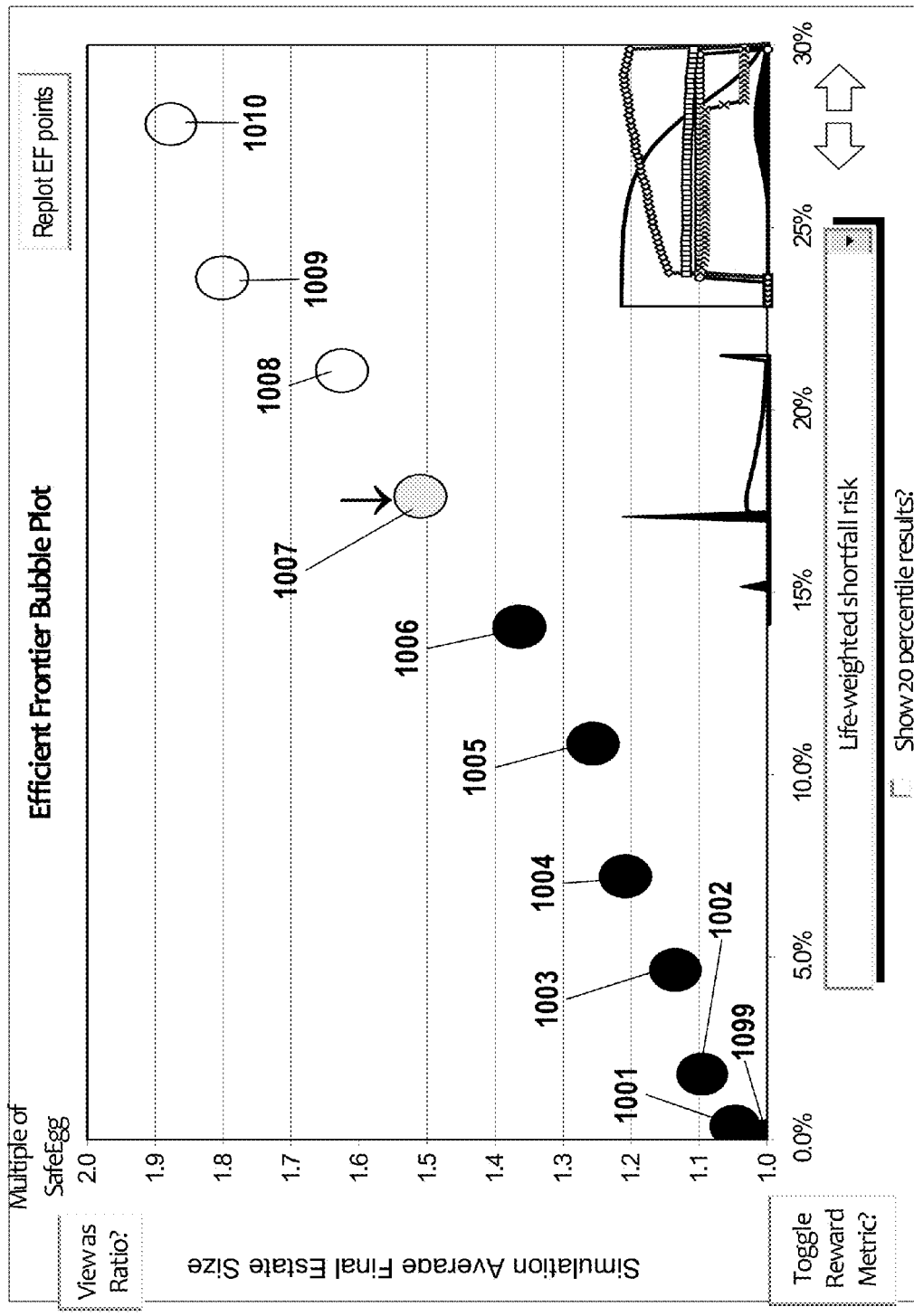

FINANCIAL PLANNER AND PORTFOLIO SIMULATOR

RELATED APPLICATIONS

This application claims the benefit of, and herein incorporates by reference, U.S. Provisional Patent Application No. 61/093,432, entitled "Retirement Calculator and Investment Assessment System," filed on Sep. 1, 2008, U.S. Provisional Patent Application No. 61/233,413, entitled "Financial Planner and Simulator," filed on Aug. 12, 2009; and U.S. Provisional Patent Application No. 61/233,476, entitled "Financial Planner and Simulator," also filed on Aug. 12, 2009.

COPYRIGHT NOTICE

A portion of the disclosure of this patent application and its incorporated provisional applications contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

FIELD OF THE INVENTION

This invention relates generally to financial planning software, and more particularly to consumer software to help sophisticated individuals plan their finances and professional software to help professionals such as accountants and financial advisors advise their clients on financial planning and investment issues. In particular, the invention aids in the evaluation of the relative risks and rewards of a mixed portfolio compared to a safer alternative and to choose an asset allocation.

BACKGROUND OF THE INVENTION

In planning for retirement, it is important to project how many assets and retirement income sources a person needs to accumulate to sustain their needs and lifestyle goals through retirement. It is also important to project the approximate retirement budget that one's present assets and anticipated future assets should be able to sustain.

Financial advisors typically advise their clients that in order to prepare for retirement, they need to invest a large percentage of their assets in the stock market. They also typically recommend that their clients allocate a large percentage of their assets to stocks during retirement. The anticipated rewards of being invested in stocks, as compared to other financial instruments, are generally regarded as too great to pass up.

At the same time, financial advisors typically warn retirees that because of significant stock market volatility, they should limit their withdrawals. In 2008—after the date of the present invention—Nobel price recipient Prof. William F. Sharpe co-authored an article entitled "The 4% Rule—At What Price?" which observes that "[t]he 4% rule is the advice most often given to retirees for managing spending and investing." The authors remarked that they were "struck by the universal popularity of the 4% rule—retail brokerage firms, mutual fund companies, retirement groups, investor groups, financial websites, and the popular financial press all recommend it," and observed this platitude "is the most endorsed, publicized, and parroted piece of advice that a retiree is likely to hear."

Many studies support the 4% rule. The volatility and associated risks of being significantly invested in stocks are, in fact, so great that retirees determined to maintain a constant level of inflation-adjusted spending must minimize the initial percentage they take from their portfolio to ensure that their assets last their lifetimes.

Although significant data supports the 4% rule, an almost universally missed consequence of the rule (with a few notable exceptions, such as Sharpe's article above) is that retirees are directed to withdraw less from a portfolio invested in the stock market than they could sustainably withdraw, with inflation adjustments, from a portfolio that was fully invested in relatively risk-free assets, like treasury inflation-protected securities ("TIPS"). The 4% rule is better tailored to helping the retiree live poor and die rich than to live rich. Except for retirees who wish to maximize what they leave behind to heirs, this approach to retirement investing and spending makes little sense. Yet this contradiction is seldom, if ever, recognized by either the advisors offering the advice, or the retirees receiving it, because few, if any, ever bother to compute a sustainable inflation-adjusted withdrawal amount from an all-TIPS portfolio or other suitable proxy for an approximately risk-free portfolio.

Publicly available advice, analyses, and resources on investing and retirement planning also overestimate the expected return on an equity portfolio. Scores of Monte Carlo and historical simulators purport to model the growth of an equity portfolio divided between generally recognized asset classes. This includes most of the leading financial planning software suites marketed to and used extensively by professionals. In general, these tools use historical return rates, by default, to project future return rates. Their Monte Carlo engines also typically model returns using a stationary normal or log normal distribution. The modeling assumptions of these simulators are significantly flawed.

First, most Monte Carlo and historical simulators use historical rates of return, rather than any mathematically or economically sound analysis of future returns (such as the dividend discount model) to project future rates of return. The assumption that future return rates will be as generous as historical return rates is a fundamentally unsound one. Many economists have decomposed historical returns into constituent components, such as the average dividend yield, an expansion in price-to-earnings ratios (which cannot continue indefinitely), and growth in corporate earnings. But when projecting future returns from the same constituents, we are forced to start with a lower dividend yield and little hope of continuing expansion in price-to-earnings ratios. Historical return rates, therefore, serve as an excessively optimistic proxy for the expected long term return, going forward, on broad stock market indices. Nevertheless, reliance on historical return rates to project future return rates is pervasive and practically universal.

Remarkably, Congress recently passed legislation strongly deterring financial planning software makers from ever departing from this flawed historical-returns approach. The Pension Protection Act of 2006 provides exemptive relief for a certified computer-program-based investment advice program from certain prohibited transaction provisions. To qualify, section 408(g)(3) requires that the computer model "appl[y] generally accepted investment theories that take into account the historic returns of different asset classes over defined periods of time" and "utilizes prescribed objective criteria to provide asset allocation portfolios comprised of investment options available under the plan."

In 2006, the Department of Labor, pursuant to that act, issued a Request for Information regarding such computer models. In 2007, the Securities Industry and Financial Markets Association (SIFMA) responded to that request for information. SIFMA submitted—without qualification—that computer "[m]odels are based on mean variance optimization, and the program uses expected volatility and expected return, based on historical performance, to provide asset allocation and investment product results." Moreover, "[t]he process used for designing the model is quite straightforward. The model is loaded with risk and return characteristics for each asset class represented in the plan, based on publicly available information."

Until the flaws of the conventional approach to modeling equity returns are widely recognized among persons of ordinary skill, and both the industry and the law are transformed by that recognition, millions of 401(k) participants and financial advisory clients will continue to have their expectations unrealistically raised, followed by almost inevitable disappointment and cynicism.

Second, modeling returns using a stationary normal or log normal distribution potentially exaggerates the dispersion of multi-period outcomes—that is, outcomes over long timeframes, such as an investor's remaining life expectancy. Modeling returns with a stationary normal or log normal distribution assumes that there is no serial correlation between returns. Consequently, the variance in projections of accumulated wealth will be roughly proportional with the number of years over which the simulation is performed. This results in a very dramatic dispersion of simulated outcomes over long time frames. But historical experience does not support this model. In their July, 1987 NBER Working Paper entitled "Mean Reversion in Stock Prices: Evidence and Implications," authors James Poterba and Lawrence Summers developed evidence that stock returns are positively serially correlated over short periods and negatively autocorrelated over long periods.

The teachings of such financial literature has apparently escaped the grasp of the persons of ordinary skill developing the leading computerized financial planning systems. For their Monte Carlo simulation models continue—many years after these papers were published—to model equity asset classes with stationary Gaussian or log normal distributions centered about historical return rates. As a consequence, these software packages generate reports for millions of financial advisor clients that have hopelessly optimistic median forecasts within an absurdly broad range of forecast outcomes. A more realistic model of future outcomes would populate the low end of the distribution of popularly forecast outcomes.

And while persons of ordinary skill in the art have recently begun to recognize, with the Panic of 2008, that their models are flawed, they apparently do not understand how they are flawed. Instead of recognizing and acknowledging that their models use stationary distributions when a non-stationary distribution would be more realistic and empirically supportable, or that their stationary distributions were centered about too high an expected return, there has been a pervasive assumption that their distributions simply do not exhibit fat enough tails. Accordingly, since the 2008 financial crisis, the major financial planning software vendors have focused on addressing the so-called "fat-tail" problem with their distributions.

Third, the category of inflation-protected bonds is not a "generally recognized asset class." Consequently, very few simulators model the performance of such assets. Moreover, publicly available advice, analyses, and resources on investing and retirement planning rarely take into account the sustainable annual retirement budget an all-TIPS portfolio could sustain. Applicant is unaware of any retirement calculators and Monte Carlo simulators, created by others, that not only compute or estimate a "safe withdrawal rate" or amount, the "shortfall risk," or the "survival risk" of a mixed portfolio, but also compare those results with the rewards (in terms of sustainable inflation-adjusted retirement budgets) and risk (in terms of shortfall risk) of a minimum risk (e.g., all-TIPS) portfolio. Applicant is also unaware of any retirement calculators or Monte Carlo simulators, created by others, that evaluate the risk of a mixed portfolio, or the dispersion of simulated returns of a mixed portfolio, in relation to the expected performance a minimum risk portfolio.

Incidentally, there is no motivation to even consider and compare the sustainable annual retirement budget an all-TIPS portfolio could support if one assumes that the large equity risk premiums of the past 100 or so years will persist into the future. The fixation with historical returns and assumption that they will persist may explain, in part, why most persons of ordinary skill in the art have been so disinterested in promoting inflation-protected bonds to a generally recognized asset class for individuals preparing for retirement.

There is also a significant regulatory deterrent to making such a comparison. Paragraph (d)(1) of a proposed Department of Labor regulation implementing the Pension Protection Act of 2006 would prohibit a qualifying computer model from "giving inappropriate weight to any investment option." 73 Fed. Reg. 49895, 49899 (Aug. 22, 2008). This regulation would, in effect, prohibit a qualifying computer program from comparing the risks and rewards of a mixed portfolio with an all-TIPS portfolio. Applicant has found no commentary discussing this potential consequence of the rule, which only reinforces Applicant's contention that it is not obvious to persons of ordinary skill to project equity portfolio performance in terms of how it would compare to the performance of an all-TIPS portfolio.

Applicant has reviewed documentation for several leading financial planning software suites marketed to and used extensively by professionals. The leading provider is Emerging Information Systems Inc. (EISI) of Winnipeg, Manitoba, Canada, which markets its NaviPlan and Financial Profiles software to over 250,000 financial professionals. As of 2006, a distant second-place competitor, Financeware, Inc., of Richmond, Va., reported having over 28,000 users of its Financeware wealth management software. As of 2006, another competitor, PIETech of Powhatan, Va., reported having over 17,000 users of its Money Guide Pro software.

EISI's market-leading NaviPlan software, as of 2008, uses a stationary normal distribution centered about average historical returns to project future equity return rates. As late as mid-2008, NaviPlan's software projected long-term annual return rates of between 10% and 15%/year in six different generally recognized asset class categories. Assuming an inflation rate of about 3% a year, the economy would have to grow, in the long term, and in inflation-adjusted terms, well in excess of 5% per year and perhaps as high as 10% per year to support NaviPlan's equity return assumptions. The NaviPlan software also models five bond asset classes, but not inflation-protected bonds, even though Treasury Inflation Protected Bonds have been available for more than ten years.

The NaviPlan software also generates charts that show the distribution of excess or overall wealth generated by the simulation. These projections, however, do not appear to factor in the likelihood that a retiree would increase their retirement expenditures if they enjoyed a stock market windfall. These modeling assumptions do not reflect typical human behavioral responses to abundance (which is to consume more) and scarcity (which is to conserve more). Overall, the NaviPlan software's modeling assumptions—modeling returns with a stationary normal distribution centered about average historical returns, and modeling expenditures as if they were relatively constant—greatly limit the usefulness of NaviPlan's Monte Carlo outputs in helping an investor select a reasonable asset allocation.

The Financeware software also uses a stationary normal distribution approximately centered around historical return rates to project future equity return rates. Online documentation indicates that as of August 2002, the Financeware software modeled over a dozen different equity asset classes on the presumption that they would return, on average, between 12% and 21% per year. The Financeware software only recently—and after the date of the present invention—added Treasury Inflation Protected Bonds as an asset class. The Financeware software did not, as of 2008, evaluate the risks and rewards of a mixed portfolio as a function of the expected performance an all-TIPS portfolio.

As of 2008, Money Guide Pro provided both Monte Carlo and exploratory simulation modes. Money Guide Pro's Monte Carlo simulation mode uses historical return rates to project future equity return rates. Money Guide Pro's exploratory simulation mode also uses actual—not mean-adjusted—historical returns and inflation rates in sequence. The Money Guide Pro software does not, as of 2008, model Treasury Inflation Protected Bonds as an asset class.

Applicant has also investigated ESPlannerPLUS by Economic Security Inc. of Lexington, Mass. ESPlannerPLUS provides Monte Carlo simulation centered around a user-specified expected nominal arithmetic mean return. Online documentation suggests that ESPlannerPLUS models a person's spending by computing the maximum sustainable consumption the person's lifetime of savings would support if the person's equities grew at a constant rate of return equal to the expected nominal arithmetic mean return. ESPlannerPLUS's online documentation admits that this is an extremely aggressive assumption. And its online tutorials suggest that this assumption leads to extremely dismal success rates.

Finally, Applicant has investigated J&L Financial Planner by J&L Software, LLC, of Taneytown, Md. J&L Financial Planner provides two "Historical Return Analysis" modes. The first is a form of exploratory simulation. According to its online documentation, this mode "generates your net worth for each year of your plan based on the returns of the historical data starting with the first year of the data." The second is a form of Monte Carlo simulation. According to its online documentation, this mode tests a financial plan and portfolio against randomly selected historical return data. But there is no indication in the documentation indicating that the historical return data is scaled to yield the user's expected return. J&L Financial Planner also provides more traditional Monte Carlo simulation, but like its peers simulates only with stationary distributions, modeling every simulated return as if it were independent of all of the other simulated returns.

SUMMARY OF THE INVENTION

A financial planner, retirement calculator and simulation system is provided. The system is structured upon the concepts of the real, inflation-adjusted risk-free rate and the expected risk premium.

In one embodiment, the system constructs a baseline portfolio that earns the real risk-free rate of return. The returns of minimum-risk or relatively risk-free assets, preferably long-term inflation-protected bonds, are used as a proxy for the risk-free rate. The system models a sustainable, inflation-adjusted baseline or risk-free retirement budget by amortizing the baseline portfolio, at the risk free rate, over the targeted portfolio duration.

Against this baseline portfolio, the system projects the simulated outcomes of mixed portfolios. The mixed portfolios consist of at least some assets in a risky asset category, such as equities. The remainder of the mixed portfolio is presumed to be invested in an approximately risk-free asset category. The returns of the risky asset category are modeled from a mean-scaled historical return data set, or from a returns distribution, that is scaled or centered to deliver, over a sufficient number of samples, an annualized return equal to the sum of the risk-free rate and the risk premium. The system assumes that the balances allocated between the risky-asset and relatively risk-free categories are periodically rebalanced.

The system also simulates variable retirement budgets supported by the mixed portfolio. These simulated variable retirement budgets are preferably a function of the amortized retirement budget that the portfolio would sustain if it delivered its expected annualized real return or the risk-free rate of return.

The system also models the pre-retirement growth of a portfolio as anticipated retirement contributions are added, and its gradual post-retirement depletion as distributions are made. Projected and simulated retirement budgets are supported by not only withdrawals from the modeled portfolio, but also anticipated future retirement income sources, such as social security, pensions, inheritances, and reverse mortgages. When this specification refers to the sustainable retirement budget that could be supported by a portfolio, it is generally referring to a level, consumption-smoothed (except under circumstances where a negative portfolio balance would result, as discussed in §2.2) inflation adjusted retirement budget that is supported by both the portfolio and other anticipated sources of income and wealth.

Before performing a simulation, the system estimates a range of median inflation-adjusted retirement budgets that a mixed (e.g., all-equity or at-least-part-equity) portfolio, amortized over the targeted portfolio duration, would support. After simulating the portfolio, the system generates a probability distribution of average or median inflation-adjusted retirement budgets that different simulations of the mixed portfolio supported. The system samples different percentile ranked trials—for example, the 5, 50, and 95 percentile ranked trials—of that probability distribution to publish and/or display.

When publishing or plotting the sampled distribution of average inflation-adjusted retirement budgets that different simulations of mixed portfolio supported, the system publishes or plots them in relation to the amortized inflation-adjusted retirement budget supported by the amortized baseline portfolio. This comparative illustration may be done by plotting, in dollars, both the sampled retirement budget outcomes supported by the mixed portfolio and the projected sustainable budget supported by the baseline portfolio. The comparative illustration may also or alternatively be done by plotting the sampled outcomes as a percentage or fraction of, ratio to, or percentage or fraction above the sustainable amortized baseline retirement budget.

By plotting a widely-distributed sampling of the probability distribution of estimated results from the mixed portfolio, the system graphically illustrates the dispersion of simulated results associated with the mixed portfolio. By plotting these dispersedly sampled results in comparison to the projected sustainable amortized budget supported by the baseline portfolio, the system concisely illustrates both the relative simulated risks, and the relative simulated rewards, of the mixed portfolio relative to the comparatively risk-free baseline portfolio.

As noted above, one embodiment of the system models the returns of the baseline portfolio using a constant, user-specified real (i.e., after-inflation) return. Other embodiments of the system model the baseline portfolio with an expected real return and a relatively small standard deviation.

By default, the system models the risky-asset category using exploratory simulation of a mean- and standard-deviation-adjusted but otherwise historical return data set. The returns in the data set are scaled to match a user-specified expected annualized return and standard deviation. Alternatively, the system models the risky asset category using a stationary or non-stationary normal distribution, log-normal distribution, double log-normal distribution, Student's-T distribution, or using random sampling of a mean- and standard-deviation-adjusted but otherwise historical return data set.

To model returns using a non-stationary distribution, the system characterizes risky asset returns as valuation-dependent distributions whose mean expected return for any given year is a function of the simulated valuation or over- or under-performance (relative to the expected performance) of the market.

In more advanced embodiments, the system further models the mixed portfolio with a covariance or correlation parameter between the two asset categories. In a very advanced embodiment, the system models a mixed portfolio with substantially all of the generally recognized asset classes, each with default or user-specified expected return, standard deviation, cross-correlation, and auto-correlation parameters.

In a basic embodiment, the system models a portfolio as if it could be rebalanced, and its earnings reinvested, without any tax consequence (where taxes are only realized, if at all, by a consumptive withdrawal of money or assets from the portfolio). In a more advanced embodiment, the system distinguishes between tax-free, tax-deferred, and taxable portfolios, and between income or growth taxable at regular tax rates and income or growth taxable at capital gains or qualified dividend tax rates. The advanced system also takes various tax brackets, Social Security taxation rules, and required minimum distribution rules into account. In such an advanced embodiment, the system models a tax-optimal policy of allocating different asset classes between different vehicles, an optimal strategy of rolling over money from tax-deferred to tax-free vehicles, and a tax-efficient or minimizing strategy of withdrawals from the various accounts. The system may use any number of computational techniques, including linear optimization or an intelligently-designed decision rule structure, to identify and/or model a tax-efficient or tax-minimizing plan of rebalances, rollovers, and withdrawals.

The system allows investors to evaluate different approaches to asset allocation, including the use of preselected time- and valuation-dependent adjustments to their asset allocation. For example, users may specify simulated increases in their allocations following simulated periods of below-average market performance, and decreases following simulated periods of above-average market performance.

The system calculates simulated shortfall rates (or its converse, a simulated success rate), average or median retirement budgets, and expected terminal estate sizes, taking into account life expectancy data. Users are asked to enter their own age and the age of their spouse, if any. Using the entered ages and actuarial tables, the system calculates the probability of one of the user and the user's spouse, if any, surviving to any given year. The system also weights the simulated or estimated retirement budgets and corresponding portfolio sizes from each year by the probability of one of the user and the user's spouse, if any, surviving to that year.

The system helps investors evaluate the comparative risks and rewards of different percentage allocations to stocks in regularly rebalanced portfolios. The system plots the sustainable amortized budget supported by a risk-free portfolio along with the average simulated budgets supported by eleven simulated portfolios ranging from a 0% asset allocation to a 100% asset allocation, in 10% increments, on a scatter plot. The x-axis of the scatter plot represents the percentage asset allocation to stocks. The y-axis of the scatter plot represents the outcomes of several dispersedly sampled retirement budgets supported from each of the simulated portfolios as a percentage of the sustainable outcome expected from a risk-free portfolio. Each simulated portfolio is represented on the plot with a first symbol representing the estimated 50-percentile retirement budget result and a plurality of additional symbols, positioned above and below the first symbol, that represent selected high- and low-percentile retirement budget results.

One embodiment of the system also plots different mixed portfolios on a modified efficient frontier plot. Each mixed portfolio is characterized by at least one symbol, having an x-coordinate and a y-coordinate, on a scatter plot. The y-coordinate represents a selected type of reward simulated from the mixed portfolio. The x-coordinate represents a selected type of simulated risk of the mixed portfolio. One selectable type of reward is the average or median retirement budget supported by the simulated portfolio. Another is the simulated average or median retirement budget supported by the simulated portfolio as a percentage of the estimated sustainable retirement budget supportable by the baseline portfolio. Yet another is the expected terminal estate size from the mixed portfolio. And yet another is the ratio of the expected terminal estate size of the mixed portfolio over the expected terminal estate size from the baseline portfolio. Selectable types of risk include the shortfall rate, its opposite, the success or survival rate, and the rate at which a simulated portfolio underperformed the baseline portfolio.

The system also comprises physical hardware: a computer including a processor—preferably multiple processors operating in parallel—and a graphical user interface operable to spatially arrange a user's inputs on a computer screen and visually display a user's inputs and the apparatus's graphical outputs. For maximum legibility, the graphical user interface is preferably displayed on a large widescreen monitor, preferably having a ratio of at least 16:10 and a diameter of at least 19 inches. The physical hardware is also programmatically and dynamically electrically modified to represent different sets of bits of ones and zeros at different times. More particularly, the system includes a portfolio modeling instruction set resident on the computer operable to cause the processor to perform all of the modeling functions described in this specification.

In one embodiment, the portfolio modeling instruction set takes the form of a macro-embedded spreadsheet running on a spreadsheet application that in turn runs on the computer. In general, the portfolio modeling instruction set is operable to receive user inputs specifying one or more parameters for the portfolios and to simultaneously display both the user inputs and the computer-generated plots in a common computer window on the graphical user interface.

These and other aspects, features, and advantages of the present invention will be readily apparent to those skilled in the art from the following detailed description taken in conjunction with the annexed sheets of drawings, which illustrate the invention. The invention, however, is not limited by systems with any particular combination of the described features, aspects, and advantages, except and to the extent specifically so limited by the claims.

BRIEF DESCRIPTION OF THE DRAWINGS

FIG. 2a illustrates actuarial inputs for the retirement calculation and estimation system.

FIG. 2b illustrates a set of portfolio inputs for the retirement calculation and estimation system.

FIG. 2c illustrates a set of return expectation inputs for the retirement calculation and estimation system.

FIG. 2d illustrates a set of asset allocation inputs for the retirement calculation and estimation system.

FIG. 2e illustrates a set of targeted retirement budget parameter inputs for the retirement calculation and estimation system.

FIG. 5a illustrates the top half of an expanded version of the worksheet of FIG. 4, providing several rows to specify additional portfolio inputs.

FIG. 5b illustrates the graphs of the expanded version of the worksheet of FIG. 5a, showing the sequence of sustainable amortized expenditures and corresponding portfolio sizes for a portfolio fully invested in risk-free assets but otherwise characterized as specified in FIG. 5a.

FIG. 6a illustrates a different set of inputs and corresponding baseline comparison outputs for the primary worksheet of the retirement calculation and estimation system.

FIG. 6b illustrates the life status, social security, savings goals, and asset allocation input sections of the worksheet of FIG. 6a.

FIG. 6c illustrates the return expectation, retirement budget goals, and retirement budget constraint sections of the worksheet of FIG. 6a.

FIG. 6d illustrates the retirement feasibility estimates section of the worksheet of FIG. 6a.

FIG. 6e illustrates the simulation model selection section of the worksheet of FIG. 6a.

FIGS. 6f-6j illustrate exploratory, normal distribution, log normal distribution, double log normal distribution, and randomized sampling simulation model choices.

FIG. 6l illustrates a second plot of the worksheet of FIG. 6a after the simulation run, displaying simulated series of portfolio sizes from the five, fifty, and ninety-five percentile ranked simulation trials of the mixed portfolio, and contrasting these series with a portfolio size series from the relatively risk-free baseline portfolio, which is amortized by draws needed to support the projected sustainable retirement budget.

FIGS. 6o and 6p illustrate first and second plots, respectively, of the worksheet of FIG. 6a after the simulation run, displaying the five, fifty, and ninety-five percentile series of retirement budgets and portfolio sizes generated by a blended sort of several thousand simulations of the mixed portfolio, again contrasting these series with the portfolio size series corresponding to a sustainable amortized retirement budget supported by a relatively risk-free baseline portfolio.

FIGS. 9-15 illustrate several different mixed portfolios, along with a relatively risk-free baseline portfolio, plotted in risk-reward space with several different practical representations of risk and reward.

DETAILED DESCRIPTION

FIGS. 1-15 illustrate an "omnibus" embodiment of a retirement calculation and estimation system 100 having a panoply of useful features that has, for the most part, been reduced to actual practice in the form of one or more spreadsheets and associated macro code. Some of these spreadsheets have been made publicly available in the form of incrementally more sophisticated versions of the TIP$TER® financial planner and portfolio simulator by Prospercuity, LLC of Cripple Creek, Colo.

Figure 1:
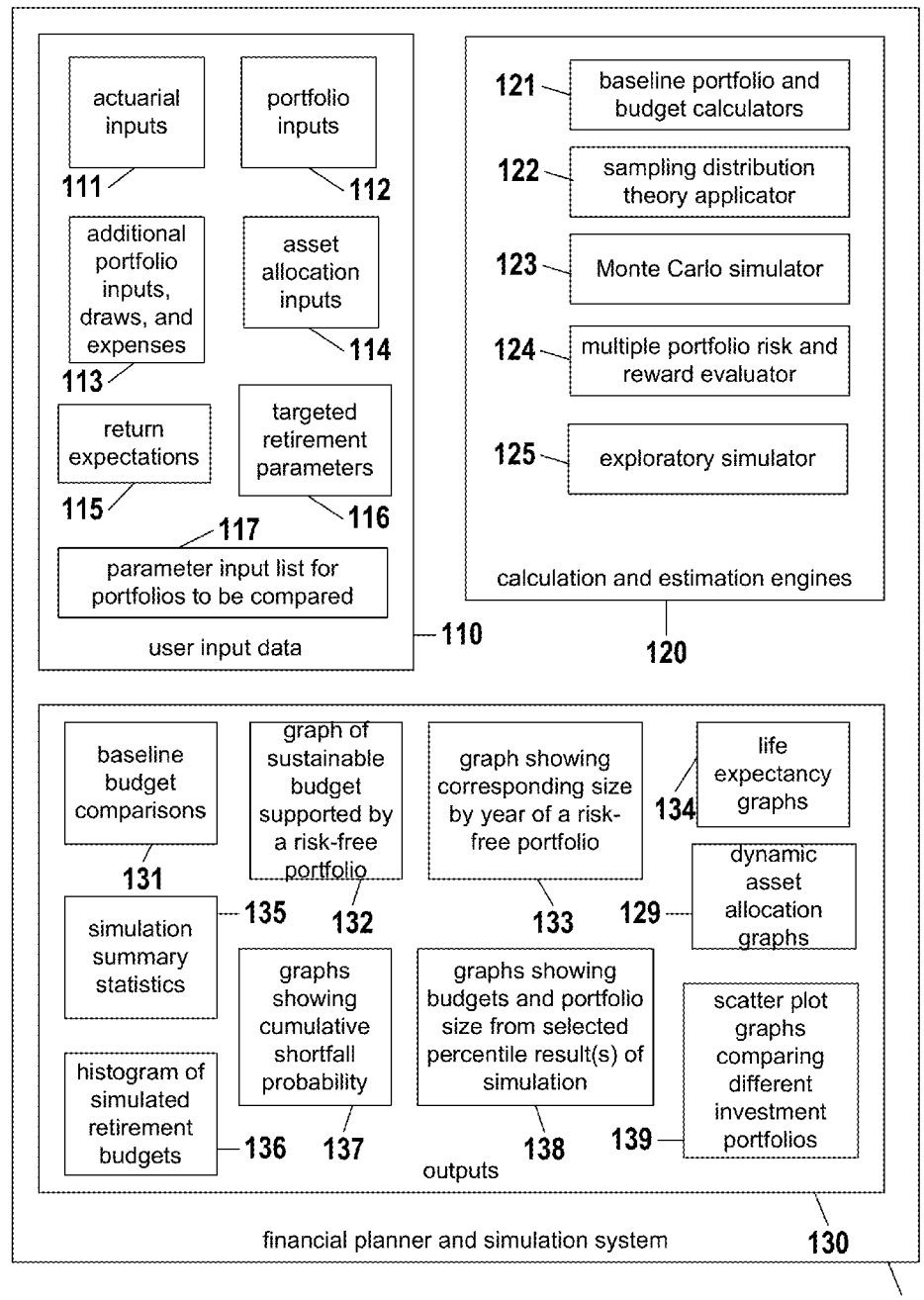
FIG. 1 illustrates the inputs and functional components of one embodiment of a retirement calculation and estimation system.
Figure 2F:
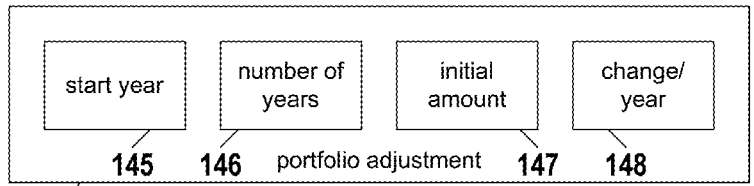
FIG. 2f illustrates a set of optional portfolio adjustment inputs for the retirement calculation and estimation system.
Figure 2G:
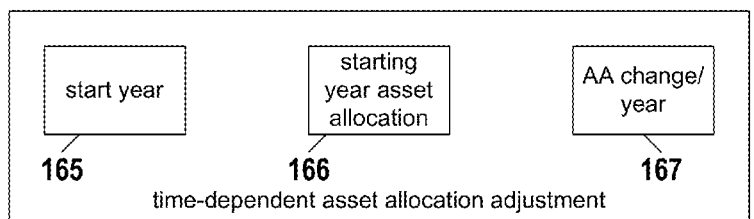
FIG. 2g illustrates a set of optional time-dependent asset allocation adjustment inputs for the retirement calculation and estimation system.
Figure 2H:
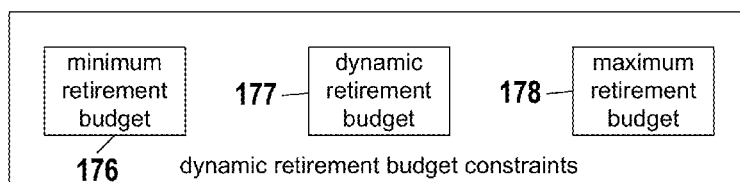
FIG. 2h illustrates a set of optional dynamic retirement budget constraint inputs for the retirement calculation and estimation system.
Figure 2I:
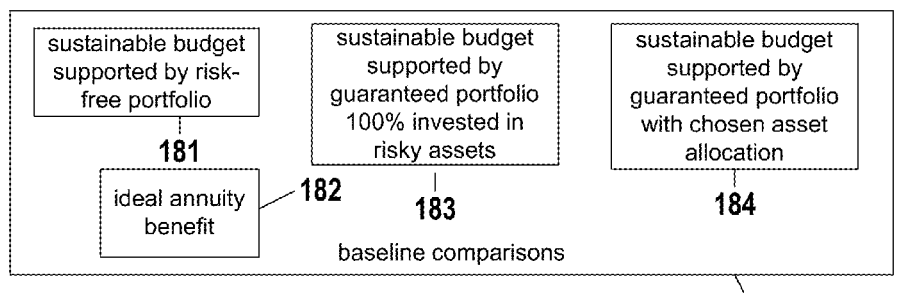
FIG. 2i illustrates a set of baseline retirement budget comparisons computed by the retirement calculation and estimation system.
Figures 1, 4:
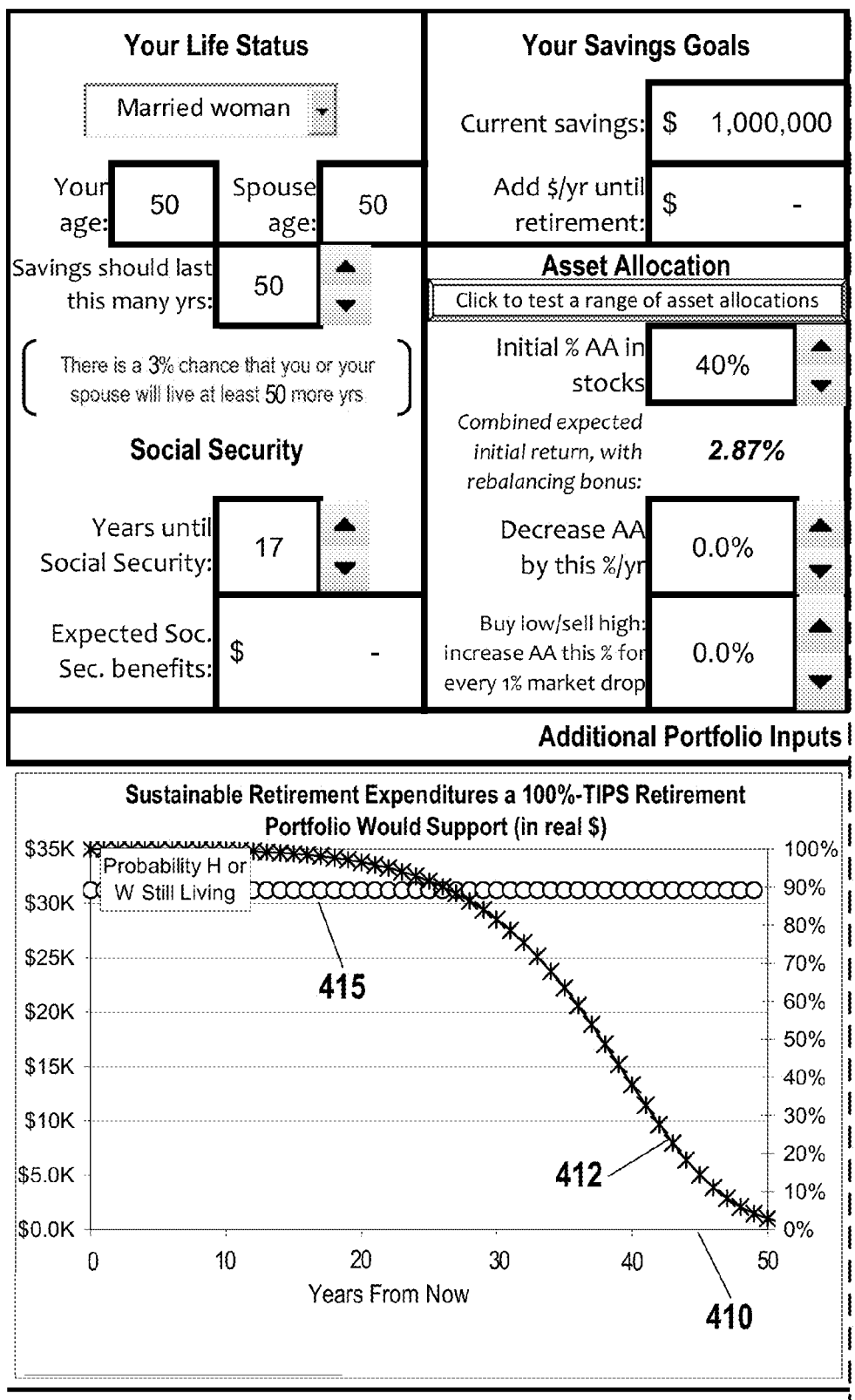
FIG. 4 illustrates the primary graphical user interface window, screen or worksheet of one embodiment of a retirement calculation and estimation system.
Figures 2, 4:
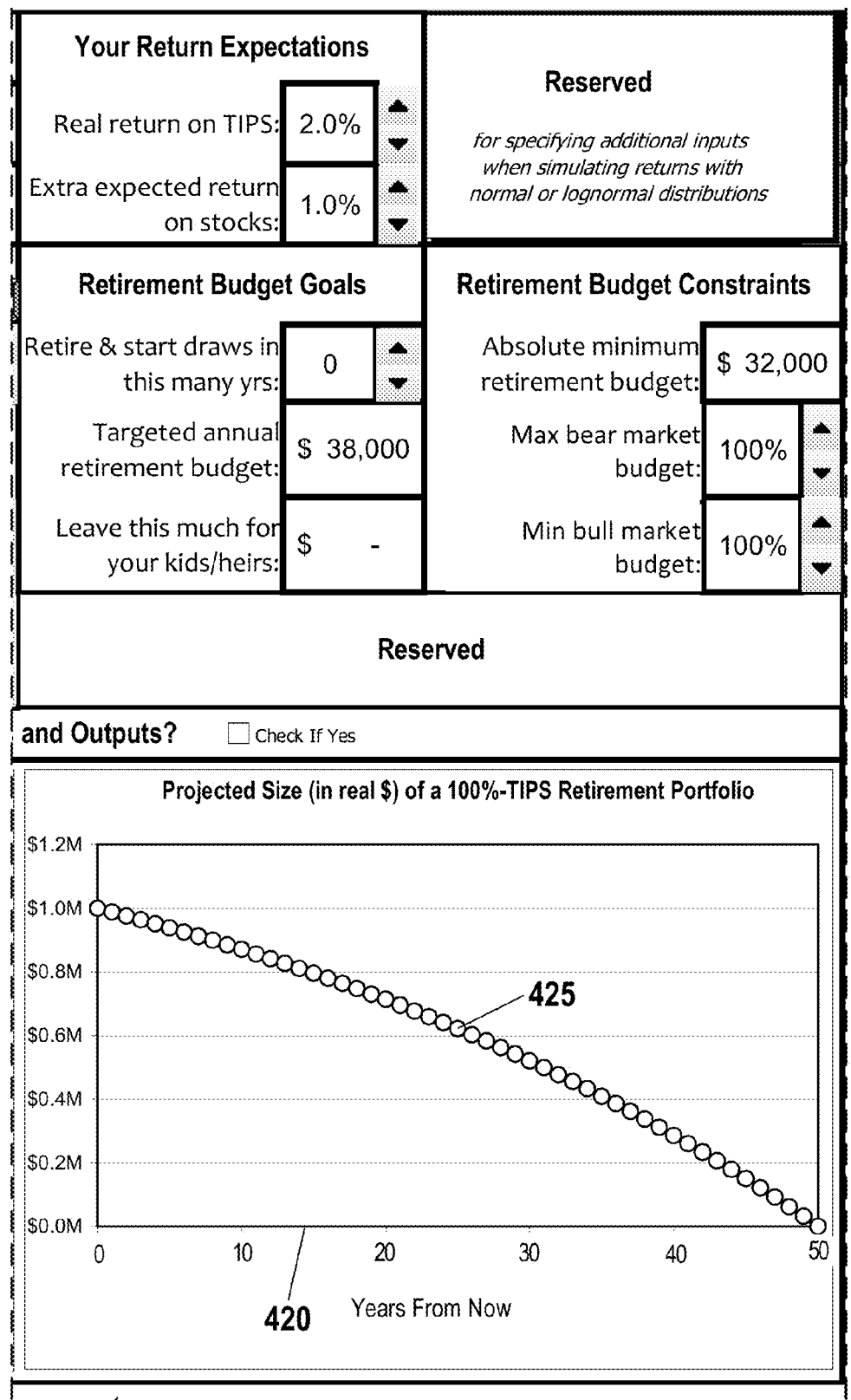
Figures 3, 4:
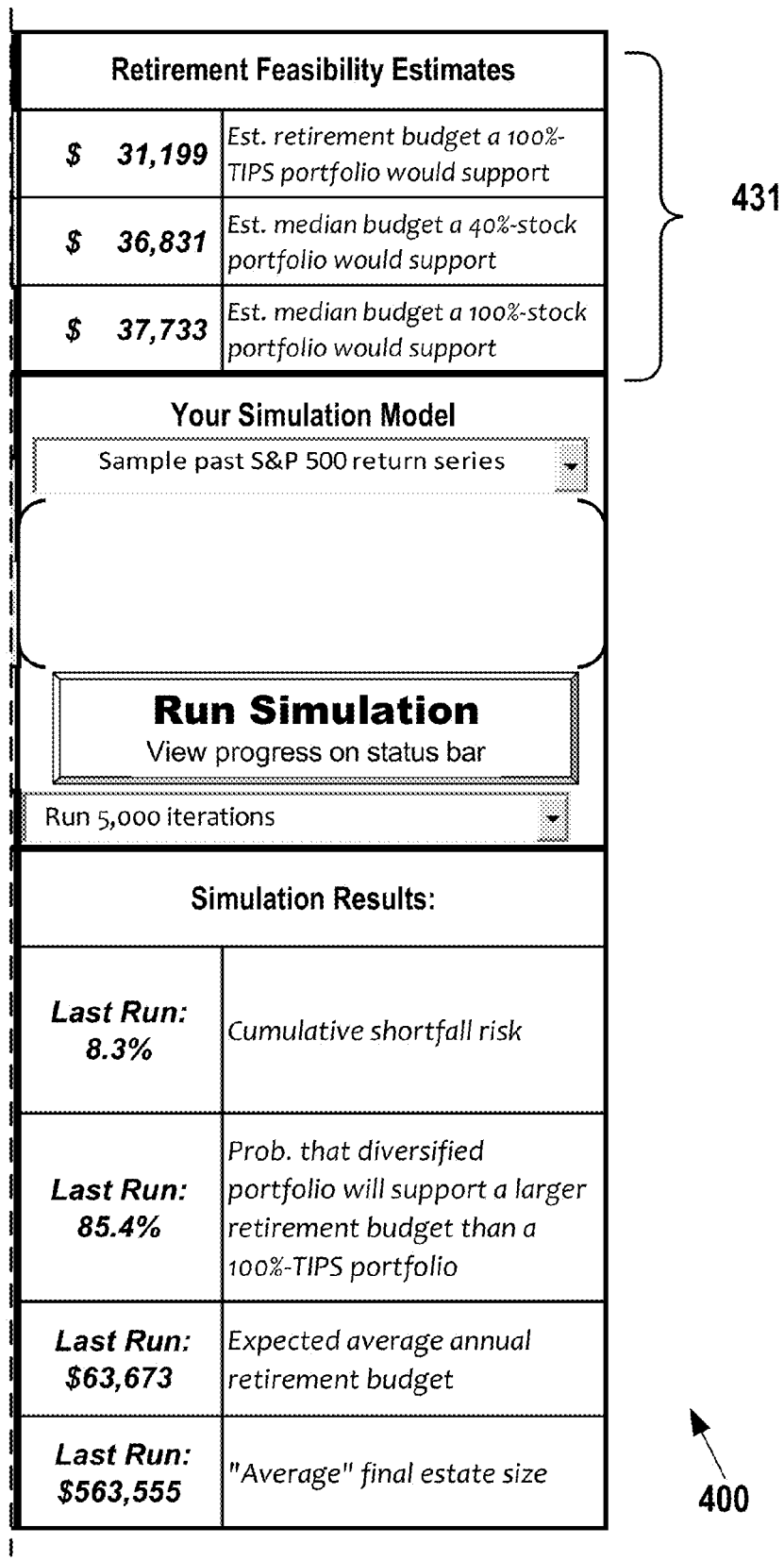

FIGS. 1-2i illustrate the inputs and functional components of this spreadsheet-based retirement calculation and estimation system 100. FIGS. 4-15 illustrate portions of several screenshots of this financial planner and simulation system 100.

Macro code for an early version of the financial planner and simulation system 100 is set forth in the Appendix to provisional application No. 61/093,432. A user manual for and several case studies involving a later version of the financial planner and simulation system 100 are set forth in provisional application Nos. 61/233,413 and 61/233,476. Provisional application No. 61/233,476 also includes pseudocode for a tax-sensitive embodiment of the financial planner and simulation system 100.

The invention is not limited, except to the extent specifically so claimed, to programs that provide all or most of the many different features described in this "omnibus" embodiment or to programs that utilize the same or equivalent inputs and functional components illustrated herein.

This invention is also not limited, except to the extent specifically so claimed, to programs that are spreadsheet-based or that utilize the same or similar user interface architecture. Indeed, so many features were added to the financial planner and simulation system 100 during its development that it strains the spreadsheet-based architecture displayed herein. For many potential users, a more user-friendly architecture may be preferable, perhaps one that walks a user through the different inputs, simulation and graphical choices, and other outputs. And a much faster-executing C, C++, or C# version of the system 100, one that was capable of running as a stand-alone application or as a web-based application, would be preferred. An especially outstanding, fast-executing embodiment of the system 100 would run as a web-based application yet simultaneously run the trials of any given simulation on an equal number of network-distributed processors.

1. Architecture of the Financial Planner and Simulation System 100

1.1 Two Asset-Category Design and Modeling Assumptions

The financial planner and simulation system 100 preferably models every investment portfolio as a combination of two regularly rebalanced asset categories—a relatively risk-free asset category, and a comparatively high-risk, but preferably mixed, asset category. This model produces many non-obvious advantages. First, the parameters for the relatively risk-free asset category are used to determine the retirement budgets that can be sustained by a baseline portfolio. Second, grouping all of the risky assets into a single basket having a characteristic periodic return and standard deviation, the system 100 greatly simplifies the amount of input required from a user and the number of calculations needed in any simulation. Third, by modeling the risky assets as a single mixed basket, the system 100 encourages users to think in terms of the probable future performance of the stock market as a whole, rather than guessing at the probable future performance of some small slice of the equity universe. Fourth, the system 100's simplified model comparing a risk-free portfolio with a two-asset-category portfolio helps investors evaluate how much—if any—they should allocate to stocks in the first place. Fifth, the system 100 underscores, and draws the user's attention to, the benefits—in the form of additional expected return and reduced overall volatility—of rebalancing a portfolio between two such asset categories.

Of course, prudent investors generally diversify their portfolios between several different asset classes. For example, an investor might allocate five percent to commodities, twenty-five percent to foreign stocks, forty percent to domestic stocks, with the remainder equally divided between TIPS and corporate bonds.

To model such a mixed portfolio using only two asset categories, the investor's TIPS could be treated as a relatively risk-free asset category while the remainder of the investor's portfolio—i.e., the investor's commodities, stocks, and corporate bonds—could be treated as comprising a single risky asset category (i.e., a common collection of risky assets) with a category-wide expected return and standard deviation.

While the preferred embodiments simply ask the user to enter either the category-wide expected return, or the extra return over the risk-free rate (a.k.a. the "risk premium"), for the risky-asset category, other embodiments of the system 100 allow a user to enter the expected returns, standard deviations, and correlation coefficients of each risky asset. Then, using techniques widely employed by mean-variance optimizers, the system 100 would compute a category-wide expected return and standard deviation for the risky asset category. Alternatively, the system 100 would simulate the performance of each risky asset independently, and then aggregate the simulated returns together.

Accordingly, to the extent that the specification refers to a "risky-asset category," the phrase is intended to encompass mixed collections of risky assets.

1.2 Inputs, Outputs, and Functional Components

FIGS. 1-2h are logical block diagrams that illustrate the functional components of one embodiment of the financial planner and simulation system 100. FIGS. 4-6n illustrate screenshots 400, 500, and 600 of a primary worksheet, user-interface screen, or common window of one embodiment of the financial planner and simulation system 100. There is a considerable amount of correspondence between the logical groupings of FIGS. 1-2h and the logical categories of life status inputs, savings and other portfolio inputs, asset allocation inputs, return expectation inputs, and targeted and flexible retirement parameter inputs set forth in FIGS. 4-6n. However, the inputs shown in FIGS. 4-6n and FIGS. 1-2h are different from the groupings set forth in the provisional application No. 61/093,432. The differences merely reflect the many different ways that these and other inputs may be grouped, all of which are encompassed by the present invention.

The financial planner and simulation system 100 comprises several categories of user input data 110, a collection of calculation and estimation engines 120, and several outputs 130. Categories of user input data 110 include actuarially-relevant life-status inputs 111, portfolio inputs 112, additional portfolio inputs, draws and expenses 113, asset allocation inputs 114, return expectations 115, targeted retirement parameters 116, and a parameter input list 117 for simulating and comparing multiple portfolios on a modified efficient frontier plot.

The collection of calculation and estimation engines 120 includes several baseline portfolio and budget calculators 121, a sampling distribution theory applicator 122, a Monte Carlo simulator 123, an exploratory simulator 125, and a system 124 that comparatively evaluates the risk and reward of multiple portfolios.

The outputs 130 include several baseline retirement budget or withdrawal comparisons 131, a first plot 132 of sustainable retirement budgets versus year that could be supported by amortization of a risk-free portfolio, a second plot 133 showing the corresponding size (depleted by those retirement expenditures) of the risk-free portfolio versus year, one or more life expectancy graphs 134, several exploratory or Monte Carlo simulation summary statistics 135, a histogram of simulated retirement budgets 136, graphs 137 showing the cumulative shortfall rate, graphs 138 showing the retirement budgets and portfolio sizes from selected percentiles of the simulation trials, scatter plot graphs 139 comparing different investment portfolios, and dynamic asset allocation graphs 129.

FIG. 2a illustrates a preferred set of actuarially relevant life status inputs 111 for the financial planner and simulation system 100. The life status inputs 111 include the client's marital status 140 (e.g., married female; married male; single female; single male), the client's current age 141, and the current age 142 of the spouse, if one is designated. These life status inputs 111 are used in the computation of several "life-weighted" summary statistics, including the probability of an investor or a surviving spouse outliving his or her portfolio. Another life status input is the targeted portfolio duration 171. Users are immediately told the actuarial probability of outliving their targeted portfolio duration 171, and are encouraged to enter a targeted portfolio duration 171 that is significantly greater than their remaining life expectancy, and preferably long enough to sustain the user and his or her spouse, if any, to a point in time where their survival probability drops to less than 5%. Alternatively, the system 100 computes a targeted portfolio duration 171 that is a function of the user's life expectancies. FIG. 6b illustrates a corresponding set of actuarially relevant lift status inputs under the heading 641 entitled "Your Life Status."

FIG. 2b illustrates a set of portfolio inputs 112 for the financial planner and simulation system 100. The portfolio inputs 112 include a current portfolio size 143 and other portfolio adjustments 144. FIG. 2f illustrates a portfolio adjustment 144 that is specified by a start year 145, an initial amount 147, the percentage 148 in inflation-adjusted terms the amount 147 is increased or decreased each year, and the number of years 146 this amount 147, as adjusted by percentage 148, is added to or subtracted from the portfolio. FIG. 6b illustrates an input for the current portfolio size under the heading 642 entitled "Your Savings Goals." FIG. 5a illustrates several rows 550 where five such portfolio adjustments 144 can be entered. FIGS. 6b and 6c also, under various headings, illustrate portfolio-adjusting inputs for specifying additional annual contributions 651 until retirement, the number of years 172 until retirement, the number of years 653 before the users expect to begin collecting social security, and the anticipated annual amount 654 of the social security benefit.

FIG. 2c illustrates a set of return expectation inputs 115 for the financial planner and simulation system 100. The return expectation inputs 115 include the expected real, after-inflation annualized yield 151 on a first, approximately risk-free asset category, the extra annualized yield 152, over and above the risk-free yield 151, expected on a second, relatively risky asset category, and a parameter 153 characterizing the volatility or variability of the second asset category, preferably in the form of standard deviation or variance of returns. Another return expectation input 115 is a reversion-to-the-mean factor or other non-stationary distribution parameter 154, explained below in §4.6. FIG. 6c illustrates these return expectation inputs under two headings: the heading 644 entitled "Your Return Expectations," and the heading 647 entitled "Add'l Return Model Parameters."

Return expectation inputs 115 may alternatively or additionally include—as discussed below in §4.6—an expected real per capita gross domestic (or international) product growth rate, the current dividend yield, the expected percentage drag between real per capita growth and the growth of the risky asset category, or other constituent components of an equity return expectation.

FIG. 2d illustrates a set of asset allocation inputs 114 for the financial planner and simulation system 100. The asset allocation inputs 114 include the initial asset allocation 161, one or more time-dependent asset allocation adjustments 162, and a valuation-dependent asset allocation adjustment 163. FIG. 6b illustrates all three inputs 161, 162, and 163 under the heading 649 entitled "Asset Allocation." FIG. 2g illustrates a more detailed set of parameters specifying a time-dependent asset allocation adjustment 162, including a start year 165, a starting year asset allocation 166, and the amount 167 per year by which the asset allocation is increased or decreased. Although no corresponding complete set of parameter inputs is shown in FIG. 6b or 6c, it is contemplated that such a set of asset allocation adjustment inputs could be organized similarly to portfolio adjustment inputs set forth in rows 550 of FIG. 5b.

FIG. 2e illustrates a set of targeted retirement budget parameter inputs 116 for the financial planner and simulation system 100. The set of targeted retirement budget parameter inputs 116 includes the number of years 172 to retirement, the targeted annual retirement budget 173, the absolute minimum acceptable retirement budget 174, and other dynamic retirement budget constraints 175. It may also include a bequest goal 179, representing the amount of money the client(s) want(s) to be left over for his, her, or their heirs at the end of the targeted portfolio duration 171. FIG. 6c illustrates a corresponding set of targeted retirement budget parameters, most of which fall under two headings: heading 645 entitled "Retirement Budget Goals" and heading 648 entitled "Retirement Budget Constraints."

FIG. 2h illustrates several optional dynamic retirement budget constraints 175, which are explained in more detail in §5.1 below. One constraint is a minimum retirement budget 176 that is recalculated for each simulated retirement year as a function of the size of the portfolio, a targeted portfolio duration equal at least to the remaining life expectancy of at least one of the one or two persons, and the expected risk-free of return. FIG. 6c illustrates a corresponding input labeled "Min budget in bull market." Another constraint is a maximum retirement budget 178 that is a function of the size of the portfolio, a targeted portfolio duration equal at least to the remaining life expectancy of at least one of the one or two persons, and the expected return of a portfolio that is annually rebalanced between the two asset categories in accordance with the user's asset allocation inputs. FIG. 6c illustrates a corresponding input labeled "Max budget in bear market." Alternatively, the simulated retirement budgets are exactly constrained by a function 177 of the size of the portfolio, a targeted portfolio duration equal at least to the remaining life expectancy of at least one of the one or two persons, and the expected return of a portfolio that is annually rebalanced between the two asset categories in accordance with the user's asset allocation inputs.

FIG. 2i illustrates several baseline comparisons 131 computed by the financial planner and simulation system 100. One of the comparisons 131 is the estimated sustainable inflation-adjusted retirement budget 181—discussed below in §2.1—supported by amortization of a portfolio fully invested in the approximately risk-free asset category. Another baseline comparison 131 is the hypothetically sustainable inflation-adjusted retirement budget 183—discussed below in §2.4—that would be supported by amortization of a portfolio that delivered a fixed return equal to expected annualized real return of the risky asset category. Another baseline comparison 131 is the hypothetically sustainable inflation-adjusted retirement budget 183—discussed below in §2.5— that would be supported by amortization of a portfolio that delivered a fixed return equal to the expected annualized real return, including rebalancing bonus, of the user's specified mixed portfolio. The latter baseline comparison quickly informs investors the total retirement income that their anticipated portfolio inputs could sustain if they invested in a mix of relatively risky and relatively risk-free assets and the portfolio performed at least to median expectation. Yet another baseline comparison could be an annuity benefit—discussed below in §2.7—that would be obtainable from an "ideal annuity," one whose provider charged nothing for overhead or profit. FIG. 6c illustrates all of these baseline retirement budget comparisons 131 under the heading 646 entitled "Retirement Feasibility Estimates."

2. Computation and Display of Baseline Comparisons

By computing the baseline retirement budget comparisons 131, the financial planner and simulation system 100 very quickly provides investors with a realistic set of expectations and reference values with which to compare and evaluate a potential or hypothetical mixed portfolio having a defined asset allocation between risky and relatively risk-free investments.

The most useful baseline comparison 131 is the sustainable inflation-adjusted retirement budget 181, starting at retirement, supported by amortization of a portfolio fully invested in a safe, relatively risk-free asset category. Expanding on that risk-free comparison, FIG. 4 provides a plot 410 displaying the sustainable retirement budgets, versus year, from an amortized risk-free portfolio over the entire targeted life of the portfolio, and a second plot 420 showing the corresponding size, versus year, of the amortized portfolio over its targeted life.

Baseline comparison 181 and plots 410 and 420 are particularly insightful for many reasons. First, they inform investors what kind of retirement standard of living their anticipated portfolio inputs could reasonably be expected to sustain if they invested only in TIPS or other relatively risk-free assets. Many people lack even this basic information. Second, it gives persons something with which to compare the possible outcomes of a mixed portfolio that is at least partially invested in risky assets.

For example, FIG. 4 illustrates the inputs of a couple with a portfolio of $1,000,000 who want to compute a sustainable inflation-adjusted retirement budget, starting immediately, that would last 50 years. The couple assumes that the real yield on TIPS of varying durations is 2.0%, and that when their TIPS mature, they will be able to reinvest the proceeds in more TIPS with a 2.0% real yield.

FIG. 4 displays the calculated sustainable amortized retirement budget amount —$31,199/year—in the "Retirement Feasibility Estimates" section 431 of FIG. 4. FIG. 4 also displays a plot 410 illustrating a constant sustainable retirement budget 415 of about $31,200/year over the 50-year time span and a second plot 420 illustrating the corresponding amortized portfolio size 425 over that 50-year time span.

The baseline calculator 121 is capable of calculating sustainable retirement budgets supported by a much more complex sets of variables. For example, FIG. 5a illustrates the inputs of a husband and wife, both aged 35, who start with a portfolio of size $100,000, and plan to contribute $20,000 to their portfolio for each of the next 20 years, when they plan to retire. The couple also plans to withdraw a faster-than-inflation-adjusted $20,000 per year for 4 years, starting 10 years from now, to help defray their daughter's college tuition expenses. The couple also expects to start receiving an annual social security benefit of $20,000 in 35 years, a one-time inheritance of $250,000 in 25 years, and a reverse mortgage of $10,000/year on their home in 40 years. If the couple invests solely in 2.0%-real-yielding TIPS for the rest of their lives, what annual, constant level, inflation-adjusted retirement budget could their portfolio together with their anticipated social security income and inheritance, sustain?

Figure 5B:
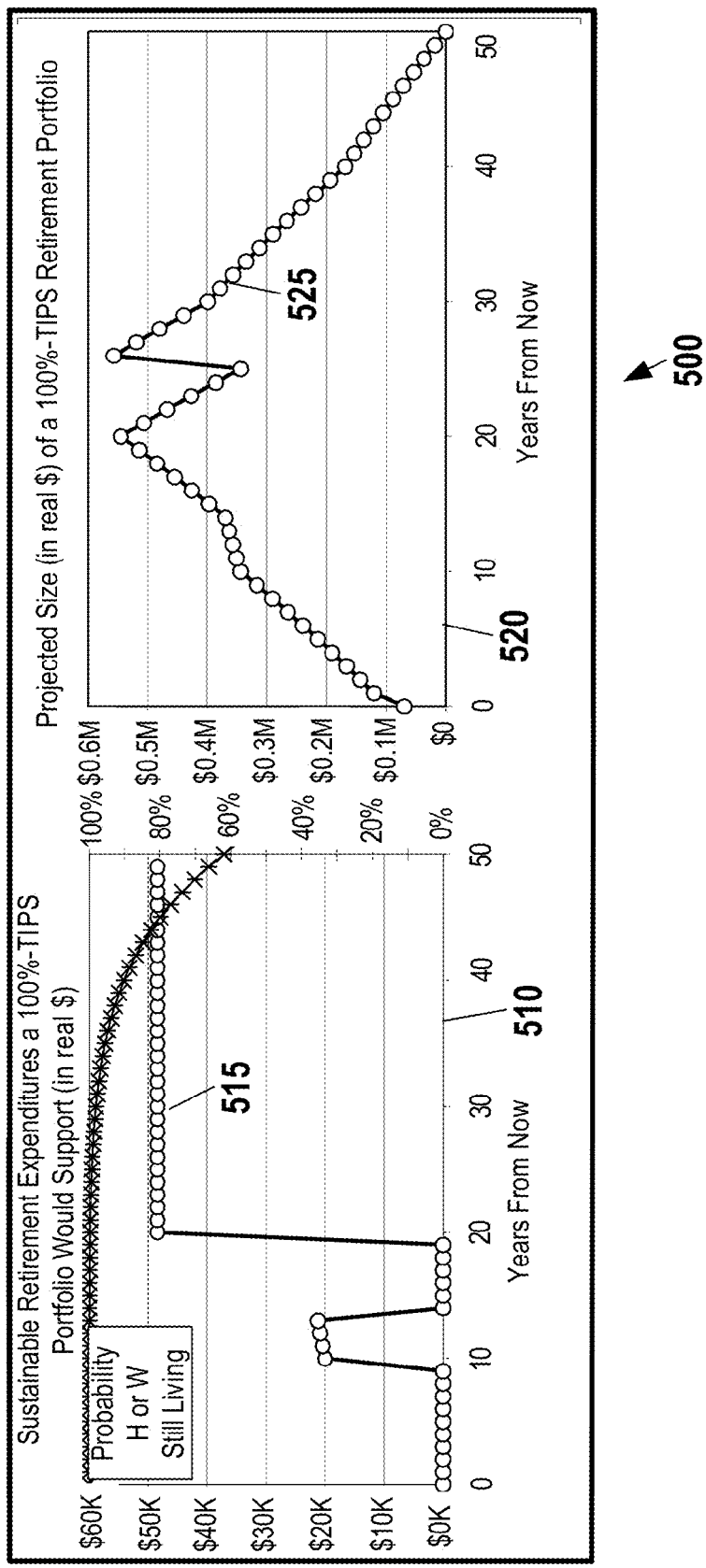

Although FIG. 5a presents a far more complex set of inputs than FIG. 4, the baseline calculator 121 nearly instantaneously (that is, without waiting for the user to execute a calculation or simulation process) computes an initial sustainable retirement budget of $48,523/year. The calculator 121 also nearly instantaneously computes and displays the sustainable yearly expenditures 515, including the college tuition amounts and eventual social security amounts, on plot 510 of FIG. 5b. The calculator 121 also nearly instantaneously computes and displays the corresponding annual portfolio amounts 525 on plot 520 of FIG. 9. The projected impacts of the annual retirement contributions for the first twenty years, the college tuition expenses from years eleven through fourteen, the inheritance at year twenty-five, the social security benefits starting at year thirty, and the reverse mortgage starting at year forty are all evident in plot 520.

Figure 3A:
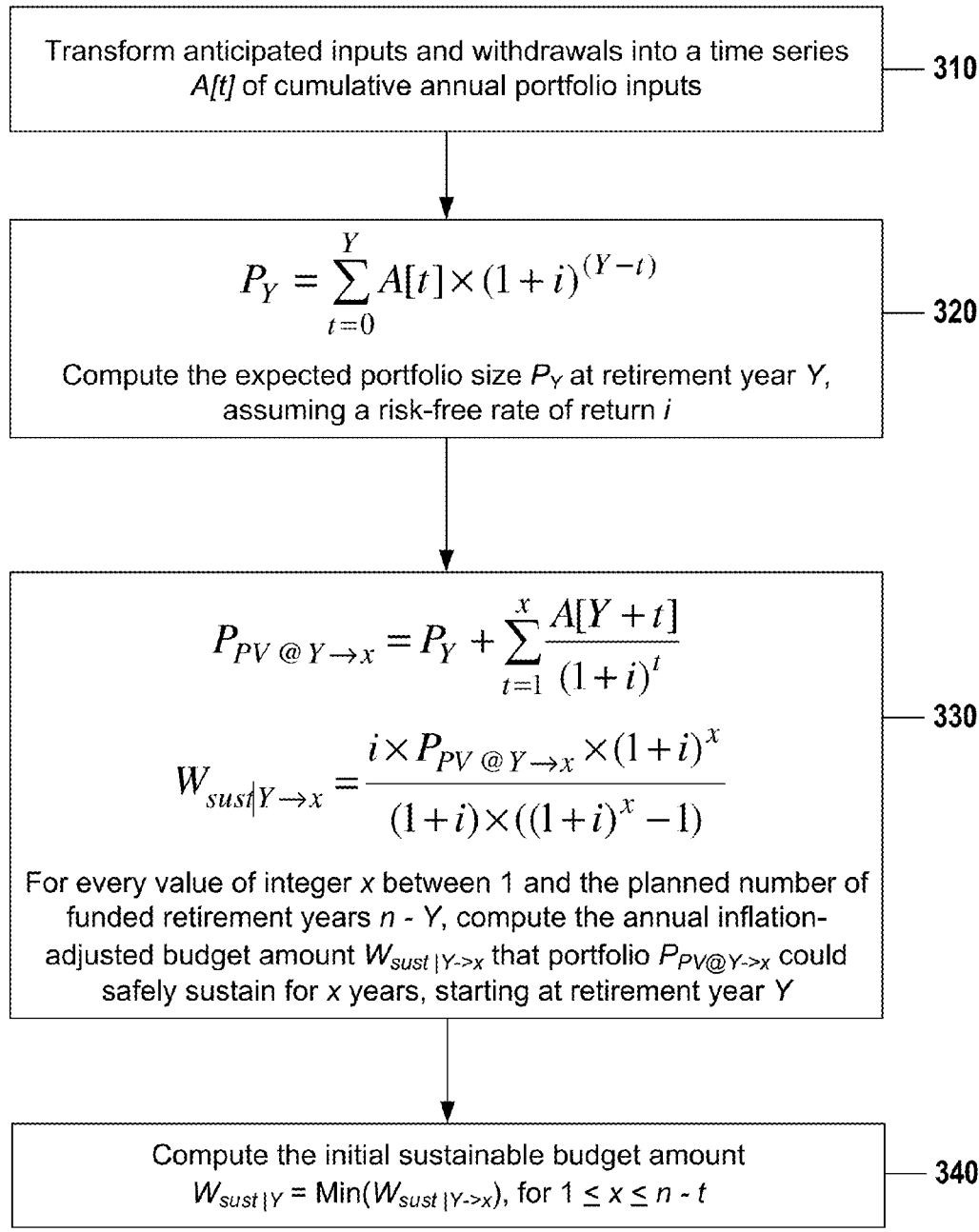
FIG. 3a is a flow chart of one embodiment of a method of computing an initial sustainable inflation-adjusted retirement retirement budget amount based on an amortization of current and anticipated resources.

2.1 Computing an Initial Sustainable Retirement Budget Supported by Amortization of a Risk-Free Portfolio FIG. 3a sets forth a method for computing a sustainable retirement budget that amortizes a complex set of portfolio inputs and outputs. Because this method is complex, it is helpful to first consider a straightforward solution to the simpler problem of FIG. 4. If one assumes that a single annual withdrawal is taken at the beginning of each year for a targeted or planned life n of a portfolio P that is fully invested in assets yielding a constant real rate of return i, then the following well-known amortization formula can be used to calculate the inflation adjusted, annual retirement budget $W_{sust}$ that portfolio P can sustain:

$$W_{sust} = \frac{i \times P \times (1+i)^n}{(1+i) \times ((1+i)^n - 1)} \quad (1)$$

Plugging the values illustrated in FIG. 4 into the above formula yields a sustainable inflation-adjusted annual retirement budget amount of approximately $31,199:

$$W_{sust} = \frac{.02 \times 10^6 \times (1.02)^{50}}{1.02 \times (1.02^{50} - 1)}$$

$$= \$31,1999.23$$

To determine the sustainable retirement budgets supported by a more complex set of inputs, like those of FIG. 5a, the baseline calculator 121 uses a software equivalent of the method 300 set forth in FIG. 3a. In step 310, the baseline calculator 121 first transforms all of the predefined anticipated inputs and withdrawals (other than the withdrawals that will be used to support the to-be-computed baseline retirement budget) into a time series of annual portfolio inputs, which is stored in an array A[t]. Each element of the array A[t] represents the sum of the inflation-adjusted amounts—not including investment gains, losses, or withdrawals to support the to-be-computed baseline retirement budget—expected to be added to or subtracted from the portfolio in year t. The first element of the array, A[0], includes the starting amount of the portfolio. A software subroutine that calculates the value of each element of the array is set forth in the "LoadPortfolio-Inputs" software subroutine in Appendix D to provisional application No. 61/233,476.

In step 320, the baseline calculator 121 computes the expected portfolio size $P_Y$ at retirement year Y. This calculation can be represented by following formula:

$$P_Y = \sum_{t=0}^{Y} A[t] \times (1+i)^{(Y-t)} \quad (2)$$

Equivalent means for calculating this amount, using a loop formula, are set forth in the "ComputeInitSafeWD" software subroutine in the Appendix to provisional patent application No. 61/093,432.

In step 330, the baseline calculator 121, using the well-known amortization formula discussed several paragraphs above, computes the annual inflation-adjusted retirement budget that portfolio $P_{PV@Y \to n-Y}$ could safely sustain, starting at retirement year Y and continuing through the remainder n-Y of the targeted portfolio duration n, where $P_{PV@Y \to n-Y}$ equals $P_Y$ plus the discounted value at retirement year Y (using the real risk-free rate of return i as a discount rate) of the remaining future portfolio inputs. Formulas for calculating $P_{PV@Y \to n-Y}$ and the sustainable retirement budget $W_{sust|Y \to n-Y}$ are set forth below, where x=n-Y:

$$P_{PV@Y \to x} = P_Y + \sum_{t=1}^{x} \frac{A[Y+t]}{(1+i)^t} \quad (3)$$

$$W_{sust|Y \to x} = \frac{i \times P_{PV@Y \to x} \times (1+i)^x}{(1+i) \times ((1+i)^x - 1)} \quad (4)$$

The calculations of $P_{PV@Y \to n-Y}$ and $W_{sust|Y \to n-Y}$ alone may not be satisfactory for situations in which a user is expecting a relatively large windfall or income stream several years after the retirement date. This present-value-based calculation, without more, could present a user with an initial sustainable amortized retirement budget that would result in a negative portfolio balance before the relatively large windfall or income stream commenced. Although one might assume that the user could bridge the temporary negative portfolio balance with a loan, many users would prefer to know a more conservative sustainable initial baseline retirement budget that would not result in a negative balance, with the assumption that the sustainable retirement budget would jump to a higher level when the relatively large windfall or income stream commenced.

To ensure that a user is presented with a conservative initial sustainable baseline retirement budget that would not result in a negative balance, the baseline calculator 121 performs multiple interim sustainable retirement budget computations using formulas (3) and (4) above for several different values of integer x between 1 and the planned number of funded retirement years n-Y. More specifically, the calculator 121 computes the inflation-adjusted retirement budget that portfolio $P_{PV@Y \to x}$ could safely sustain over a period of x years starting at retirement year Y, where $P_{PV@Y \to x}$ equals $P_Y$ plus the discounted value at retirement year Y (using the real risk-free rate of return i as a discount rate) of the next x years of portfolio inputs.

In step 340, the baseline calculator 121 identifies the minimum sustainable inflation-adjusted retirement budget that it computed, using formulas (3) and (4), for the several different values of x. A similar sustainable retirement budget computation is useful in the exploratory or Monte Carlo simulations, explained below in §5.1, for defining a dynamic minimum constraint on the annual retirement budget.

Generally, it is not necessary for the calculator 121 to perform the step 330 computation for every integer x between 1 and the targeted number of funded retirement years n-Y (i.e., the targeted total portfolio life minus the targeted retirement start year). Generally, it is sufficient, and certainly more computationally efficient, to perform this calculation only for the largest value of x and for intermediate values of x where the portfolio inputs and withdrawals for that year, i.e., A[Y+t], are different from the portfolio inputs and withdrawals for the following year, i.e., A[Y+t+1].

A software routine that performs the computations described above is set forth in the "ComputeDraw" software subroutine in Appendix D to provisional patent application No. 61/233,476.

2.2 Graphing Time Series of Amortized Retirement Budgets Supported by a Risk-Free Portfolio, Along with the Corresponding Size of the Amortized Portfolio As noted earlier, the financial planner and simulation system 100 not only computes the initial sustainable baseline retirement budget starting at retirement year Y, but also generates a graph 410 (FIG. 4) of the sustainable inflation-adjusted expenditures (including any temporary pre- or post-retirement withdrawals) that can be supported by amortization of the portfolio and other anticipated retirement income sources for each year of the portfolio life n.

Graphing the entire series of stable retirement budgets supported by a amortized portfolio, over the life of the portfolio, requires a more complex series of computations than simply computing the initial baseline retirement budget. The graphed series of retirement budgets should reflect not only the initial baseline retirement budget, but also any pre-retirement draws (for example, for college expenses), any user-specified temporary increases or decreases in the retirement budget, and any bump-up in the retirement budget facilitated by an anticipated post-retirement windfall (such as an inheritance or pension).

Figure 3B:
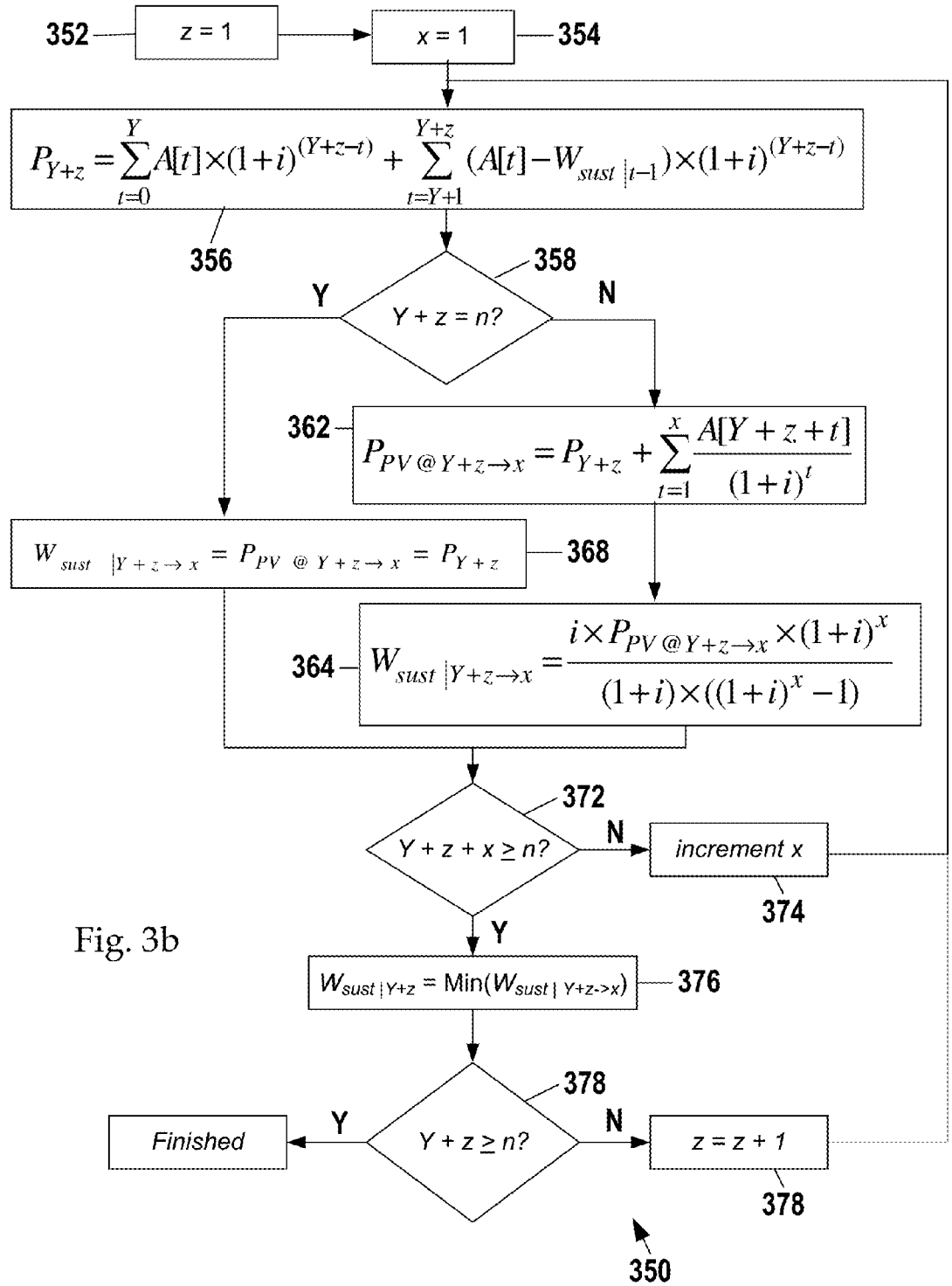
FIG. 3b is a flow chart of one embodiment of a method of computing sustainable inflation-adjusted retirement budgets for each year of retirement.

FIG. 3b illustrates a method 350 of generating a time series of sustainable retirement budgets supported by amortization of a risk-free portfolio which is used to populate the graph 410. The primary distinction between FIG. 3a's method and FIG. 3b's method is that FIG. 3a's method is concerned only with computing an initial retirement budget. FIG. 3a's method does not attempt to compute sustainable post-retirement increases in the retirement budget facilitated by an anticipated post-retirement windfall. By contrast, FIG. 3b's method computes the sustainable retirement budget for every year following the first year of retirement. And in computing the sustainable retirement budget for later retirement years, FIG. 3b's method accounts for the withdrawals taken in earlier retirement years from the portfolio.

FIG. 3b's method uses two indexing variables—a years-into-retirement variable z and a for-the-next-x-years variable x. The years-into-retirement variable z is used to compute the sustainable retirement budget for each year of retirement after the first year of retirement. The for-the-next-x-years variable x is used for the same purpose it is used in FIG. 3a's method—to ensure that a post-retirement windfall does not lead to a computation of a sustainable retirement budget that would result in a negative portfolio balance in the interim before the windfall occurred.

In steps 352 and 354, the years-into-retirement variable z and for-the-next-x-years variable x are initialized to one. In step 356, the system 100 computes the expected portfolio size $P_{Y+z}$ at year Y+z, for each year z into retirement from 1 to n-Y, where n is the total targeted duration of the portfolio (including pre-retirement years) and Y is the first retirement year. This calculation is represented by following formula (5), which is similar to formula (2) except that in computing the effect of post-retirement events to the expected portfolio size, formula (5) accounts for the depletion caused by withdrawals to fund sustainable retirement budgets in previous retirement years:

$$P_{Y+z} = \sum_{t=0}^{Y} A[t] \times (1+i)^{(Y+z-t)} + \sum_{t=Y+1}^{Y+z} (A[t] - W_{sust|t-1}) \times (1+i)^{(Y+z-t)} \quad (5)$$

In step 358, the system 100 determines whether it has reached the last year of the planned portfolio life—that is, whether the sum of Y and z equals n. If it does, then in step 368 the system 100 computes the sustainable retirement budget for that year as being equal to the remaining size of the portfolio.

If not, then in step 362, the system 100 computes the present value of the portfolio $P_{PV@Y+z \rightarrow x}$ at retirement year Y+z, which is equal to the sum of the expected portfolio size $P_{Y+z}$ at year Y+z plus the discounted value, at year Y+z, of the retirement income sources (and other portfolio inputs) anticipated over the next x years. Then, in step 364, the system 100 computes the annual inflation-adjusted retirement budget that the portfolio $P_{PV@Y+z \rightarrow x}$ could safely sustain over a period of x years starting at year Y+z, The calculations carried out in steps 362 and 364 are set forth by the following formulas (6) and (7), which are adapted for year Y+z:

$$P_{PV@Y+z \rightarrow x} = P_{Y+z} + \sum_{t=1}^{x} \frac{A[Y+z+t]}{(1+i)^t} \quad (6)$$

$$W_{sust|Y+z \rightarrow x} = \frac{i \times P_{PV@Y+z \rightarrow x} \times (1+i)^x}{(1+i) \times ((1+i)^x - 1)} \quad (7)$$

In step 372, the system 100 determines whether it needs to perform the calculations of formulas (6) and (7) for additional values of x. If so, then in step 374 variable x is incremented to the next value of x for which the portfolio inputs and withdrawals for that year, i.e., A[Y+t], are different from the portfolio inputs and withdrawals for the following year, i.e., A[Y+t+1], and the system 100 repeats steps 356-372. Once the system 100 has performed these computations for sufficient values of x, then in step 376, the system 100 identifies and stores the minimum calculated retirement budget for year Y+z in a time series array of sustainable inflation-adjusted retirement budget amounts. As stated earlier, the purpose of performing these computations for multiple values of x, and then selecting the minimum result, is to ensure that a post-retirement windfall does not lead to a computation of a sustainable retirement budget for any given retirement year that would result in a negative portfolio balance in the interim before the windfall occurred.

In step 378, the system 100 again evaluates whether we have calculated the retirement budget for the last retirement year of the planned portfolio duration. If not, then in step 378 the system 100 increments z and repeats steps 356-378. In this manner, the system 100 calculates a sustainable retirement budget for each retirement year z.

After computing a time series array of sustainable inflation-adjusted retirement budgets as set forth above, any temporary additional expenses or withdrawals indicated by negative values of A[t] are also added to the array. The resulting time series is then plotted versus time on a computer-generated graph 410 (FIG. 4) or 510 (FIG. 5b).

It is also insightful to plot the size of the portfolio versus time, showing its growth and depletion over time. This information can be plotted against a second Y-axis of the same plot that shows the retirement budgets versus time. Alternatively, this information can be plotted on a second computer-generated plot 420 (FIG. 4) or 520 (FIG. 5b) distinct from but located near or next to the first computer-generated plot.

A software routine that performs the calculations needed to generate the time series array of retirement budgets and corresponding portfolio sizes is set forth in the "DrawSafeStats" software subroutine in the Appendix to provisional application No. 61/093,432. As noted earlier, FIG. 4 illustrates computer-generated plots 410 and 420 of the sustainable inflation-adjusted retirement budget 415 (including future portfolio inputs like social security) and draw-depleted portfolio-size 425, versus year, from a baseline portfolio fully invested in relatively risk-free assets but that is otherwise based on the inputs set forth in FIG. 4. The financial planner and simulation system 100 also optionally displays a curve 412 representing the probability, as a function of time, of a single investor, or the probability of one or both of two investing spouses, surviving x years from now, on a second Y-axis of either computer-generated plot 410 or computer-generated plot 420.

2.3 Special Treatment of Planned Bequest

The financial planner and simulation system 100 also models the sustainable retirement budget that a portfolio could support, if the investor's goal was to leave a targeted amount to his or her heirs at the end of the targeted portfolio duration.

For example, imagine an investor wants to identify a plan that is likely to enable him or her to leave $100,000 to his or her heirs. Code to support this bequest goal is shown in the "ComputeDraw" module in Appendix D to provisional patent application No. 61/233,476. The "LeaveInheritance" amount is loaded as the negative of the value set forth in the corresponding spreadsheet input 179 (FIG. 6c).

The modified "ComputeDraw" routine of Appendix D to provisional patent application No. 61/233,476 includes a bug: the first reference to the "LeaveInheritanceAmount" variable in that routine should be replaced with a zero. The second reference to the "LeaveInheritanceAmount" variable is appropriate. To prevent the ComputeDraw routine from ever returning a negative amount, the last line of the routine should be modified to return the maximum of the current algorithm output and zero. The "DrawSafeStats" and "Simulate" routines should also be modified to place a ceiling on withdrawals from the portfolio equal to the total size of the portfolio.

2.4 Calculating the Amortized Retirement Budget that could be Sustained by a Portfolio Delivering a Fixed Rate of Return Equal to the Risky Asset Class's Expected Real Annualized Return Another baseline calculator 121 computes the amortized inflation-adjusted retirement budget 183 (FIGS. 2i, 6c), starting at retirement, that a portfolio could support if it delivered a fixed rate of return equal to the expected real annualized return on the risky asset class. This computation signals to an investor that even if she fully invests her present and future wealth in assets from a risky asset category, and the actual returns deliver the median expected return for such a portfolio, it would likely only sustain a retirement budget equal to this hypothetical sustainable retirement budget 183.

This computation is done identically to the sustainable retirement budget computation described in §2.1, except that an interest rate r equal to the risk-free rate i 151 plus the geometric expected risk premium 152 (FIG. 6*c*) is used in place of the risk-free rate i 151.

2.5 Projecting the Amortized Retirement Budget that could be Sustained by a Portfolio Delivering a Fixed Rate of Return Equal to the Rebalanced Portfolio's Expected Real Annualized Return Yet another baseline calculator 121 computes the amortized inflation-adjusted retirement budget 184 (FIGS. 2*i*, 6*c*), starting at retirement, that a mixed portfolio could support if it delivered a fixed rate of return equal to the mixed portfolio's expected real annualized return. The mixed portfolio's expected real annualized return—discussed below in §2.6—is a function both of the mixed portfolio's asset allocation 161, the variance of the two asset classes, and the covariance between the asset classes.

The resulting value signals to investors that if they invest their present and future wealth in accordance with their selected asset allocation, and faithfully rebalance their mixed portfolio, and the risky asset category delivers the expected performance, the mixed portfolio would likely sustain a retirement budget equal to this hypothetical sustainable retirement budget 184. This calculation is also useful in the exploratory and Monte Carlo simulations described below in §5.1 for defining a dynamic maximum constraint or ceiling on the annual retirement budgets in any simulation trial.

This computation is also done identically to the sustainable retirement budget calculation described in §2.1, except that an interest rate r equal to the expected total return 655 (FIG. 6*c*) from a rebalanced portfolio having the user-indicated asset allocation is used in place of the risk-free rate i. Accordingly, it is important to understand how the system computes the expected total return 655 from a rebalanced portfolio.

2.6 Computing the Return of a Rebalanced Portfolio

The expected return of a mixed portfolio that is regularly rebalanced is more than the weighted sum of the expected returns of its constituents. This is because rebalancing forces an investor to sell assets from a relatively faster-growing (or slower-shrinking) asset category and use the proceeds to buy assets in the relatively slower-growing (or faster-shrinking) asset category. To the extent that the asset classes are non-correlated, the volatility in the two asset classes leads a disciplined investor to sell high and buy low to rebalance the portfolio.

The expected geometric return r from a portfolio that is repeatedly rebalanced between asset categories A and B is estimated using the following equation:

$$r = i + \alpha \times g + \alpha \times (1-\alpha) \times \left( \frac{\text{Var}(A) + \text{Var}(B)}{2} - \text{Cov}(A, B) \right) \quad (8)$$

where α is the amount allocated in category B, i and Var(A) are the expected geometric return and variance of returns of category A, g and Var(B) are the expected geometric risk premium and variance of returns in category B, and Cov(A,B) is the covariance of categories A and B. When category A is treated as a risk-free asset category with zero variance and covariance, the foregoing equation for the expected geometric return r reduces to:

$$r = i + \alpha \times g + \alpha \times (1-\alpha) \times \frac{\text{Var}(B)}{2} \quad (9)$$

2.7 Computing an Ideal Annuity Benefit from a Cost-Free Annuity Provider

Another baseline calculator 121 computes the annual inflation-adjusted benefit that one could anticipate from an "ideal annuity." An "ideal annuity" would be the annual inflation-adjusted benefit $J_Y$, starting at retirement year Y, that a zero-overhead, profitless annuity provider (were such an annuity provider to exist) would provide in exchange for all of the current and future anticipated portfolio assets of an investor and his or her spouse, if any, who had average life expectancies. Although such annuity providers do not exist, many pension plans provide beneficiaries with a choice between a lump sum and an annual pension benefit that approximates the relationship computed here.

The baseline calculator 121 uses the following formula to compute the "ideal annuity" amount $J_Y$:

$$J_Y = \frac{\sum_{t=0}^{119} \frac{A[t] \times L[t]}{(1+i)^t}}{\sum_{t=Y}^{119} \frac{L[t]}{(1+i)^t}} \quad (10)$$

The array L[t] above sets forth the probability, for values of t between 0 and 119 years, that either a single investor, or at least one of two investors, will be alive t years from now. Below, §11 explains how the system 100 generates values for array L(t) from a period life table.

The calculation of an ideal annuity amount assists an investor in deciding whether to delay social security benefits, whether to consider purchasing an annuity, and whether any available annuity offers a good value compared to investing in risk-free assets or compared to investing in a mixed portfolio. A software routine that performs computations needed to compute the ideal annuity amount is set forth in the "ComputeIdealAnnuity" software subroutine in the Appendix to provisional application No. 61/093,432.

2.8 Calculating the Present Value and Modeling the Purchase of an Inflation-Adjusted Longevity Annuity Yet another baseline calculator 121 computes the present value of a maximum-income, inflation-adjusted longevity annuity (with no death benefit) that would provide the investor and investor's spouse, if any, with income security should either live beyond the expiration of the targeted portfolio duration. The calculator 121 calculates what the present value of such an inflation-adjusted longevity annuity would be, if it had the following characteristics: (1) its payouts would begin the year following the expiration of the user's targeted portfolio duration, if there were still any surviving spouse; (2) the annual benefit would be equal to the difference between the user's targeted annual retirement budget and all other lifetime retirement income sources (such as Social Security); and (3) its payouts would continue through the lifetime of the last surviving spouse. The present value is calculated using the TIPS real rate of return as the discount rate. In other words, the annuity payment, in combination with other income sources like Social Security, would enable the investor to continue spending the targeted amount long after the investor exhausted his or her retirement savings.

To put it another way, the longevity annuity would provide "gap income" that would be added to the investor's Social Security and other lifelong income sources to meet the investor's targeted retirement budget needs. To calculate the amount of "gap income" the longevity annuity would need to provide, the baseline calculator 121 takes the targeted retirement budget 173 and subtracts the investor's expected social security and any other joint life pension or annuity amounts the investor has designated. Then the calculator 121 computes the sum, from the year after the expiration of the investor's targeted portfolio duration, to the year the investor would turn 120 years old, of the products of the discounted value of the "gap income" times the probability of one survivor living to that year. The "gap income" for any given year is preferably discounted to the present by the risk-free interest rate.

2.9 Extending Invention to Portfolios of Unspecified Duration

The baseline equations provided in §2.1-2.5 and the simulated retirement budgets discussed below in §5 are derived from the amortization formula and assume, by default, a pre-specified but unchanging time frame for the duration of the portfolio. An alternative approach when calculating a retirement budget in any given year is to assume that the portfolio needs to last for an actuarially-calculated period that has at least an 80% or other selected percentage chance of sustaining the investor and his or her spouse, if any, for the remainder of their lives. As any given series of consecutive calculations progresses, the actuarially-calculated period would diminish, but at a rate of less than one year for every additional year of life. This approach to computing retirement budgets would yield retirees greater benefits at an early age, where there is a higher probability of them being alive to enjoy those benefits, than at a later age, thereby increasing the overall utility of the investors' portfolio.

3. Exploratory Simulator

The financial planner and simulation system 100 includes an exploratory simulator 125. FIG. 6*f* illustrates an exploratory simulation option on a graphical user interface for the system 100. The exploratory simulator 125 tests an investor's financial plan against modified return data. One embodiment uses a historical real return data set for the S&P 500 Index dating back to 1871. Other embodiments would use historical return data sets for other markets, such as international, emerging, and frontier markets.

Exploratory simulation puts the investor back in time—for example, back to January 1871, or July 1921, or August 1954—and tests how that investor's portfolio would have performed from that point through the end of the investor's targeted portfolio duration. A different trial is performed against every available interval of the data set. Such an exploratory simulation inherently incorporates all of the mean reverting behavior and serial return correlation in the market.

Exploratory simulation circumvents the need to develop ever more complex return distribution models, and for users to specify their ever more difficult-to-understand parameters, in order to more realistically simulate historical stock performance. Instead of trying to design and parameterize a model that best fits the data, exploratory simulation uses the actual data itself.

But unless a historical return data set is modified for use in a simulation, exploratory simulation (at least with respect to historical S&P 500 returns) is likely to suffer from at least two significant defects: (1) exaggerated, unrepeatable return assumptions; and (2) unequal sampling of data points.

The use of historical returns, without any adjustment for present-day realities, is potentially misleading. Between 1871 and 2008, the S&P 500 experienced an annualized real return (including reinvested dividends) of 6.4%. It is arguably unrealistic to assume that future stock market returns will be anywhere nearly as generous.

Typical exploratory simulations also results in unequal sampling of data points. For example, if one were to test a 30-year targeted portfolio duration against a real return data set spanning from 1871 to 2008, the returns in the 1901-1978 span would be tested more often than the returns on the tail ends of the data set.

The exploratory simulator 125 addresses both of these problems. In a preferred embodiment, the exploratory simulator 125 stores the real monthly returns (including reinvested dividends) of the S&P 500 all the way back to January 1871. The exploratory simulator 125 then proportionally scales its set of historical S&P 500 return data to match the annualized return and (optionally) standard deviation specified by the investor. To avoid disparate sampling of the return data, the exploratory simulator 125 also "loops" its data set. The most recent return in the data set would be followed by the January 1871 return. Accordingly, all data points within the data set are sampled the same number of times.

The exploratory simulator 125 scales and loops the historical S&P 500 return data by carrying out the following steps: (1) convert the expected annualized real expected risk premium into an expected geometric monthly return; (2) compute the geometric monthly real return over the entire data set (e.g., from 1871-2008); (3) generate an extended historical data set that splices in older returns after the most recent return data point (e.g., January 1871, February 1871 . . . November 2008, December 2008, January 1871, February 1871, . . . ); (4) compute the real "next year's" returns over all 12-month rolling periods, starting from the oldest data point in the data set (e.g., January 1871) through the most recent data point (e.g., December 2008) in the set; (5) compute the standard deviation of all the 12-month real return data points generated in step (4); (6) multiply each monthly real return data point in (4) by the expected standard deviation divided by the historical standard deviation computed in (5); (7) subtract the difference between the historical geometric monthly real return and the expected geometric monthly return from each modified monthly return data point in (6); (8) again compute the real "next year's" returns over all 12-month rolling periods from the modified set of (7); (9) compute the standard deviation of all the 12-month real return data points generated in step (8); (10) multiply each monthly real return data point in (7) by the expected standard deviation divided by the historical standard deviation computed in (9); (11) compute the geometric monthly real return over the unrepeated portion (e.g., from 1871-2008) of the modified data set of (10); (12) subtract the difference between the geometric monthly real return computed in (11) and the expected geometric monthly return from each modified monthly return data point in (11); and (13) again compute the real "next year's" returns over all 12-month rolling periods from the modified set of (12).

To summarize, for every month of this mean-adjusted and looped 1600+ month historical data set, the exploratory simulator 125 calculates the subsequent 12-month return. (For the last 11 months of the data set, the exploratory simulator 125 wraps back to the beginning of its data set—i.e., 1871—to calculate the 12-month return going forward).

To simulate a portfolio, the exploratory simulator 125 tests a user's portfolio against every available start date in the modified and looped data set. For example, one simulation trial would test the user's portfolio against an interval of modified S&P 500 data starting with January 1871. The next simulation trial would test the user's portfolio against an interval that started with February 1871. And so on. For trials starting more recently, the exploratory simulator 125 wraps back to the beginning of its data set (1871) after simulating the last return in its historical data set. Every exploratory simulation, in this embodiment, tests a user's financial plan against over 1600 intervals of modified historical data. Every exploratory simulation also samples every modified historical data point equally.

4. Monte Carlo Simulator

The financial planner and simulation system 100 also includes a Monte Carlo simulator 123 as an alternative to exploratory simulation. FIG. 6e illustrates four Monte Carlo simulation options on a graphical user interface for the system 100. The Monte Carlo simulator 123 simulates the impact on a portfolio of various projected portfolio inputs (e.g., current and future savings, income, and temporary expenses), the expected rate of return i on relatively risk-free asset category investments, the assumed distribution of returns of risky-asset category investments, the percentage of assets α allocated to the risky asset category, and the investor's targeted retirement budget parameters.

The Monte Carlo simulator 123 simulates the life of a mixed portfolio multiple times, at least 1000 times and preferably as many as 10,000 or more times. For each year of a given simulation, the Monte Carlo simulator 123 assumes that investments in the risky asset category will have a randomly distributed return, that the remainder of the investments will yield an approximately risk-free rate of return i 151 (FIG. 6c), and that the distribution of assets between the risky asset category and the relatively risk-free asset category is rebalanced every year to approximate a predetermined, time-dependent, or valuation-dependent asset allocation distribution between the two asset categories. If the investor's asset allocation is programmed to be valuation-dependent, then the simulator 123 also keeps track of the cumulative simulated performance of the risky asset category and computes an asset allocation amount that is dependent on that cumulative simulated performance.

Starting with the selected retirement date, the Monte Carlo simulator 123 also computes a simulated retirement budget in accordance with the user's targeted retirement budget parameters. The simulator 123 stores each simulated year's retirement budget, which includes not only withdrawals from the portfolio but also amounts drawn from additional income sources such as social security, into an array.

The simulator 123 also computes the size of the portfolio for each year of the simulation, storing the result in an array. In computing the portfolio size, the simulator 123 not only computes the annual investment-based growth and contraction of the portfolio, but also adds any designated contributions or new portfolio additions and income sources to the portfolio. In computing the portfolio size, the simulator 123 also subtracts withdrawals needed to support the simulated retirement budget and any other user-defined portfolio outflows from the portfolio in accordance with the user's portfolio inputs.

The following sections explain several distribution modeling options for the simulator 123 and the how the simulator 123 corrects for variance drag, models distributions of risky asset returns, simulates dynamic asset allocations and retirement budget amounts, computes summary statistics, and ranks, sorts, and plots simulation results.

4.1 Modeling Annual Returns as being Normally Distributed

The Monte Carlo simulator 123 preferably enables, as one option (FIG. 6g), the simulation of equity returns as if they were normally distributed. Each simulated return would be calculated as the sum of 1 plus the risk-free yield plus the expected risk premium plus the standard deviation times a normally distributed random number. Shortcut techniques for generating the normally distributed random number may be employed.

Because there is a finite chance, with an unmodified normal distribution, of having a return event worse than −100%, the Monte Carlo simulator 123 preferably truncates the low end of the tail of the normal distribution at −100%.

4.2 Modeling Annual Returns as being Log-Normally Distributed

The Monte Carlo simulator 123 preferably enables, as another option (FIG. 6h), the simulation of equity returns as if they were log normally distributed with a mean arithmetic return $\mu_a$ and a variance $\sigma^2$ representative of the width of the distribution.

If a random variable Y is log normally distributed, then log(Y) is normally distributed. Stated another way, if the returns of the risky-asset category are log normally distributed, then the logs of those returns are normally distributed.

The log of the distribution—i.e., log(Y)—has a variance $\sigma'^2$ that has the following mathematical relationship to the log normal mean and standard deviation $\mu_a$, $\sigma^2$:

$$\sigma'^2 = \ln\left(\frac{\sigma^2}{(1+\mu_a)^2} + 1\right) \quad (13)$$

The log of the distribution also has a mean $\mu'$ that has the following mathematical relationship to $\mu_a$ and $\sigma'^2$:

$$\mu' = \ln(1+\mu_a) - \frac{\sigma'^2}{2} \quad (14)$$

A randomly sampled return q from a normal distribution with a mean $\mu'$ and variance $\sigma'^2$ can be generated with a pseudo-random number s having a unit normal distribution in accordance with the following formula:

$$q = \mu' + s \times \sigma' \quad (15)$$

where s is a random variable with a unit normal distribution.

From this, it follows that a randomly sampled return q from a log normal distribution with mean $\mu_a$ and variance $\sigma^2$ can be calculated by the formula:

$$q = e^{\ln q} = e^{\mu' + s \times \sqrt{\sigma'^2}} = e^{\ln(1+\mu_a) - 0.5\sigma'^2 + s \times \sqrt{\sigma'^2}}$$
$$\sqrt{\sigma'^2} = (1+\mu_a)e^{-0.5\sigma'^2 + s \times \sqrt{\sigma'^2}} \quad (16)$$

The Monte Carlo simulator 123 computes values for $\sigma'^2$ and q using the equations above to simulate a log normally distributed return. To generate a random seed s having a unit normal distribution for use in the equation q above, the Monte Carlo simulator 123 uses a suitable algorithm for transforming one or more pseudo-random variables v that are uniformly and pseudo-randomly distributed between 0 and 1 into a normally distributed random seed s. One of many different suitable algorithms is the Box-Muller transform, which transforms two random variables $v_1$ and $v_2$ into a normally distributed random seed s using the following formula:

$$s = \cos(2\pi v_1)\sqrt{-2\ln(v_2)} \quad (17)$$

Another technique is to take the sum of 12 (or more) random numbers that are uniformly distributed between 0 and 1 and subtract 6 (or one-half the number of random numbers summed) from that value. Other, less computationally expensive algorithms are available for generating normally-distributed random seeds.

In another embodiment, risky-asset investment returns are assumed to be approximately normally (rather than log normally) distributed with a mean return $\mu$ and a variance $\sigma^2$ representative of the width of the distribution. In yet other embodiments, risky-asset investment returns are assumed to be approximately distributed like a Student's-t distribution with a mean return $\mu$, a variance $\sigma^2$, and a given degrees of freedom parameter. In yet another embodiment, expected risk-asset investment returns are randomly sampled from a mean-adjusted distribution of a selected set of historical returns. Persons of ordinary skill in the art will recognize other distributions that may be assumed to characterize the dispersion of potential returns from the risky-asset category.

4.3 Modeling Annual Returns as being Double Log Normally Distributed

The Monte Carlo simulator 123 optionally enables, as yet another option (FIG. 6*i*), the simulation of equity returns as if they were double-log normally distributed.

One interesting observation about stock returns is that they are often characterized by long periods of relative calm that are punctuated by periods of extreme volatility. This is starkly illustrated by the "Implied Volatility" of the S&P 500 based on options market prices.

A graph of the implied volatility index, or VIX, shows how the volatility has varied between 1990 and 2009. The market was characterized by periods of high volatility from mid 1990 through mid 1991, from late 1997 through 200, and again, from mid-2007 to date. In between those periods, the market was predominantly characterized by relatively stable, low-volatility returns.

Notability, the volatility of the VIX (i.e., the volatility of the implied volatility of the S&P 500)—which covers a relatively short time range of 1990 to 2009—itself has a roughly log normal shape. A best-fitting log normal to this distribution has a geometric mean of about 16.3% and a geometric standard deviation of about 7.3%.

These observations inspired the development of a "double log normal" return distribution model. This distribution model has three parameters—a geometric mean return, a first-order volatility parameter, and a second order volatility parameter—and uses two log normal distributions. The first log normal distribution is centered by the geometric mean parameter. But its volatility varies from year to year. The simulated value for the first log normal distribution's standard deviation is randomly drawn from the second log normal distribution. The second log normal distribution is centered around the first-order volatility parameter and its width is defined by the second-order volatility parameter.

Interestingly, an experimental double log normal distribution with a geometric mean of 6.4%, a first-order volatility parameter of 16.3%, and a second-order volatility parameter of 7.3% fits the historical S&P 500 data set pretty well. Importantly, the low end of the cumulative frequency distribution of the simulated versus historical S&P 500 annual return values (with overlapping 12 month series) indicates that this experimental double log normal provides a good fit to the low end of the historical distribution.

Examination of the double log normal distribution reveals it to be heteroskedastic and leptokurtic, which may better fit historical return data.

Some software code for modeling returns as if they were double log normally distributed is set forth in Appendix C to provisional application No. 61/233,476.

4.4 Modeling Annual Returns by Randomly Drawing Returns from a Historical Distribution The Monte Carlo simulator 123 optionally enables, as yet another option (FIG. 6*j*), the simulation of equity returns by sampling them randomly, with replacement, from a distribution of historical returns. Unlike the "exploratory simulation" model, this option effectively scrambles the historical return data together as if each return was entirely independent from every other.

As with the "exploratory simulation" option, this option scales the historical data set to match the expected annualized return and standard deviation parameters specified by the user.

4.5 Correction for Variance Drag

When the financial planner and simulation system 100 provides the user with a field to input either the expected yield, or the expected risk premium 152, of the risky asset category, the financial planner and simulation system 100 asks the user to provide, and assumes the user is providing, an expected geometric (or more specifically, where the system 100 simulates return on an annual basis, an annualized) mean return or return premium over the expected risk-free rate 151. But the returns of the risky-asset category will have a probability distribution that is centered on an arithmetic mean return, not on the entered geometric mean return.

It is a common mistake to simulate risky asset category returns with the assumption that the distribution of returns is centered on the expected geometric mean return of the risky asset category. To illustrate, imagine an asset category that has the following series of returns: 30%, 30%, −10%, and 10%. The distribution of the series of returns is centered around the arithmetic mean return, which is (30%+30%−10%−10%)/4=10%. But the geometric mean return is (1.3× 1.3×0.9×0.9)^0.25−1=8.1%. If one simulated that asset category using a distribution centered around 8.1%, rather than 10%, the resulting simulation would underestimate the performance of the risky asset category.

The difference between the arithmetic and geometric mean returns is sometimes referred to as the "variance drag." Fortunately, the relationship between the geometric mean return $\mu_g$ and the arithmetic mean return $\mu_a$ of a normally distributed random variable with variance $\sigma^2$ can be approximated with a relatively high degree of accuracy for equity returns with typically applicable volatilities. One suitable approximation is:

$$\mu_a \approx \mu_g + \frac{\sigma^2}{2} \tag{11a}$$

Another suitable approximation is:

$$\mu_a \approx \sqrt{(1+\mu_g)^2 + \sigma^2} - 1 \tag{12}$$

Applicant uses a slightly different formula to approximate the variance drag of a double log normal distributions:

$$\mu_a \approx \mu_g + \frac{\sigma_1^2 + \sigma_1 * \sigma_2}{2} \tag{11b}$$

Where $\sigma_1$ and $\sigma_1$ are the first and second order volatility parameters, respectively.

To correct for the variance drag, the financial planner and simulation system 100 first computes an approximate arithmetic mean return $\mu_a$ for the risky asset category from the assumed mean geometric return $\mu_g$, preferably using one of the equations above. This approximate arithmetic mean return $\mu_a$ is then fed to the Monte Carlo simulator 123, which uses it to simulate randomly distributed returns for the risky-asset category.

4.6 Modeling Valuation-Dependent Distributions of Risky-Asset Returns

Figure 8:
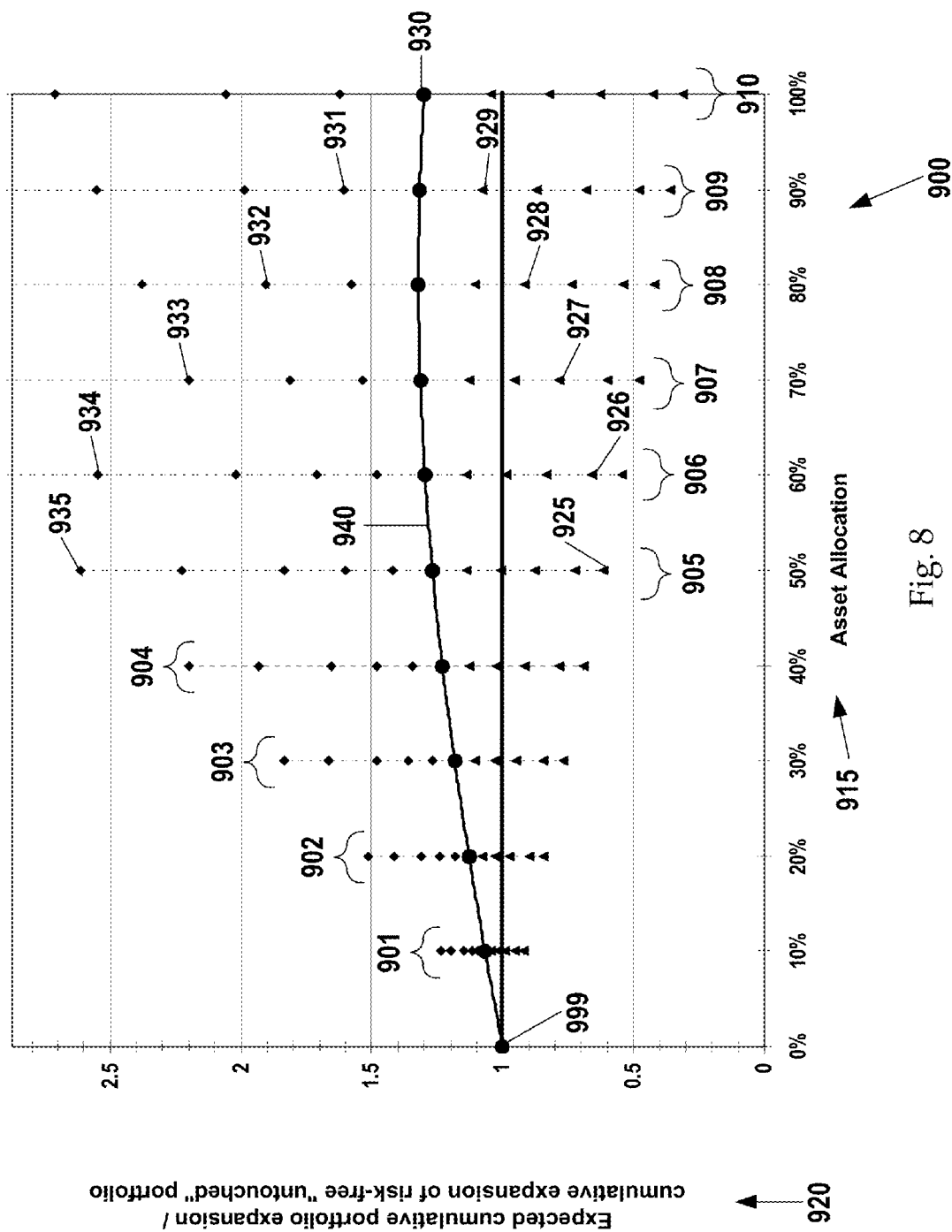
FIG. 8 provides another scatter plot illustrating different simulated cumulative expansions over a twenty-seven-year time frame, relative to the expected cumulative expansion of a relatively risk-free baseline portfolio over that same time frame, of ten mixed portfolios ranging from a 10% asset allocation to a 100% asset allocation, in 10% increments.

A fundamental assumption underlying the use of a stationary statistical distribution (such as a normal or log normal distribution) from which returns are randomly drawn with replacement is that each return is independent from every other. But if real-world returns are not entirely independent of each other, modeling returns as if they strictly follow a random walk may dramatically exaggerate the risk of equity investments when considering long-term, cumulative results. FIG. 8, which was generated using techniques described below in §7.1, exemplifies the extreme dispersion of simulated cumulative returns, illustrated by a wide distribution of projected portfolio sizes after a period of some 27 years, that follows from the assumption that risky-asset returns are entirely independent of past returns.

The assumption that risky asset returns are independently and identically distributed implies that the risky asset's expected return is entirely independent of its valuation. While the independence of sequential probabilities is true for a fair coin—i.e., there is equal probability of flipping heads or tails even if the past ten coin flips have all landed tails—an argument can be made that it is unreasonable to assume that future equity or other risky-asset returns are entirely independent of past returns.

Applicant believes that the forward-looking expected return of a risky-asset category is, and should be modeled as, valuation-dependent. It tends to decrease as the category becomes relatively richly valued, and to increase as the category becomes relatively poorly valued.

According to the dividend discount model, the long-term real expected return on a stock that is yielding dividends is equal to its dividend yield plus the expected long-term real growth in those dividends. This principal can be extended to the entire stock market: the long-term real expected return on the total stock market is equal to its dividend yield plus the expected long-term real growth. Moreover, in the long run, the stock market cannot grow faster than the economy it represents. Therefore, the long-term real expected return on the total stock market cannot be greater than its dividend yield plus the expected long-term real growth in the economy.

A valuation-dependent approach to projecting risky asset returns finds support in Robert D. Arnott's and Peter L. Bernstein's controversial, against-the-mainstream paper "What Risk Premium is 'Normal'" published in the March/April 2002 issue of the *Financial Analysts Journal*. There, the authors argued that future long-term real returns on stocks could be expressed by the following formula, which is derived from the Dividend Discount Model:

$$ERSR(t) = EDY(t) + ERGDP(t) + EDGR(t) \quad (18)$$

where

ERSR(t)=expected real stock return for stocks at time t;

EDY(t)=expected percentage dividend yield for stocks at time t;

ERGDP(t)=expected percentage real per capita GDP growth over the applicable span starting at time t; and EDGR(t)=expected annual percentage dilution of real per capita GDP growth as it flows through to real dividends starting at time t.

For example, if the expected immediate dividend yield on a broad stock market index is 2% (EDY(t)=2%), real per capita GDP is expected to grow 2% per year (ERGDP(t)=2%), and the broad stock market is expected to capture all but 1% of that growth (i.e., EDGR(t)=−1%), then the expected real stock return ERSR(t) is 3% (i.e., 2%+2%−1%=3%). If the applicable real risk-free rate is 2%, then the broad stock market provides an expected "risk premium" of 1% (i.e., 3%−2%=1%).

The Arnott & Bernstein model of stock returns also implies that expected risk premiums can change over time. For example, if the market suddenly declined by 33%, without a cut in dividends, then the dividend yield would increase by 50%. Assuming the risk-free rate of return, expected per-capita GDP growth, and expected dilution variables stayed the same, this increased dividend yield would increase the expected risk premium. The change in the expected risk premium ΔERP(t), as a function of the percentage increase or decline in the market's relative valuation of stocks ΔMV can be expressed as follows:

$$\Delta ERP = DY(t_1) \times \left( \frac{1}{1 + \Delta MV} - 1 \right) \quad (19)$$

For example, a relatively rapid 33.3% decline in the stock market would be represented by ΔMV=−0.333, resulting in an increase in the expected risk premium equal to 50% of the pre-decline dividend yield. A relatively rapid 25% increase in the stock market would be represented by ΔMV=0.25, resulting in a decrease in the expected risk premium equal to 20% of the pre-decline dividend yield.

Applicant has devised different methods to simulate a valuation-dependent distribution of risky-asset returns. Each of the methods employ a non-stationary return distribution, one that is annually re-centered about a recalculated, valuation-dependent mean. In one method utilizing a dividend-yield model of investment returns, the Monte Carlo simulator 123 computes a mean return μ(t) for each year t of a simulation as the following function of a valuation ratio V(t) and an initial market valuation metric such as the dividend yield DY(0):

$$\mu(t) = \mu(0) + DY(0) \times \left( \frac{1}{V(t)} - 1 \right) \quad (20)$$

where μ(0) is the mean expected real risky asset return at the beginning of the simulation, DY(0) is the dividend yield of the risky asset category at the beginning of the simulation, and valuation ratio V(t) is equal to the cumulative simulated return by year t divided by the cumulative expected return by year t.

Figure 6K:
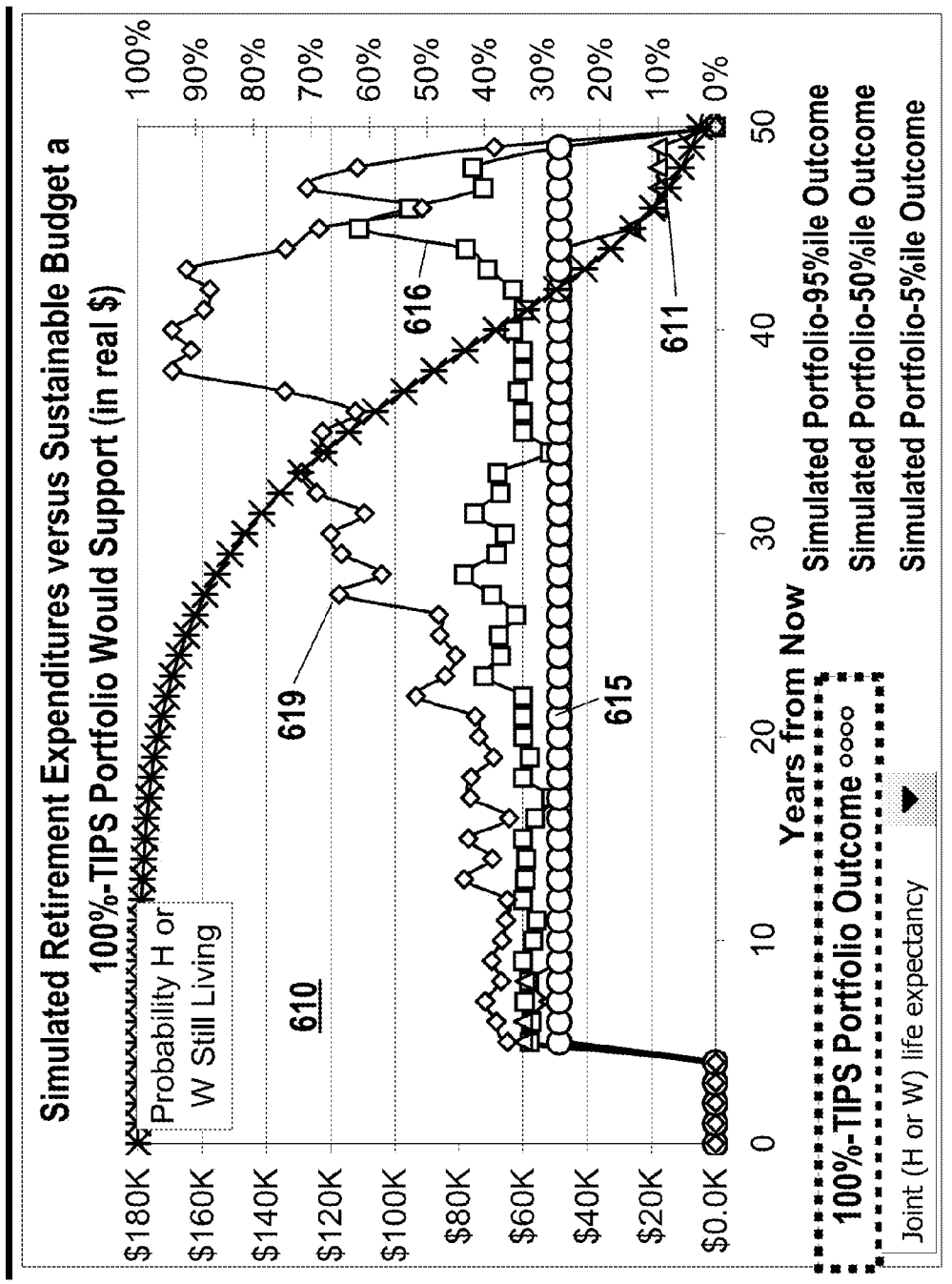
FIG. 6k illustrates a first plot of the worksheet of FIG. 6a after a simulation of the portfolio using a mean-reverting double log normal distribution, displaying simulated series of retirement budgets supported from the five, fifty, and ninety-five percentile ranked simulated trials of a mixed portfolio, and contrasting these series with a life expectancy curve and the projected sustainable amortized retirement budget from a relatively risk-free baseline portfolio.
Figure 61:
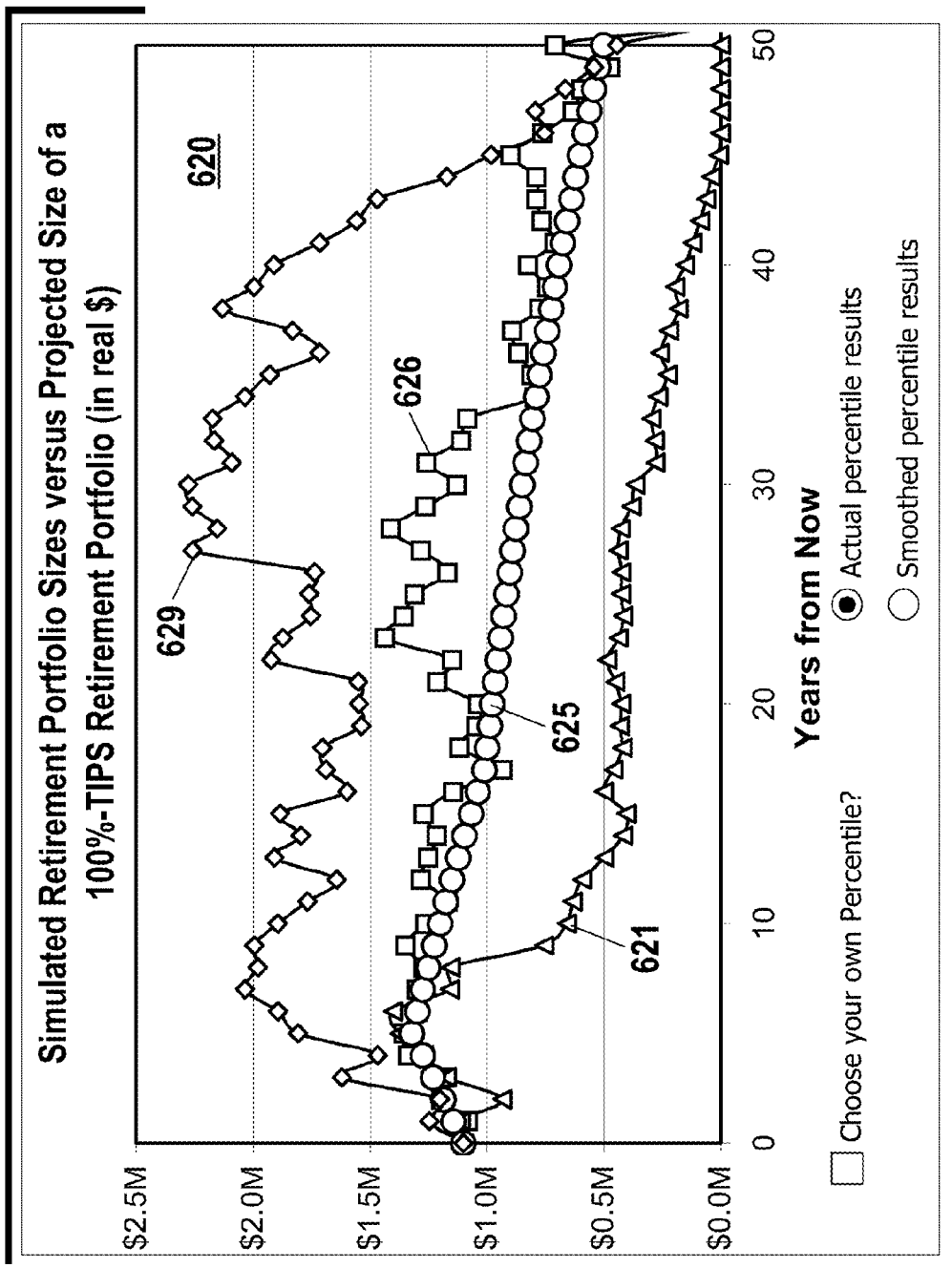
Figure 6M:
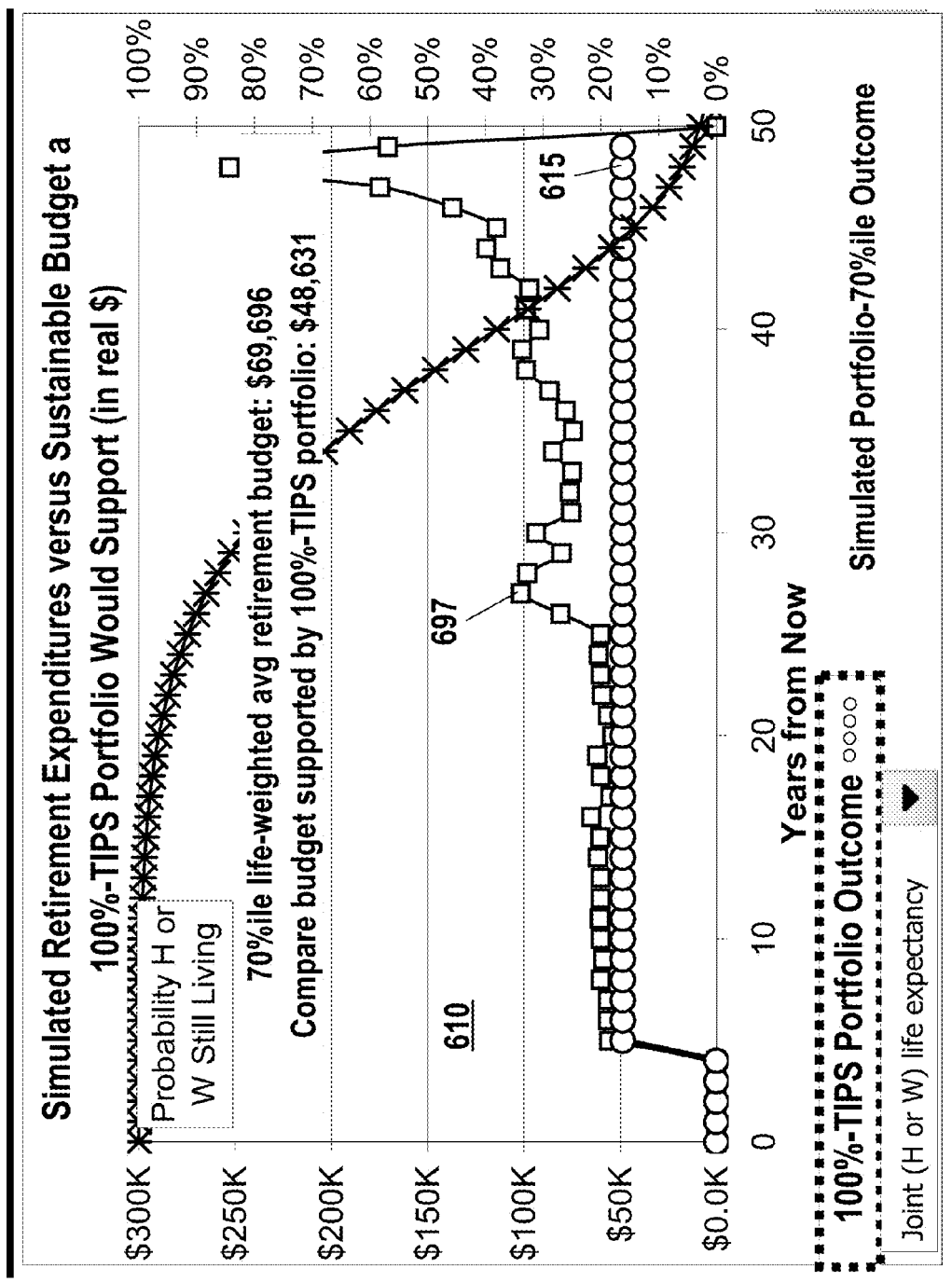
FIGS. 6m and 6n illustrate the first and second plots, respectively, of the worksheet of FIG. 6a after the simulation run, displaying a user-selected seventy percentile simulated series of retirement budgets and corresponding portfolio sizes and dynamic asset allocations of the mixed portfolio, again contrasting these series with the sustainable retirement budgets and corresponding portfolio sizes resulting from amortization of a relatively risk-free baseline portfolio.
Figure 6N:
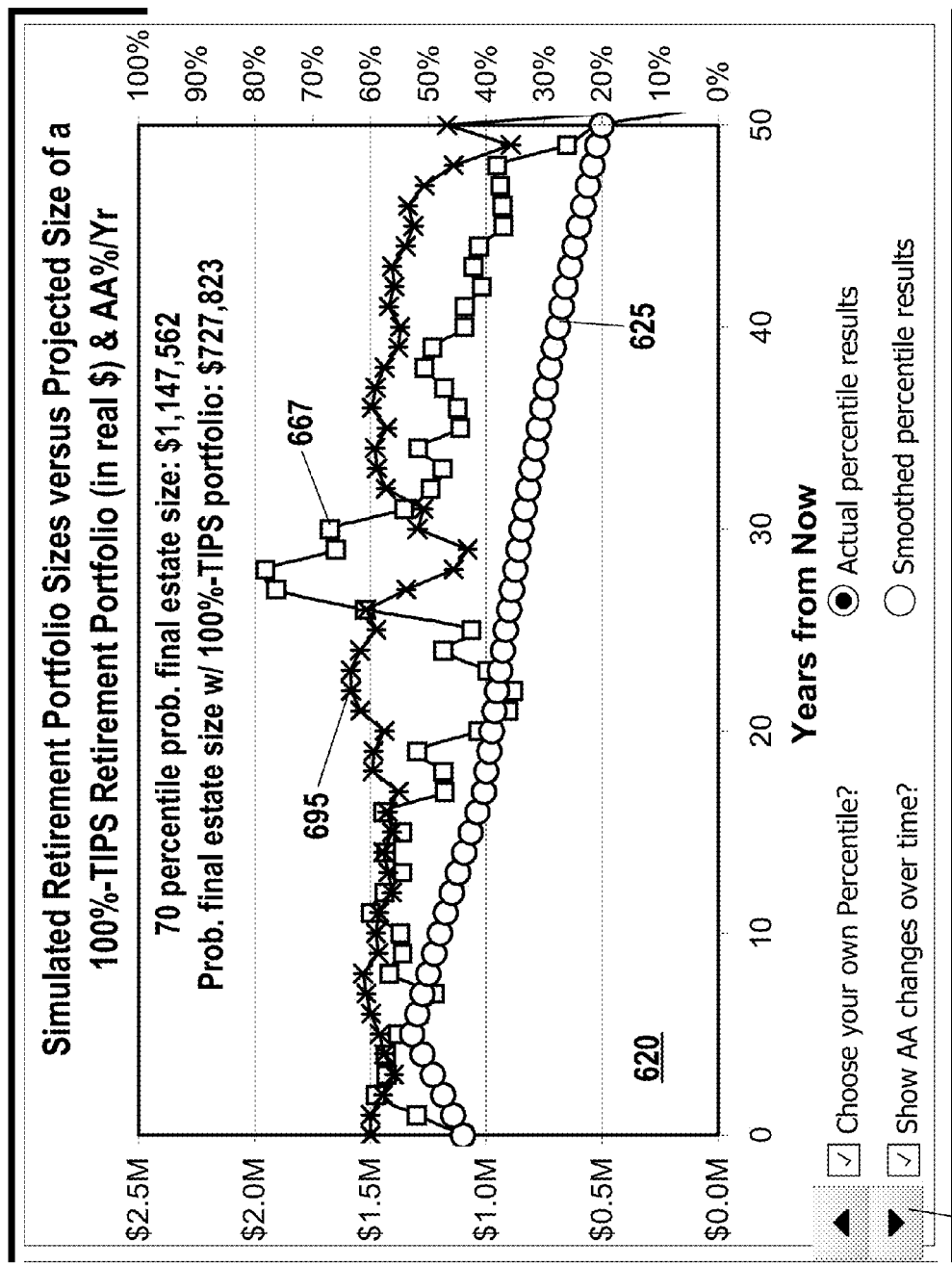
Figure 60:
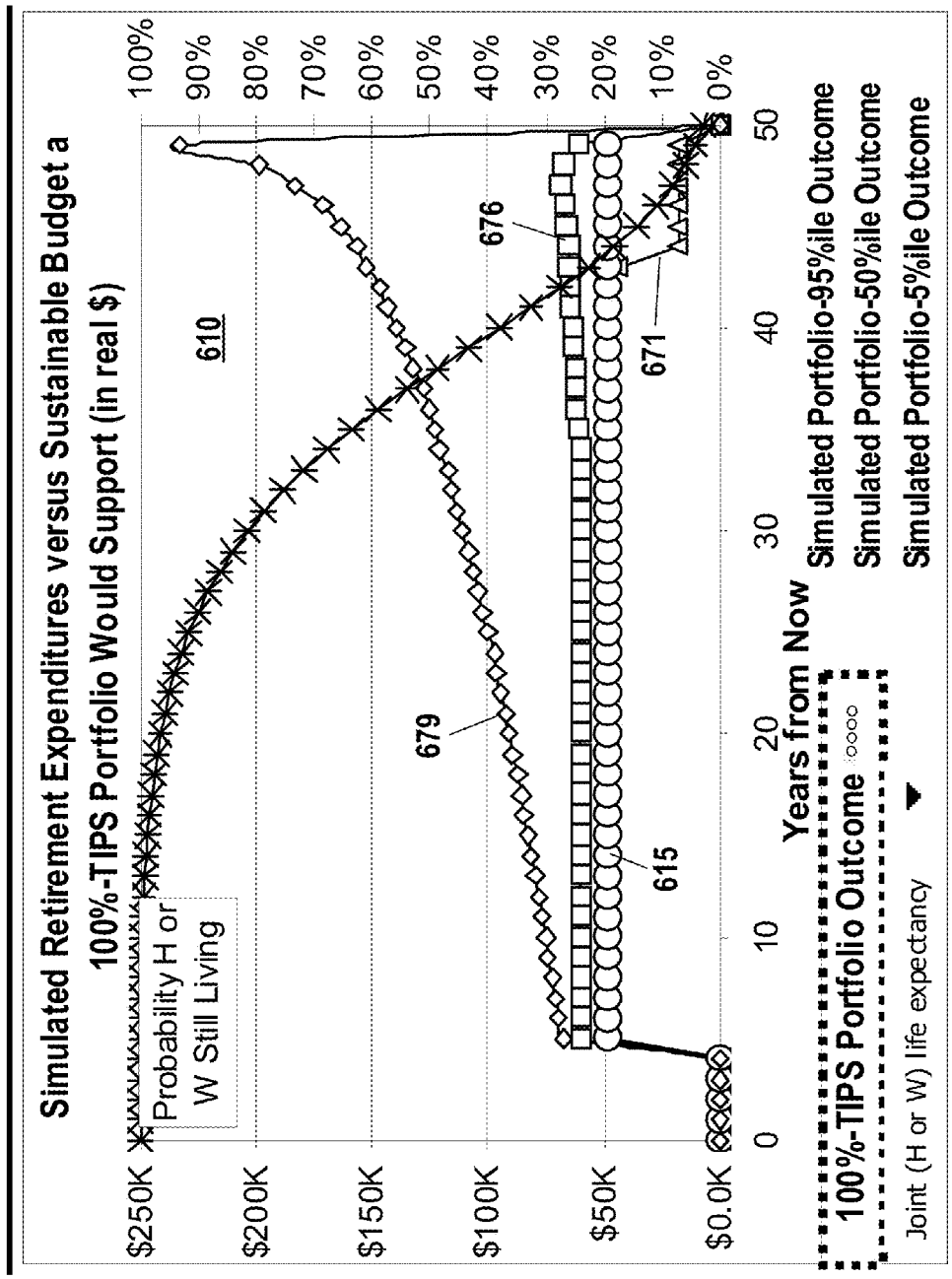
Figure 6P:
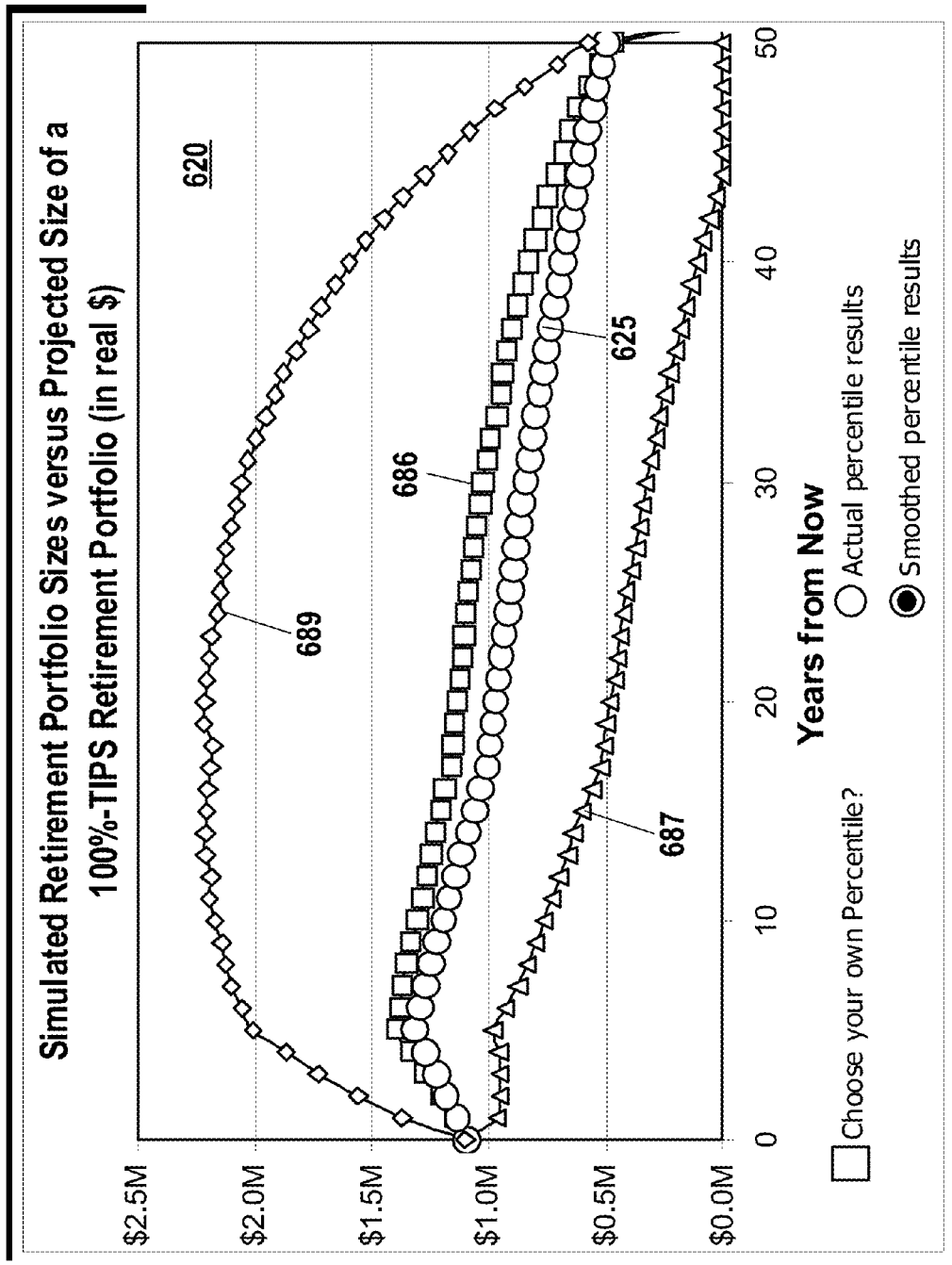

In another method illustrated in FIGS. 6*a*-6*p*, the Monte Carlo simulator 123 computes the mean return μ(t) for each year t of a simulation as the following function of V(t) and a reversion-to-the-mean time factor η:

$$\mu(t) = \left( \frac{(1 + \mu(0))^\eta}{V(t)} \right)^{1/\eta} - 1 \quad (21)$$

The primary worksheet 600 of the financial planner and simulation system 100 provides a field 154 (FIG. 6*b*) for entering a reversion-to-the-mean time factor η. Applicant has also discovered that a when the reversion-to-the-mean time factor η is assigned a value of about 8 to 12 years, the Monte Carlo simulation outcomes approximate the outcomes of an exploratory simulation. This valuation-dependent model of returns biases the cumulative effect of simulated risky asset returns over an extended time period toward the cumulative expected return, thereby reducing the simulated dispersion of long-term risky asset category returns.

In summary, to model a valuation-dependent distribution of risky-asset returns, the Monte Carlo simulator 123 keeps track of the valuation ratio V as it simulates annual returns. Each year of a valuation-dependent simulation, the Monte Carlo simulator 123—using equation (20), equation (21), or some other suitable valuation-dependent equation—computes a value for the expected mean return μ that is dependent on, and a function of, the valuation ratio V.

4.7 Modifying Asset Allocations as a Function of Valuation and/or Time

The Monte Carlo simulator 123 also enables a user to specify a time-dependent and/or valuation-dependent asset allocation distribution between the risky and risk-free asset categories. The user can specify that the percentage allocation to the risky asset category will decrease by a designated amount 162 (FIG. 6*b*) per simulated year. The user can also specify the amount allocated to the risky asset category as a function of the simulated valuation. For example, the amount α(t) allocated to the risky asset category for any given year t, where 1≦t≦n, may be specified by the following function:

$$\alpha(t)=\alpha(0)-\beta \times t-\delta \times (V(t)-1) \quad (22)$$

where α(0) is the initial amount allocated to the risky asset category, β is the annual reduction in the amount allocated to the risky asset category, V(t) is the valuation ratio, discussed in §4.6 above, of the risky asset category, and δ is a scaling factor that is multiplied by V(t). The primary worksheet 600 of the financial planner and simulation system 100 provides users with a scaling factor input 165 to specify an asset allocation that is dependent on valuation as set forth in equation (22) above.

Many other valuation-dependent functions for α(t) may be suitable. For example, the amount α(t) allocated to the risky asset category for any given year t, where 1≦t≦n, may be specified by the following function:

$$\alpha(t) = \frac{\alpha(0) - \beta \times t}{V(t)^\delta} \quad (23)$$

As the reference to dynamic asset allocation graphs 129 in FIG. 1 suggests, the Monte Carlo simulator 123 also preferably records the series of consecutive simulated dynamic asset allocation amounts α(t) for later analysis. In this manner, the dynamic asset allocation amounts versus time corresponding to any given simulation can be graphed (see, e.g., pattern 695 in FIG. 6*n*) and associated with the portfolio performance versus time for that same simulation.

5 Other Distinguishing Simulation Aspects 5.1 Modeling Retirement Budgets

One of the objects of the financial planner and simulation system 100 is to compare the sustainable retirement budget that would be supported by an approximately risk-free portfolio with the average or median retirement budget supported by simulations of a mixed portfolio. In furtherance of this object, the Applicant has attempted to develop realistic, mathematically logical models for retirement budgets.

Most simulators unrealistically assume that retirees would withdraw a constant inflation-adjusted amount from their portfolio every year regardless of the cumulative performance of their portfolio. But in real life many retirees would increase their standard of living following periods of better-than-expected performance. Likewise, many retirees would choose to spend less following periods of lower-than-expected performance, for fear of completely depleting their portfolio.

The Monte Carlo simulator 123 computes a series of consecutive retirement budgets whose amounts are partly dependent upon the cumulative simulated performance of the investor's portfolio. More particularly, the Monte Carlo simulator 123 computes an amount of each consecutive retirement budget W(t) for any simulation year t that is maximally, minimally, or exactly constrained by an amortization function. The amortization function is a function of the simulated size of the portfolio at time t, a targeted portfolio duration n equal at least to the life expectancy of at least one of the one or two persons, and an estimated rate of return r.

In one mode, the annual retirement budget W(t), for t≧retirement year Y, is exactly constrained by the following function of the simulated size P(t) of the portfolio at time t, the targeted portfolio duration n, and the estimated total return r from a rebalanced portfolio having the user-indicated asset allocation:

$$W(t)=\text{Min}(W(t|x)) \text{ for } 1 \leq x \leq n-t, \text{ where}$$

$$(W(t|x))_{Y+z \to x} = p \times \left( P(t) + \sum_{j=t+1}^{x} \frac{A[j]}{(1+r)^{j-t}} \right) \times \frac{r \times (1+r)^x}{(1+r) \times ((1+r)^x - 1)} \quad (24)$$

When the scaling factor p is set to 100%, the retirement budget W(t) equals the amortized amount one's portfolio would be able to sustain if the portfolio, notwithstanding its past performance, delivered the expected total return for the remainder of the targeted portfolio duration.

In another mode illustrated in FIGS. 6*a*-6*p*, the annual retirement budget W(t) is tied to a fixed inflation-adjusted target amount $W_{target}$, provided that it falls between a floor and ceiling defined by two annually-recalculated, portfolio-performance based minimum and maximum retirement budget constraints $W_{min}(t)$ and $W_{max}(t)$, respectively.

The upper dynamic constraint or ceiling $W_{max}(t)$ is a function of the expected total return of the rebalanced portfolio. This constraint is premised on the notion that it makes little sense to spend more than the amortized budget that one's portfolio could reasonably be expected to sustain if the portfolio delivered the expected total return. To compute $W_{max}(t)$, $W_{max}(t)$ is substituted for W(t) in formula (24) above, and the scaling factor p—preferably 100%—is specified by input field 178.

The lower dynamic constraint or floor $W_{min}(t)$ is a function of the sustainable retirement budget supported by an amortized risk-free portfolio. This constraint is premised on the notion that typical users would be unlikely to invest in risky assets at all if they were not going to spend at least as much as a risk-free portfolio could sustain. To compute $W_{min}(t)$, the risk-free rate of return i is substituted for r, $W_{min}(t)$ is substituted for W(t), and the scaling factor p is specified by input field 176.

The $W_{target}$ amount corresponds to input field 173 of FIG. 6*c*. The user is encouraged to designate an amount for input field 173 that is between the minimum and maximum retirement budget constraints $W_{min}(t)$ and $W_{max}(t)$.

Annual retirement budgets are also not allowed to fall below a constant minimum retirement budget constraint $W_{lowest}$, corresponding to input field 174 of FIG. 6*c*. This is premised on the notion that any less than a minimum level of expenditures would be unacceptable, if not impossible.

Taking all of these constraints into account, the calculated retirement budget W(t) is given by the following set of relationships:

$$W(t) = \begin{cases} W_{max}(t), & W_{lowest} < W_{max}(t) < W_{target} \\ W_{min}(t), & W_{min}(t) > W_{target} \\ W_{lowest}, & W_{lowest} > W_{max}(t) \\ W_{target}, & W_{min}(t) < W_{target} < W_{max}(t) \end{cases} \quad (25)$$

The calculations described above for the retirement budget W(t) do not take into account any temporary additional expenses or withdrawals indicated by negative values of A(t). Therefore, to adjust for such additional expenses or withdrawals, negative values of A(t) are added to W(t) after the calculations of formulas (24) and (25) are completed. It should be noted that the resulting series of values for W(t) also includes amounts drawn from additional income sources such as social security. After all, all such additional income sources are treated as portfolio inputs, that is, additions to the portfolio.

The simulator 123 also computes the corresponding portfolio size. Each year of retirement, the portfolio size is depleted by retirement budget W(t) and any simulated investment losses. Each year, the portfolio size may also be enhanced by any portfolio additions A(t) for A(t)>0 and any simulated investment gains.

The simulator 123 stores each simulated year's total retirement budget W(t) and corresponding portfolio size P(t) into arrays. The values stored in the arrays are subjected to additional mathematical and graphing operations as set forth in §§5.2-5.5 below.

5.2 Ranking the Simulation Results

As noted earlier, to model the performance of a mixed portfolio, the simulator 123 preferably runs several thousand simulations of the portfolio over its targeted life, recording for each simulation a series of consecutive simulated retirement budgets and resulting portfolio sizes for the life of the portfolio. The simulator 123 also ranks the simulations and selectively displays certain percentile results of the ranked simulations in order to illustrate the dispersion of simulated results of investing in the mixed portfolio.

In order to rank the simulations, the simulator 123 computes one or more summary statistics of each simulation. More particularly, the simulator 123 computes, for each simulation, some central tendency statistic of the series of consecutive simulated retirement budgets. Examples of suitable central tendency statistics include the median and average retirement budget from the series of simulated retirement budgets. The preferred central tendency statistic is the life-weighted average of the series of consecutive simulated retirement budgets, where each retirement budget is weighted in proportion to an estimated probability that the investor, or at least one of the investor and his or her spouse, would be alive to spend that budget. This life-weighted average retirement budget $\overline{W}_{LW}$ is equal to:

$$\overline{W}_{LW} = \frac{\sum_{t=Y}^{n} W(t) \times L(t)}{\sum_{t=Y}^{n} L(t)} \quad (26)$$

where W(t) is the a retirement budget at time t, Y is the first retirement year, and L (t) is the probability of the investor or at least one of the investor and his or her spouse surviving to time t.

The median, average, and weighted average of a series are all measures of central tendency. Many other types of central tendency statistics may be calculated, and it is intended that the present invention cover them all, unless otherwise expressly so limited.

The simulator 123 also preferably computes, for each simulation, the average simulated terminal size of the portfolio. This value is computed as a function of the simulated portfolio size at any year t and the probability that the investor, or for two investors the last surviving investor, will pass away during that year t. The life-weighted average terminal estate size $E(P_{term})$ is equal to:

$$E(P_{term}) = \sum_{t=1}^{n} P(t) \times D(t) \quad (27)$$

where n is the targeted portfolio duration, P(t) is the simulated portfolio size for year t, and D(t) is the incremental probability of the last surviving investor passing away during year t. For convenience, D(t) at t=n may be set to equal the probability of the last surviving investor surviving until year n.

In summary, the simulator 123 ranks the simulations primarily by the computed life-weighted average retirement budget for each simulation trial, and (whenever there is a tie) secondarily by the simulated average terminal size of the portfolio. The simulator 123 also keeps track of both the time series of simulated retirement budgets, and the corresponding time series of remaining portfolio sizes, for each ranked simulation trial.

5.3 Performing a Blended Sort of the Simulation Results

When the simulator 123 simulates the life of a portfolio several thousand iterations, each iteration produces a time series of consecutive retirement budget amounts and another time series of corresponding portfolio sizes. Each iteration is entirely independent of every other iteration.

Despite this independence between interations, Applicant has discovered that it is useful to identify the median retirement budget or portfolio size amount for each year of the collective simulations, and then string these median results together into a consecutive "blended series" of simulation results. More generally, it is useful to independently rank each year's outcomes, across all of the simulation iterations, and string or link selected commonly-ranked, common-percentile outcomes together into "blended series" of annually sorted simulation results.

In practice, the system 100 performs this operation by (1) writing each retirement budget series to a new row of a spreadsheet table, and likewise writing each portfolio size series to a new row of a second spreadsheet table, where the columns of the tables represent consecutive years in the life of the portfolio, and thereafter (2) independently sorting each column of the tables. Because this operation blends the series data together, this is referred to herein as a "blended sort" of the simulation results. Each row in a retirement budget or portfolio size table that has undergone such a blended sort is referred to herein as a "blended series."

It should be stressed that a "blended sort" of the data differs from the operation described above in §5.2, where each series is ranked according to a central tendency statistic of the series, the integrity of each series is maintained, and there is no blending of data between series. The operation of §5.2 ranks the series without blending the series. A "blended sort," by contrast, ranks each year's results independently, and then strings commonly ranked results together.

Arguably, these blended sorts are statistically spurious. First, a blended sort blends the simulated retirement budget and portfolio size amounts of the different simulations, even though the simulations are independent of each other. Second, a blended sort treats a given retirement budget or portfolio size amount for a given year of a given simulation as if it were independent of the previous and next year's retirement budget and portfolio size amounts for that simulation. Third, the blended sort blurs the correspondence between the retirement budgets of a given row of the first table with the portfolio sizes of the same row of the second table.

The usefulness of the blended sorts, however, is borne out by comparing them with series that have been ranked in accordance with §5.2. Repeated observations demonstrate that the dispersion between, say, the 20 and 80 percentile blended series of consecutive retirement budget and portfolio size amounts is approximately equal in magnitude to the dispersion between the 20 and 80 percentile ranked, but non-blended, series of simulation results.

In this manner, the blended sorts produce a much "smoother" series of consecutive retirement budget and pseudo-corresponding portfolio size amounts for each row of the tables. Accordingly, the blended series realistically illustrate the simulated dispersion of portfolio results, while filtering out the potentially distracting year-to-year volatility of any given simulation trial.

It will be appreciated that to perform a "blended sort," it is not necessary to actually write values to a spreadsheet table and independently sort the columns. A "blended sort" can be performed on a two-dimensional array without ever writing values to a spreadsheet table. Alternatively, each year's results can be independently ranked, without being sorted, and then commonly ranked values associated with each other. To the extent that the claims refer to a "blended sort" or "blended series" of simulation data, it is intended to cover all of these alternative, yet equivalent, methods of blending the data.

5.4 Computing Summary Statistics

After running several thousand iterations of portfolio simulations on a mixed portfolio, it is desirable to summarize the collective results of all of the iterations with one or more statistics. There are many suitable central tendency statistics with which to summarize the collective results. One central tendency statistic is the median of all of the simulation retirement budgets. Another central tendency statistic is the average of all of the simulation retirement budgets. Yet another central tendency statistic is the life-weighted average of all of the simulation retirement budgets. It is important to distinguish these collective central tendency statistics from the central tendency statistics, discussed above in §5.2, independently computed for each simulation.

The simulator 123 computes several collective central tendency statistics. The two most preferred collective central tendency statistics are (1) the life-weighted average retirement budgets from of the median ranked simulation series (see §5.2), and (2) the life-weighted average of the median "blended series" of retirement budgets resulting from a blended sort (as described above in §5.3) of all of the simulated retirement budgets. For example, if 9,999 simulations are performed, one preferred collective central tendency statistic is the life-weighted average retirement budget from the 5,000$^{th}$ ranked simulation. Another preferred collective central tendency statistic is the life-weighted average of the 5,000$^{th}$ series resulting from a blended sort (as described above) of the 9,999 simulations. For the latter of these two statistics, the life-weighted average retirement budget $\overline{W}_{LW}$ is equal to:

$$\overline{W}_{LW} = \frac{\sum_{t=Y}^{n} W_{med^*}(t) \times L(t)}{\sum_{t=Y}^{n} L(t)} \quad (28)$$

where $W_{med}^*(t)$ is the retirement budget at time t from the median series of retirement budgets resulting from a blended sort of the simulations, and L(t) is the probability of the investor surviving to time t, or for a married couple, the probability of there being at least one surviving investor spouse at time t.

For investors whose portfolios are just marginally sufficient to support their retirement plans and goals, Applicant believes that taking an average of the median-ranked blended and unblended series of retirement budgets is preferable to taking an average over all of the retirement budget data. The simulations produce positively skewed distributions of the retirement budget data, meaning the average over all of the retirement budget data is greater than the average of the median series. Considerably less than fifty percent of the simulations sustained at least the overall "average" lifestyle suggested by the distribution. Presenting the overall "average" rather than the average lifestyle suggested by the median series of retirement budgets may exaggerate investors' expectations about the likely performance of the mixed portfolio, and also cause investors to discount the risks associated with the portfolio.

For comparison purposes, the simulator 123 also computes a comparable central tendency statistic of the sustainable retirement budgets from a baseline portfolio fully invested in approximately risk-free assets. The simulator 123 also compares the central tendency statistic of the simulated retirement budgets from the mixed portfolio with the comparable central tendency statistic of the sustainable retirement budgets.

The simulator 123 also computes a collective central tendency statistic from the simulations representing an average terminal estate size of the mixed portfolio. The preferred collective central tendency statistic is the life-weighted average of the simulated portfolio sizes. Because the system 100 is computing the average estate size after the investor, and his or her spouse, if any, have died, the terminal final estate size will not affect the investors' lifestyles while living. Applicant believes that most investors would be far less concerned with the "risk" of dying with an estate whose size is on the low end of the distribution, then they are concerned with the risk of struggling to survive on retirement retirement budgets that are on the low end of the distribution. Therefore, the "median" simulated estate size is not preferred over the "average" simulated estate size.

Accordingly, the system 100 preferably computes the life-weighted average of the simulated portfolio sizes over all of the data, not just over the median ranked series or median blended series of simulated portfolio sizes. Formulaically, the life-weighted average terminal estate size $E(P_{term})$ is equal to:

$$E(P_{term}) = \frac{1}{z} \sum_{t=1}^{n} \sum_{k=1}^{z} P_k(t) \times D(t) \quad (29)$$

where z is the number of simulation trials, n is the targeted portfolio duration, $P_k(t)$ is the simulated portfolio size for year t of simulation k, and $D(t)$ is the incremental probability of the last surviving investor passing away during year t.

For comparison purposes, the simulator 123 also computes a comparable central tendency statistic of an expected final estate size from a baseline portfolio fully invested in approximately risk-free assets and amortized over the targeted portfolio duration. The simulator 123 also computes a ratio of the central tendency statistic of the terminal estate size of the mixed portfolio to the comparable central tendency statistic of the expected terminal estate size from a baseline portfolio fully invested in approximately risk-free assets.

The simulator 123 also computes and records statistics reflecting the dispersion of simulation results. More particularly, the simulator 123 computes and records the life-weighted average of the five percentile through ninety-five percentile ranked series of retirement budgets, in five percentile increments, generated by the simulations of the mixed portfolio. FIG. 6k illustrates a plot 610 that displays the five, fifty, and ninety-five percentile ranked simulated series 611, 616, and 619 of retirement budgets. The simulator 123 also computes and records the average terminal estate sizes suggested by the five percentile through ninety-five percentile ranked series of portfolio sizes, in five percentile increments, generated by the simulations of the mixed portfolio. FIG. 6l illustrates a plot 620 that displays the five, fifty, and ninety-five percentile ranked simulated series 621, 626, and 629 of portfolio sizes.

The simulator 123 similarly samples the blended series of retirement budgets amounts and portfolio sizes resulting from blended sorts of the simulation results. FIG. 6o shows plot 610 displaying the five, fifty, and ninety-five percentile ranked blended series of simulation retirement budgets with curves 671, 676, and 679. FIG. 6p also shows plot 620 displaying the five, fifty, and ninety-five percentile ranked blended series of simulation portfolio sizes with curves 681, 686, and 689.

The simulator 123 also computes the shortfall rate of the mixed portfolio over all of the simulations. The shortfall rate is a simulated probability (which can be measured in different ways) that the investor(s) become(s) impoverished. One measure of the shortfall rate is the percentage of simulations in which the investor(s) exhaust their portfolio, based upon their designated targeted retirement budget parameters and designated retirement budget constraints, within the time period set forth by the targeted portfolio duration n. Another measure of the shortfall rate is the life-weighted percentage of simulations in which the investor(s) exhaust their portfolio, based upon their designated targeted retirement budget parameters and designated retirement budget constraints, within their lifetimes. Yet another measure of the shortfall rate is the combined probability of (1) the investor(s) outlasting their targeted portfolio duration n and (2) the percentage of simulation in which the investors exhaust their portfolio, based upon their designated targeted retirement budget parameters and designated retirement budget constraints, within their lifetimes and within the time period set forth by the targeted portfolio duration n.

In the alternative, the simulator 123 computes the euphemistic equivalent of the shortfall rate, that is, the survival or success rate of the portfolio over all of the simulations. The survival or success rate would simply be equal to 100% minus the shortfall rate. The survival or success rate may be computed in different ways—for example, as the simulated probability of the portfolio lasting for n years, the simulated probability of the portfolio lasting for the lifetime(s) of the investor(s), or the simulated probability of the portfolio lasting for either n years or the lifetime(s) of the investor(s).

The simulator 123 may also compute the percentage of simulated retirement budgets that underperform some threshold or target amount, for example, the sustainable retirement budget supported by a risk-free portfolio. For example, the simulator 123 may compute the percentage of simulated retirement budgets that are below the threshold. Alternatively, the simulator 123 may compute the percentage of simulations for which the life-weighted average retirement budget over all of the retirement years of that simulation is below the threshold.

5.5 Plotting the Simulation Results

The simulator 123 generates a wide variety of Cartesian-coordinate graphs (plots) that illustrate selected simulation results. The simulator 123 generates plots that show the time sequences of retirement budgets and corresponding portfolio sizes and dynamic asset allocations of one or more selected ranked simulations. The simulator 123 also generates plots of the cumulative shortfall risk versus time. The simulator 123 also generates histograms or frequency distribution plots of simulation summary statistics that illustrate the dispersion of simulation results.

After ranking and/or blending the simulation results as set forth above in §§5.2 and 5.3, the simulator 123 samples and records different percentile rankings of the simulation results. More particularly, the simulator 123 preferably samples and records the time sequences of retirement budgets and corresponding portfolio sizes and dynamic asset allocations of the 5th through 95th percentile ranked, unblended simulation series. The simulator 123 also samples and records commonly ranked sequences of retirement budgets and portfolio sizes for the five through ninety-five percentile results, in five percent increments, of the blended series of consecutive retirement budgets and portfolio amounts.

FIG. 6k illustrates computer-generated plot 610 of the primary user-interface screen of the financial planner and simulation system 100, after a simulation has been run using the inputs displayed on FIG. 6a. Computer-generated plot 610 displays the series 616, 611, and 619 of periodic retirement budgets versus time for each of three simulations corresponding respectively to the approximate median, five percentile, and ninety-five percentile ranked simulations.

Computer-generated plot 610 preferably continues to display, for comparison purposes, the sustainable inflation-adjusted retirement budget 615 versus year from a baseline portfolio fully invested in relatively risk-free assets. In this way, the computer-generated plot 610 comparatively illustrates a dispersion of simulated results (in terms of periodic retirement budgets) from a mixed portfolio to the sustainable amortized budget supportable from a baseline portfolio fully invested in the low-risk asset category, thereby assisting an investor in the evaluation of the simulated risks and rewards associated with the mixed portfolio.

FIG. 6l illustrates a second computer-generated plot 620 that displays series 626, 621, and 629 of consecutive portfolio sizes versus time for each of the same three simulations corresponding respectively to the approximate median, five percentile, and ninety-five percentile ranked simulations. Together, the computer-generated plots 610 and 620 illustrate not only the simulated retirement budgets versus time for an approximately median and a low-percentile ranked simulation result, but also the corresponding simulated remaining balances of the mixed portfolio for the median and low-percentile ranked simulation results.

Computer-generated plot 620 also preferably continues to display, for comparison purposes, the draw-depleted portfolio-size 625, versus year, from a baseline portfolio fully invested in relatively risk-free assets. In this way, the computer-generated plot 620 comparatively illustrates a dispersion of simulated results (in terms of portfolio sizes versus time) from a mixed portfolio to the portfolio size versus time anticipated from a baseline portfolio fully invested in the low-risk asset category. This plot 620 further assists an investor in the evaluation of the simulated risks and rewards associated with the mixed portfolio.

In FIGS. 6o and 6p, plots 610 and 620 illustrate the dispersion of simulation results while filtering out the year-to-year volatility of the individual simulations. Plot 610 displays the 5, 10, and 95 percentile ranked blended series 671, 676, and 679 of simulated retirement budgets. Plot 620 displays the 5, 10, and 95 percentile ranked blended series 681, 686, and 689 of simulated portfolio sizes. The blended series 671, 676, and 679 of FIG. 6o are much smoother than the unblended series 611, 616, 619 of FIG. 6k. But the dispersion of results between 5 and 95 percentile blended series 671 and 679 of FIG. 6o is as visually stark as the dispersion between the 5 and 95 percentile unblended series 611 and 619 of FIG. 6k. The same observation can be made when comparing the plots 620 of FIGS. 6p and 6l. This shows that, despite their arguably statistically spurious nature, the blended series of retirement budgets and portfolio amounts effectively preserve information about the dispersion of simulation results while filtering out the year-to-year volatility of the individual simulations.

The simulator 123 also enables a user to graph a user-selected percentile result. In FIGS. 6m and 6n, plots 610 and 620 provide a user-interface control 681 enabling a user to select among differently ranked simulations and illustrate a user-selected 70-percentile set of simulated retirement budget and corresponding portfolio size results 697 and 667. Plots 610 and 620 continue to display the comparable sustainable retirement budgets 615 and corresponding portfolio sizes 625 for a portfolio fully invested in the risk-free asset category. In FIG. 6n, plot 620 also illustrates the valuation-dependent dynamic asset allocation pattern 695 corresponding with the 70-percentile simulation.

To further illustrate the dispersion of simulation results, the simulator 123 also generates a histogram 1060 (FIG. 9) of the life-weighted average retirement budgets of the simulations. The portion 1061 of the histogram 1060 representing life-weighted average retirement budgets that are below the sustainable retirement budget from a risk-free portfolio are colored differently—preferably in red—than the remainder 1062 of the distribution in order to illustrate the simulated percentage of mixed portfolios resulting in a lower retirement standard of living than a risk-free portfolio. The simulator 123 may generate a similar histogram of the average terminal estate sizes of the simulations.

5.6 Comparing Different Portfolio Outcomes to a Minimum-Risk Portfolio Outcome on a Common Plot One especially valuable extension of the present invention is to compare multiple portfolios outcomes to a minimum-risk portfolio outcome, all on a common plot. Financial analysts have long compared different portfolios, characterized in terms of expected annual returns and standard deviations, in risk-reward space on a common plot. Applicant has improved on that prior art in multiple ways, including: (1) characterizing portfolios with a more practical "reward" parameter than the expected annual return; (2) profiling the relative simulated "rewards" of each portfolio in comparison to the expected reward of a relatively risk-free (or minimum-risk) portfolio; and (3) characterizing the portfolio risk with parameters other than, yet derived from, the expected standard deviation of returns.

Based on the discussion in §§5.5 and 5.6, it should be clear that there are many different measures of the simulated performance or "reward" of a given portfolio. Applicant's most-favored measure of "reward" is the life-weighted average of the portfolio's median-ranked retirement budget series, where such retirement budgets are dynamically constrained by some function of the simulated size and remaining targeted duration of the portfolio. Another measure is the simulated terminal estate size.

Likewise, it should be clear that there are many different measures of the "risk" of a given portfolio. Applicant's most favored way to represent portfolio risk is to take several widely distributed percentile samples (e.g., 5%, 10%, . . . 95%) from the probability distribution of simulated portfolio performance results. Another favored representation of portfolio risk is the life-weighted shortfall risk or survival rate. Other interesting representations of portfolio risk include the percentage of retirement budgets that are less than a threshold amount and the simulated probability that the life-weighted average retirement budget will be less than the sustainable risk-free portfolio retirement budget.

Sections 6 through 8 illustrate examples of ways in which the invention has been extended to compare the outcomes of different portfolios to a minimum-risk portfolio outcome on a common plot. These extensions help users comparatively evaluate and choose amongst different portfolio options.

6. Comparing Different Asset Allocations on a Common Plot

One of the most difficult decisions any investor faces is choosing an asset allocation. To assist an investor facing such a decision, the financial planner and simulation system 100 helps investors evaluate the comparative risks and rewards of different percentage allocations to risky assets such as stocks in mixed, regularly rebalanced portfolios.

Figure 7:
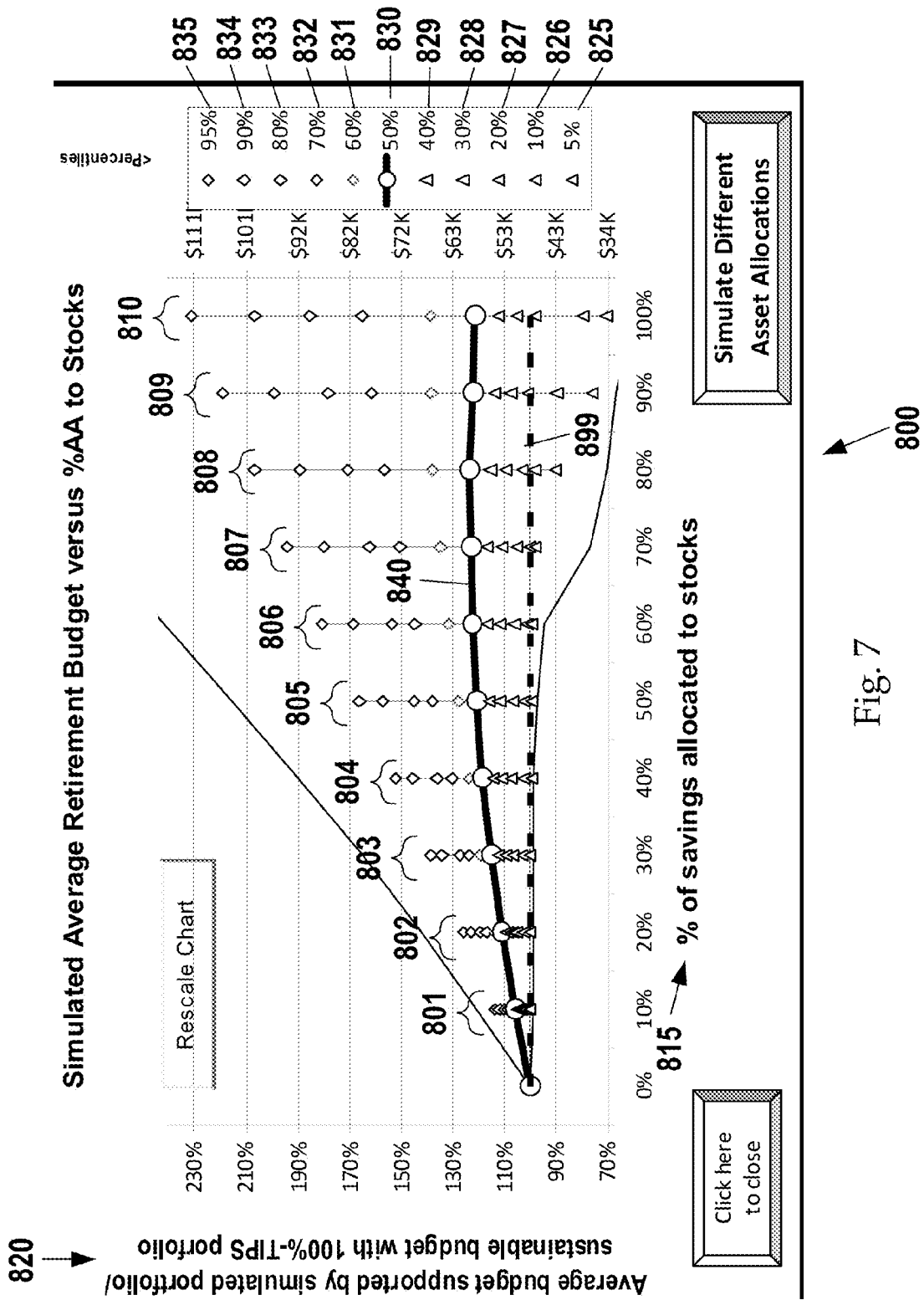
FIG. 7 provides a scatter plot illustrating the simulated distribution of the life-weighted average annual retirement budgets, relative to the sustainable retirement budget supported by an amortized risk-free baseline portfolio, of ten simulated mixed portfolios ranging from a 10% asset allocation to a 100% asset allocation, in 10% increments.

FIG. 7 illustrates a baseline retirement budget 899 and the retirement budgets supported by eleven simulated asset allocation plans 801-811 ranging from a 0% asset allocation to a 100% asset allocation, in 10% increments, on a scatter plot 800. The retirement budgets of FIG. 7 were simulated on the basis of the inputs illustrated in FIG. 6a with the following exceptions: an exploratory simulation model was selected; each of the portfolios modeled a different asset allocation, ranging from 0% to 100%, in 10% increments; and for each portfolio, a constant asset allocation was assumed. The x-axis 815 of the scatter plot 800 represents the percentage asset allocation to risky assets such as stocks. The y-axis 820 of the scatter plot 800 represents the life-weighted average retirement budgets supported by different ranked trials from the simulation of the financial plan. The resulting life-weighted average retirement budgets are represented both in absolute terms (i.e., retirement budget dollars per year) and relative terms (e.g., as a percentage of the sustainable retirement budget that could be supported by the baseline portfolio 899).

Each asset allocation plan 801-810 is represented on the plot 800 with a first symbol 830 representing the estimated fifty-percentile retirement budget outcome and a plurality of additional symbols 831-835 and 825-829, positioned above and below the first symbol 830, representing selected high- and low-percentile results sampled from the distribution of life-weighted average retirement budgets generated by the simulation trials. More particularly, symbols 825-829 represent the five, ten, twenty, thirty, and forty percentile results, respectively, and symbols 831-835 represent the sixty, seventy, eighty, ninety, and ninety-five percentile results, respectively.

Significantly, the retirement budget supported by each simulated asset allocation plan 801-810 is represented on the plot 800 as a percentage of the sustainable amortized retirement budget that would be supported by the baseline portfolio 899. Therefore, the plot 800 not only represents the relative "reward" of each mixed portfolio 801-810 in the terms of the lifestyle it is likely to be able to sustain, but also in relation to the lifestyle that the baseline portfolio 899 would sustain.

To draw attention to how the median simulated performance of the mixed portfolios 801-810 varies as a function of asset allocation, the system 100 fits a curve 840 to the symbols 830 representing the simulated 50-percentile retirement retirement budget results. The curve 840 illustrates the median simulated retirement budget supported by simulations of different asset allocation plans as a percentage of the sustainable retirement budget supported by the baseline portfolio 899.

Symbols 831-835 and 825-829 positioned above and below the fifty-percentile symbols 830 draw attention to the simulated probability and magnitude of the risk associated with each asset allocation plan 801-810, and to how that risk increases as a function of asset allocation. These symbols clearly illustrate how the dispersion of simulated results increases with increasing asset allocation.

Notably, the slope in curve 840 decreases with increasing asset allocation, and even turns negative between asset allocations of 90% and 100%. This graphically illustrates not only the so-called "rebalancing bonus," but also the diminishing incremental rewards—coupled with exponentially-increasing risks—of ever-increasing allocations to risky assets such as stocks.

By plotting both the median and several low-percentile results of an asset allocation plan 801-810 in terms of how it compares to the projected outcomes from a baseline, relatively risk-free portfolio 899, and by plotting these results for a range of different asset allocations, scatter plot 800 has the potential of greatly assisting investors in identifying asset allocation plans most suited to their risk tolerance.

7. Method of Immediately Estimating Dispersion of Projected Long-Term Results for a Portfolio To produce FIG. 7, multiple simulation trials were performed on each of eleven portfolios ranging from 0% to 100% allocations. Each simulation simulated the effect on a mixed portfolio of mean-adjusted historical returns and targeted retirement budget parameters for each of fifty consecutive years. Therefore, many millions of calculations were performed to generate FIG. 7.

The dispersedly-sampled percentile results illustrated in each of FIG. 7's mixed, 10%-100% allocation portfolios 801-810 resemble the characteristic shape of a log normal distribution. Therefore, it may be possible to directly generate these distributions by applying sampling distribution theory, without performing tens of thousands of simulation trials. FIG. 7, however, was generated on the basis of a complex set of inputs. A solution, if any, based on sampling distribution theory would be nontrivial.

7.1 Application of Sampling Distribution Theory to Estimate the Probability Distribution of the Expected Cumulative Expansion of an "Untouched" Portfolio We can, however, apply sampling distribution theory to predict the probability distribution of the expected cumulative expansion of an "untouched" portfolio whose risky asset returns are log normally distributed and entirely independent of past returns. In referring to a portfolio as "untouched," we mean that nothing is withdrawn from or contributed to the portfolio, and the portfolio expands or contracts solely on the basis of its internal returns. For convenience, we use the term "cumulative expansion" to refer to the size of the portfolio after n years divided by the portfolio's initial size, that is, its size at year zero. Knowing the probability distribution of the portfolio's annual risky asset returns, our goal is to find the probability distribution of the expected cumulative expansion of that portfolio, assuming that it remains "untouched."

Assume a portfolio has returns that are log normally distributed with an expected geometric (annualized) mean return $\mu_g$ and standard deviation $\sigma$. As explained in §4.5, the arithmetic mean return $\mu_a$ would be approximately equal to $\mu_g + \sigma^2/2$. The size of the portfolio for any given year can be characterized by the formula: $P(t) = P(t-1) \times (1+r_t)$, where $P(t-1)$ and $P(t)$ are the values of the portfolio at the beginning and end, respectively, of the year, and $r_t$ is a randomly, log normally distributed return for year t.

Let us refer to one plus the return, or $1+r_i$, as the portfolio expansion factor, which we recharacterize as the mathematical constant e raised to the power $X_i$, where $X_i$ is the logarithm of the portfolio expansion factor $1+r_i$:

$$1+r_i = e^{X_i} \quad (30)$$

Because the portfolio expansion factor $1+r_i$ is log normally distributed, we know that variable $X_i$ has a normal distribution of $N(\mu', \sigma'^2)$. From equations (13) and (14), we can compute the mean $\mu'$ and standard deviation $\sigma'$ of variable $X_i$ from the arithmetic mean $\mu_a$ and standard deviation $\sigma$ of return $r_i$.

As noted at the top of this subsection, we refer to the "cumulative expansion" of the portfolio as the size of the portfolio after n years divided by its initial size, that is, its size at year zero. The cumulative expansion of a portfolio after n years can be expressed by the following formula:

$$\prod_{i=1}^{n}(1+r_i) = \prod_{i=1}^{n} e^{X_i} = e^{\sum_{i=1}^{n} X_i} \quad (31)$$

At the same time, the cumulative expansion of the portfolio can also be expressed by the following formula:

$$\prod_{i=1}^{n}(1+r_i) = (1+g)^n = G^n \quad (32)$$

where g is the annualized return. For convenience, we substitute what refer to as the "annualized expansion factor" G for $1+g$.

Putting equations (31) and (32) together generates the following relation:

$$G^n = e^{\sum_{i=1}^{n} X_i} \quad (33)$$

Taking the logarithm of both sides of equation (33), and multiplying both sides by $1/n$ generates the following relation:

$$\ln G = \frac{1}{n}\sum_{i=1}^{n} X_i = \overline{X} \quad (34)$$

where $\overline{X}$ is the logarithm of the annualized expansion factor G of the sample.

A few paragraphs above, we noted our ability to compute the mean $\mu'$ and standard deviation $\sigma'$ of variable $X_i$ by plugging the arithmetic mean $\mu_a$ and standard deviation $\sigma$ of yield $r_i$ into equations (13) and (14). Once we have computed the $\mu'$ and $\sigma'$ of variable $X_i$, sampling distribution theory gives us a way to compute the mean $\mu''$ and standard deviation $\sigma''$ of $\overline{X}$ in equation (34) above.

According to authors Robert V. Hogg and Elliot A. Tanis of *Probability and Statistical Inference* (4th ed. 1993), it is an established theorem of sampling distribution theory that if $X_1, X_2, \ldots X_n$ are observations of a random sample of size n from the normal distribution $N(\mu', \sigma'^2)$, then the distribution of sample mean $$\overline{X} = \left(\frac{1}{n}\right)\sum_{i=1}^{n} X_i \text{ is } N(\mu', \sigma'^2/n).$$

Accordingly, we can infer that $\overline{X}$—the logarithm of the annualized expansion factor G of the sample—has a normal distribution of $N(\mu', \sigma'^2/n)$. More particularly, the mean $\mu''$ and standard deviation $\sigma''$ of $\overline{X}$ are approximately defined by the following equations:

$$\mu'' = \ln(1 + \mu_a) - \frac{\sigma'^2}{2} = \ln\left(1 + \mu_g + \frac{\sigma^2}{2}\right) - \frac{\sigma'^2}{2} \cong \ln(1 + \mu_g) \quad (35)$$

$$\sigma'' = \sqrt{\frac{1}{n} \times \ln\left(\frac{\sigma^2}{(1+\mu_a^2)} + 1\right)} \quad (36)$$

Having solved for $\mu''$ and $\sigma''$, we can generate a probability distribution of the annualized expansion factor G expected from the portfolio over n years. For example, we can compute the inverse of the log normal cumulative distribution function of G for different percentile values ranging from 5% to 95%. In the spreadsheet program Excel™ produced by Microsoft Corporation of Redmond, Wash., the inverse of the log normal cumulative distribution function of G can be computed using the spreadsheet function LOGINV(p, $\mu''$, $\sigma''$), where p represents the selected percentile. In this manner, we can identify widely distributed percentile samples (e.g., 5%, 10%, ... 95%) from the probability distribution of annualized returns G expected from the portfolio over n years.

For convenience, let us refer to G(p) as the annualized expansion factor of a selected percentile p from the probability distribution of annualized expansion factors G expected from the portfolio over n years. Expressed formulaically, $$G(p) = \text{LOGINV}(p, \mu'', \sigma'') \quad (37)$$

As mandated by equation (36), the distribution of annualized expansion factors G gets narrower with increasing n. Specifically, the width of the distribution is inversely proportional to the square root of n.

While the probability distribution of annualized expansion factors G narrows over increasing time frames, the probability distribution of the cumulative portfolio expansion $G''$ widens with increasing time frames. In fact, it can be shown that the width of the cumulative expansion distribution is directly proportional to the square root of n.

Having computed several selected percentile annualized expansion factors G(p), we can compute the cumulative expansion C(p) that each of those sampled growth factors would yield over n years. Expressed formulaically, $$C(p) = G(p)^n \quad (38)$$

where C(p) is the cumulative expansion of a selected percentile p from the probability distribution of cumulative expansions $G''$ expected from the portfolio over n years.

FIG. 8 illustrates different projected cumulative expansions over a 27-year time frame, relative to the cumulative expansion of a baseline, relatively risk-free portfolio 999 over that same time frame, of ten mixed portfolios 901-910 ranging from a 10% asset allocation to a 100% asset allocation, in 10% increments, on a scatter plot 900. The x-axis 915 of the scatter plot 900 represents the percentage asset allocation to stocks. The y-axis 920 of the scatter plot 900 represents the ratios of several dispersedly sampled values from the cumulative expansion distribution for each of the mixed portfolios, relative to the anticipated cumulative expansion of the baseline portfolio.

Each mixed, regularly-rebalanced portfolio 901-910 is represented on the plot 900 with a first symbol 930 representing the estimated fifty-percentile cumulative expansion result and a plurality of additional symbols 931-935 and 925-929, positioned above and below the first symbol, that represent selected high- and low-percentile cumulative expansion results. More particularly, symbols 925-929 represent the five, ten, twenty, thirty, and forty percentile results, respectively, in terms of a ratio over the anticipated cumulative expansion of the baseline portfolio 901. Symbols 931-935 represent the sixty, seventy, eighty, ninety, and ninety-five percentile results, respectively, also in terms of a ratio over the anticipated cumulative expansion of the baseline portfolio 901.

For each of the mixed portfolios 901-910 represented on FIG. 8, the displayed distribution of cumulative expansion results is a function of the distribution of the portfolio's expected returns. The distribution of expected returns for each mixed portfolio 901-910 is, in turn, a function of its percentage allocation to risky assets. Accordingly, before we can estimate the distribution of cumulative expansion results for any of these mixed portfolios 901-910, it is important to first characterize the portfolio's distribution of returns.

To characterize the distribution of returns for each of the mixed portfolios 901-910 of FIG. 8, the log normally distributed mean return $\mu_g$ for each portfolio 901-910 is calculated in accordance with the following formula:

$$\mu_g = i + \alpha \times ERP + \alpha \times (1-\alpha) \times \frac{SD^2}{2} \quad (39)$$

where i is the estimated risk-free rate of return, ERP is the estimated (annualized) risk premium (i.e., the additional return above the risk-free rate of return) expected for the risky asset category, $\alpha$ is the percentage of the portfolio 901-910 allocated to the risky asset category, and SD is the standard deviation of returns of the risky asset category. The last additive term in equation (39) accounts for the rebalancing bonus (see §2.6).

In accordance with modern portfolio theory, the log normally distributed standard deviation $\sigma$ for each mixed portfolio 901-910 is computed in accordance with the following formula:

$$\sigma = \alpha \times SD \quad (40)$$

where SD is the standard deviation of returns of the risky asset category.

The computed values for $\mu_g$, $\mu_a$, and $\sigma$ are then plugged into equations (35)-(38) to generate widely distributed percentile samples of the expected cumulative expansion distribution of each mixed portfolio 901-910. Each of these sampled values is then divided by the expected cumulative expansion of the baseline portfolio 999. In this manner, the system 100 directly estimates a probability distribution of cumulative expansion results for a mixed portfolio 901-910 without performing tens of thousands of Monte Carlo simulations.

As with FIG. 7, in FIG. 8 the system 100 fits a curve 940 to the symbols 930 representing the simulated fifty-percentile cumulative expansion results, in order to illustrate the ratio between the median simulated cumulative expansion of a mixed portfolio 901-910 and the cumulative expansion from a baseline, comparatively risk-free portfolio 999 as a function of the percentage asset allocation. The symbols 931-935 and 925-929 positioned above and below the fifty-percentile symbols 930 illustrate how the dispersion of projected results increases with increasing asset allocation. The symbols 925-929 positioned below the fifty-percentile symbols particularly illustrate both the probability and the magnitude of the risk associated with each asset allocation amount.

7.2 Application of Sampling Distribution Theory to Estimate the Probability Distribution of Average Withdrawal Amounts from a Portfolio, where Withdrawals are a Function of the Portfolio's Performance.

Sampling distribution theory can also be applied to the more complex problem of estimating the probability distribution of the life-weighted average of a sequence of consecutive withdrawals from a mixed portfolio that is gradually and formulaically depleted by such withdrawals over a span of n years.

The size of the mixed portfolio at time t that is gradually depleted by a sequence of withdrawals can be characterized by the following formula:

$$P(t) = P(0) \times (1 - F(0)) \times (1 + r_0) \times \ldots \times (1 - F(t-1)) \times (1 + r_{t-1}) = \prod_{j=0}^{t-1} P(j) \times (1 - F(j)) \times (1 + r_j) \quad (41)$$

where P(t) is the size of the mixed portfolio at time t, F(t) is the fraction or percentage of the mixed portfolio withdrawn at time t, and $r_t$ is the log normally distributed yield on the mixed portfolio at time interval t.

Assume that the well-known amortization formula (see equation (1)), at a "working" interest rate of $\omega$, is used to determine the fraction F(t) of the mixed portfolio withdrawn in year t:

$$F(t) = \frac{\omega \times (1 + \omega)^{(n-t)}}{(1 + \omega) \times ((1 + \omega)^{(n-t)} - 1)} \quad (42)$$

Equations (41) and (42) express the size of a mixed portfolio P(t) in year t and the fraction F(t) withdrawn from that mixed portfolio in year t. The amount withdrawn W(t) from the mixed portfolio in year t is simply:

$$W(t) = P(t) \times F(t) \quad (43)$$

The life-weighted average amount withdrawn from the mixed portfolio, over the targeted life of the portfolio, can be expressed by the following formula:

$$\overline{W} = \frac{1}{\sum L(t)} \times \sum_{t=0}^{n-1} P(t) \times F(t) \times L(t) \quad (44)$$

where P(t) is the size of the mixed portfolio, F(t) is the fraction withdrawn from the mixed portfolio, and L(t) is the probability of the user or his or her spouse, if any, being alive to benefit from the withdrawal, at year t.

We know that returns $r_t$ from the mixed portfolio are log normally distributed. We want to find the distribution of $\overline{W}$. To tackle this problem, we begin by plugging equation (42) into equation (41) and simplifying. The component 1−F(j) of equation (41) simplifies to:

$$1 - F(j) = \frac{(1 + \omega)^{(n-j-1)}}{(1 + \omega)^{(n-j)} - 1} \quad (45)$$

Plugging equation (45) into equation (41) yields the following relationship:

$$P(t) = P(0) \times \frac{(1 + \omega)^{n-1} - 1}{(1 + \omega)^n - 1} \times (1 + r_0) \times \frac{(1 + \omega)^{n-2} - 1}{(1 + \omega)^{n-1} - 1} \times \quad (46)$$
$$(1 + r_1) \times \ldots \times \frac{(1 + \omega)^{n-(t-1)-1} - 1}{(1 + \omega)^{n-t} - 1} \times (1 + r_{t-1})$$

After cancelling out common terms in the numerators and denominators, equation (46) reduces to:

$$P(t) = P(0) \times \frac{(1 + \omega)^{n-t} - 1}{(1 + \omega)^n - 1} \times \prod_{j=0}^{t-1} (1 + r_j) \quad (47)$$

Now, we can plug equations (42) and (47) into equation (44):

$$\overline{W} = \frac{1}{\sum L(t)} \times \sum_{t=0}^{n-1} P(0) \times \frac{(1 + \omega)^{n-t} - 1}{(1 + \omega)^n - 1} \times \quad (48)$$
$$\prod_{j=0}^{t-1} (1 + r_j) \times \frac{\omega \times (1 + \omega)^{n-t-1}}{(1 + \omega)^{n-t} - 1} \times L(t)$$

After cancelling out common terms in the numerators and denominators, and after substituting some of the remaining terms with F(0), equation (48) reduces to:

$$\overline{W} = \frac{F(0) \times P(0)}{\sum L(t)} \times \sum_{t=0}^{n-1} \frac{L(t)}{(1 + \omega)^t} \times \prod_{j=0}^{t-1} (1 + r_j) \quad (49)$$

Because random variable $r_j$ is log normally distributed, we know that there exists a normally distributed random variable $X_j$, such that $1+r_j$ equals $e^{X_j}$. We also know that there exists a constant k such that 1+w equals $e^k$. Substituting these relations into equation (49), and simplifying, yields the following:

$$\overline{W} = \frac{F(0) \times P(0)}{\sum L(t)} \times \sum_{t=0}^{n-1} L(t) \times e^{-kt} \times \prod_{j=0}^{t-1} e^{X_j} \quad (50)$$

$$= \frac{F(0) \times P(0)}{\sum L(t)} \times \sum_{t=0}^{n-1} L(t) \times e^{-kt + \sum X_j}$$

Now we have a formula to which we can apply sampling distribution theory in order to directly estimate the distribution of life-weighted average withdrawal amounts. Given that $r_j$ is log normally distributed with mean $\mu_a$ and variance $\sigma^2$, we can use equations (13) and (14) to find the mean $\mu'$ and variance $\sigma'^2$ of normally distributed variable $X_j$.

The next step is to find the distribution of $-kt+\Sigma X_j$ knowing the distribution of $X_j$. According to authors Robert V. Hogg and Elliot A. Tanis of *Probability and Statistical Inference* (4th ed. 1993), it is an established theorem of sampling distribution theory that if $X_1, X_2, \ldots X_n$ are mutually independent normal variables with means $\mu_1, \mu_2, \ldots, \mu_n$ and variances $\sigma_1, \sigma_2, \ldots, \sigma_n$, respectively, then the linear function $Y = \Sigma_{i=1}^n c_i X_i$ has the normal distribution $N(\Sigma_{i=1}^n c_i \mu_i, \Sigma_{i=1}^n c_i^2 \sigma_i^2)$. Therefore, we know that the exponential component $-kt+\Sigma X_j$ will have the normal distribution $N(-t(k+\mu'), t^2\sigma'^2)$.

After determining the distribution of exponential component $-kt+\Sigma X_j$, the next step is to find the mean and variance of the log normally distributed term $e^{\wedge}(-kt+\Sigma X_j)$. We can rearrange equations (13) and (14) for that purpose.

After determining the distribution of the log normally distributed term $e^{\wedge}(-k+\Sigma X_j)$, the next step is to find the distribution of the weighted sum of those terms for values of t ranging from 0 to n−1. Unfortunately, it is reported that there is no closed-form solution to find the probability distribution of the sum of log normal random variables. However, as long as the log normally distributed term $e^{\wedge}(-kt+\Sigma X_j)$ approximates the shape of a normal distribution, we can use the sampling distribution theorem discussed two paragraphs above, applicable to the sum of normal random variables, to find approximate values for the mean and variance of $\overline{W}$. The system 100 performs these calculations numerically in a series of steps using a spreadsheet. Alternatively, the system 100 uses more sophisticated techniques, such as those discussed in Jingxian Wu et al.'s "A Flexible Log normal Sum Approximation Method" article, published in the November 2005 issue of *Mitsubishi Electric Research Laboratories* journal, which is herein incorporated by reference, to approximate the probability distribution of the sum of log normal random variables.

7.3 Calculating the Average Life of a Portfolio Dollar

Applicant has discovered, by comparing plots, that the distribution of W for a mixed portfolio, divided by the sustainable amortized withdrawal amount from a baseline, approximately risk-free portfolio, is approximately equal to the distribution of cumulative expansion results, divided by the expected cumulative expansion of the baseline portfolio, for an "untouched" reference portfolio that has slightly more than half the duration of the gradually-depleted mixed portfolio. It also so happens that the average "lifetime" of a dollar in the gradually-depleted mixed portfolio is slightly more than half of the duration of the "untouched" reference portfolio. On the basis of the foregoing, we can approximate the distribution of $\overline{W}$ for a mixed portfolio by using the direct estimation method discussed in §7.1 for an "untouched" reference portfolio having a duration that is equal to the average lifetime of a dollar in the mixed portfolio.

The average lifetime of a dollar in a portfolio is equal to the multiplicative inverse of the sum of all contributions made to the portfolio times the integral of the portfolio size over the targeted life of the portfolio. A software source code routine that performs these calculations is set forth in the DrawSafeStats subroutine of the Appendix to provisional application No. 61/093,432.

Notably, the 27-year time-frame over which FIG. 8's cumulative expansion results are plotted is the average lifetime of a dollar in a baseline portfolio whose initial size, contributions, and risk-free-rate-of-return inputs are illustrated in FIG. 6a. The cumulative expansion results in FIG. 8 are far more dispersed than the simulated withdrawal amounts illustrated in FIG. 7. This is due in part to the fact that the simulation done for FIG. 7 is an exploratory one in which risky asset returns are not entirely independent of one another, but rather exhibit mean-reverting behavior. The differences may also be exaggerated by approximation errors in §7.2 regarding the sum of log normal random variables. Nevertheless, the excessive dispersion of cumulative expansion results in FIG. 8 illustrates the fallacy in assuming that risky asset returns are entirely independent of past results.

8. Comparing Portfolios on an Efficient Frontier

In accordance with modern portfolio theory, it is common to plot different asset combinations in risk-reward space. Typically, reward is represented by the expected or simulated return of the portfolio, while risk is represented by the expected or simulated variance or standard deviation of the portfolio's returns. Moreover, the line along the upper edge of the collection of all possible portfolios in such a risk-reward space is often referred to as the "mean-variance efficient frontier."

The mean-variance efficient frontier is sometimes characterized as the intersection of the set of minimum variance portfolios with the set of maximum return portfolios. The return of any given portfolio on the mean-variance efficient frontier is greater than or equal to the return of any other portfolio on the plot having an equal or lesser variance. Likewise, the variance of any given portfolio on the mean-variance efficient frontier is less than or equal to the variance of any other portfolio on the plot having an equal or greater return.

The system 100 provides several modified versions of an efficient frontier plot, which improve upon prior art mean-variance efficient frontier plots, to compare different portfolios. The system 100's modified efficient frontier plots (1) characterize mixed portfolios with a more practical "reward" parameter than the expected or simulated compounded annual return; (2) profile the relative simulated "rewards" of each mixed portfolio in comparison to the expected reward of a baseline, minimum-risk portfolio; and (3) characterize the portfolio risk with parameters other than, yet derived from, the expected standard deviation or variance of returns.

FIGS. 9-15 illustrate several different mixed portfolios 1001-1010 or 1301-1303 plotted on modified efficient frontier plots 1000, 1100, 1200, 1300, 1400, 1500, and 1600. Each of the mixed portfolios is modeled as being fully invested in, and allocated and rebalanced between, a first category of approximately risk-free assets and a second category of comparatively higher-risk assets, wherein a selected initial asset allocation portion is allocated to the second asset category. The mixed portfolios 1001-1010, in particular, differ from each other only in the percentage of assets initially allocated to the second category, which range from 10% to 100%, in 10% increments.

To generate the data for each mixed portfolio represented on an efficient frontier plot, the system 100 utilizes a parameter input list 117 (FIGS. 1, 9) for which a user enters the risk free rate, risky asset risk premium, standard deviation, and percentage asset allocation of each mixed portfolio to be comparatively plotted. The user may also be asked to input one or more parameters that affect how the simulated retirement budgets are constrained as a function of the sustainable or hypothetically sustainable amortized retirement budget (see generally §§2.1 & 2.5). The remaining user input data 110 is assumed to be the same for all of the mixed portfolios to be compared.

The mixed portfolios 1001-1010 illustrated in FIGS. 9-11 and 13-14 were modeled using a real risk-free rate for the first category of 2%, a geometric expected risk premium, for the second category, of 1%, and a standard deviation of second category returns of 19%. Each portfolio was also modeled as being gradually depleted by a series of consecutive withdrawals needed to support 100% of the hypothetical amortized retirement budget 184 (see §2.5) that the mixed portfolio would sustain assuming it met its rebalanced return expectations.

Figure 9:
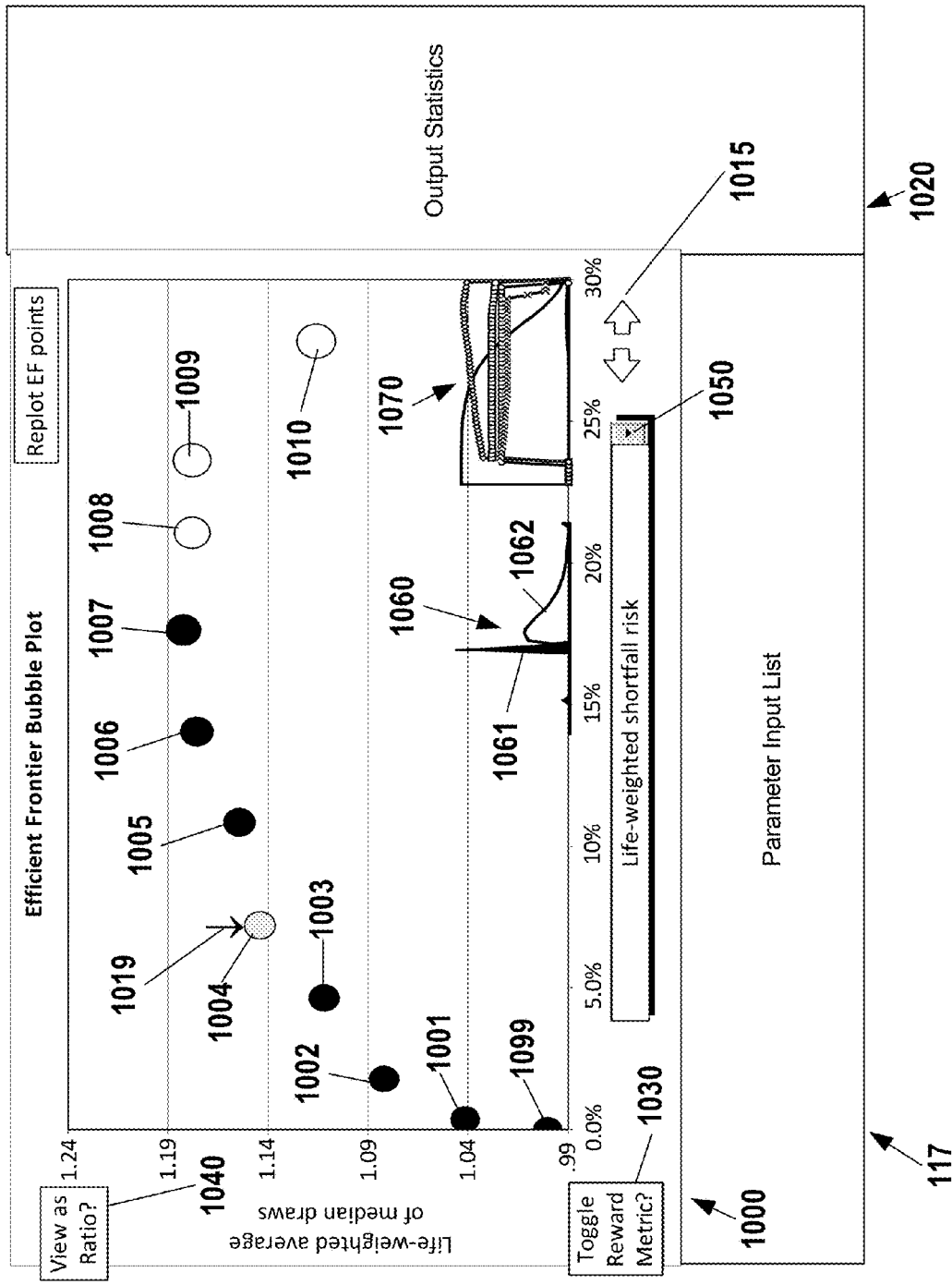

After processing the data inputs for each mixed portfolio, the system 100 runs hundreds or thousands of simulations for each of the mixed portfolios. Once those simulations are completed, the system 100 generates summary statistics representative of the simulated risk and reward of each mixed portfolio. Selected representations of risk and reward for each portfolio are then used to determine the x- and y-coordinates of each portfolio on a modified efficient frontier plot. FIG. 9 illustrates buttons 1030 and 1040 that enable a user to select the type of reward to represent the y-axis, and a drop-down selection box 1050 that enables a user to select the type of risk to represent the x-axis.

As this specification has noted previously, there are many different measures of, and ways to represent, the simulated performance or "reward" of a mixed portfolio. In general, the "reward" is a central tendency statistic of a simulated distribution of selected multi-period results of the mixed portfolio. One measure of "reward" is the median of the simulated distribution of cumulative returns of the mixed portfolio over multiple time periods. Other measures of reward are the sum or average of the median ranked series of the retirement budgets supported by, or the withdrawal amounts from, the mixed portfolio.

Likewise, there are many different measures of, and ways to represent, the risk of a mixed portfolio. One preferred measure of risk is the shortfall risk. Another is the simulated percentage of long-term results that underperform a threshold performance level. One favored threshold performance level is the simulated multi-period performance result of the baseline portfolio. Another favored threshold performance level is meeting one or more targeted retirement budget constraints for all of a selected consecutive number of withdrawal periods.

Both the risk and reward measures are preferably life-weighted, that is, weighted by an estimated probability of at least one of one or more persons being alive to enjoy the reward or suffer the risk.

Each mixed portfolio is characterized by at least one symbol—preferably a bubble—on the scatter plot, a Cartesian-coordinate diagram with an x-coordinate dimension and a y-coordinate dimension. In each of plots 1000, 1100, 1200, 1300, 1400, 1500, and 1600, the y-coordinate represents a selected type of reward simulated from the portfolio. Also, the area or diameter of each bubble is a function of a second selected type of reward. The x-coordinate of the bubble represents a selected type of simulated risk of the portfolio.

Figure 11:
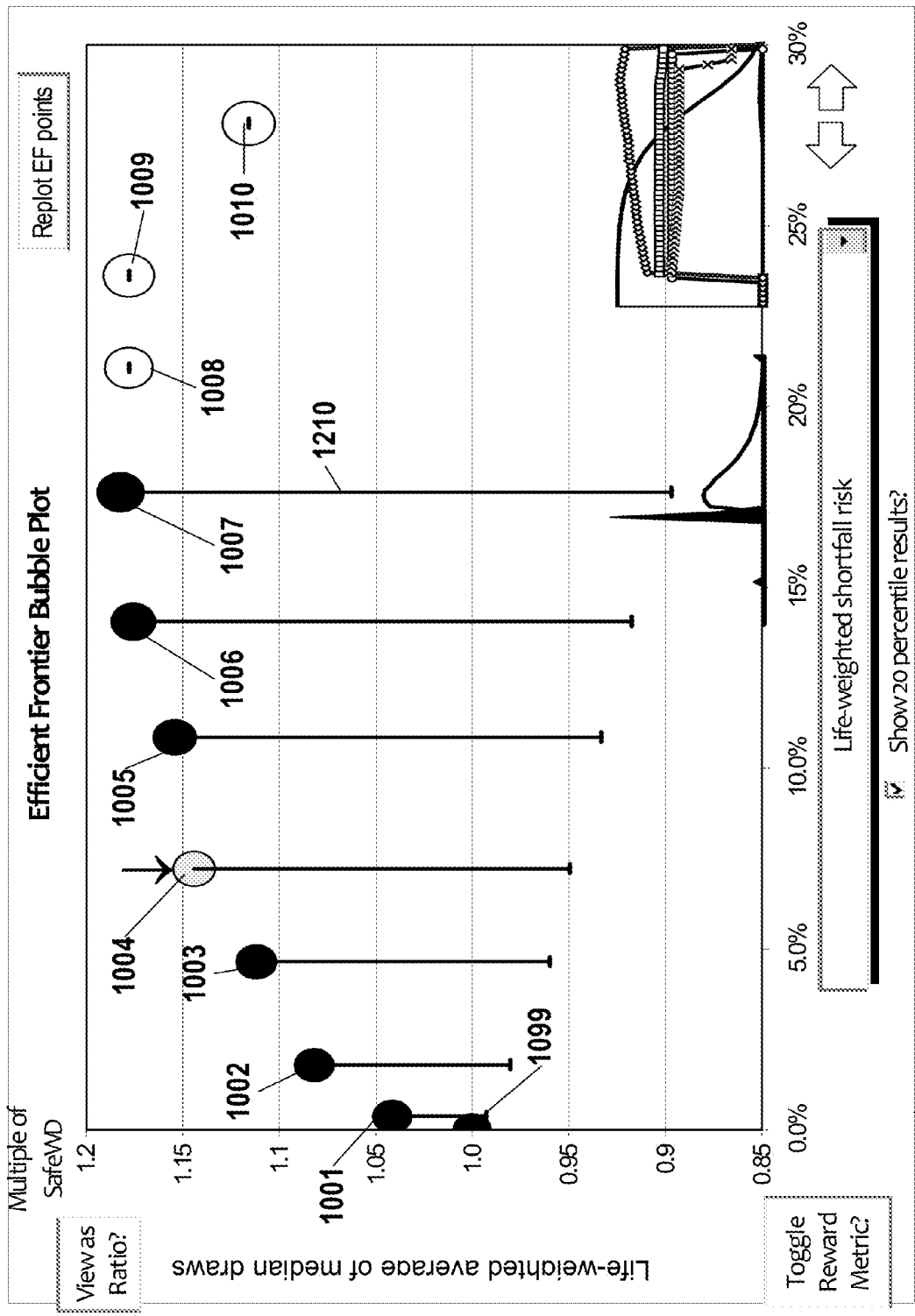
Figure 12:
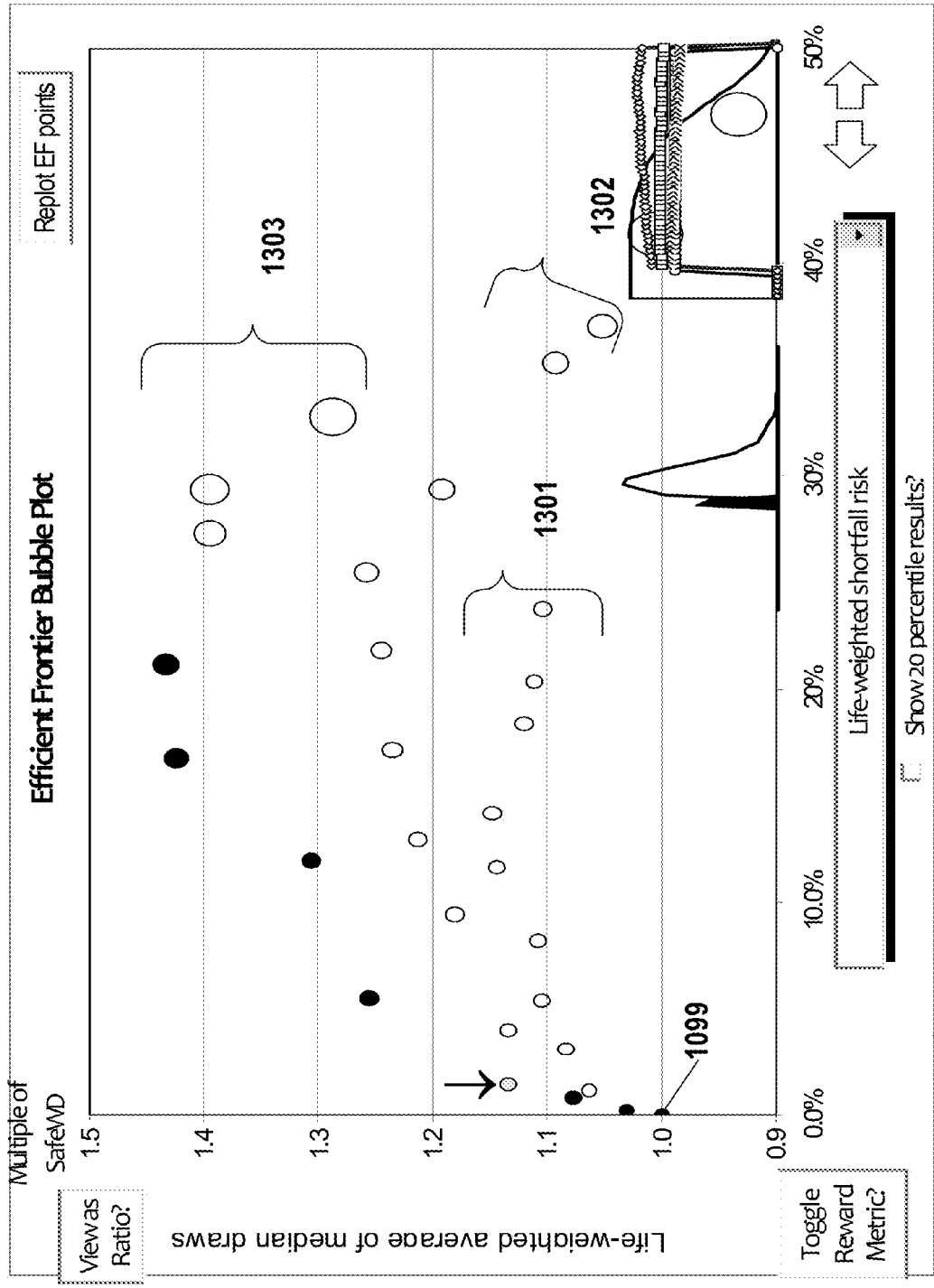
Figure 13:
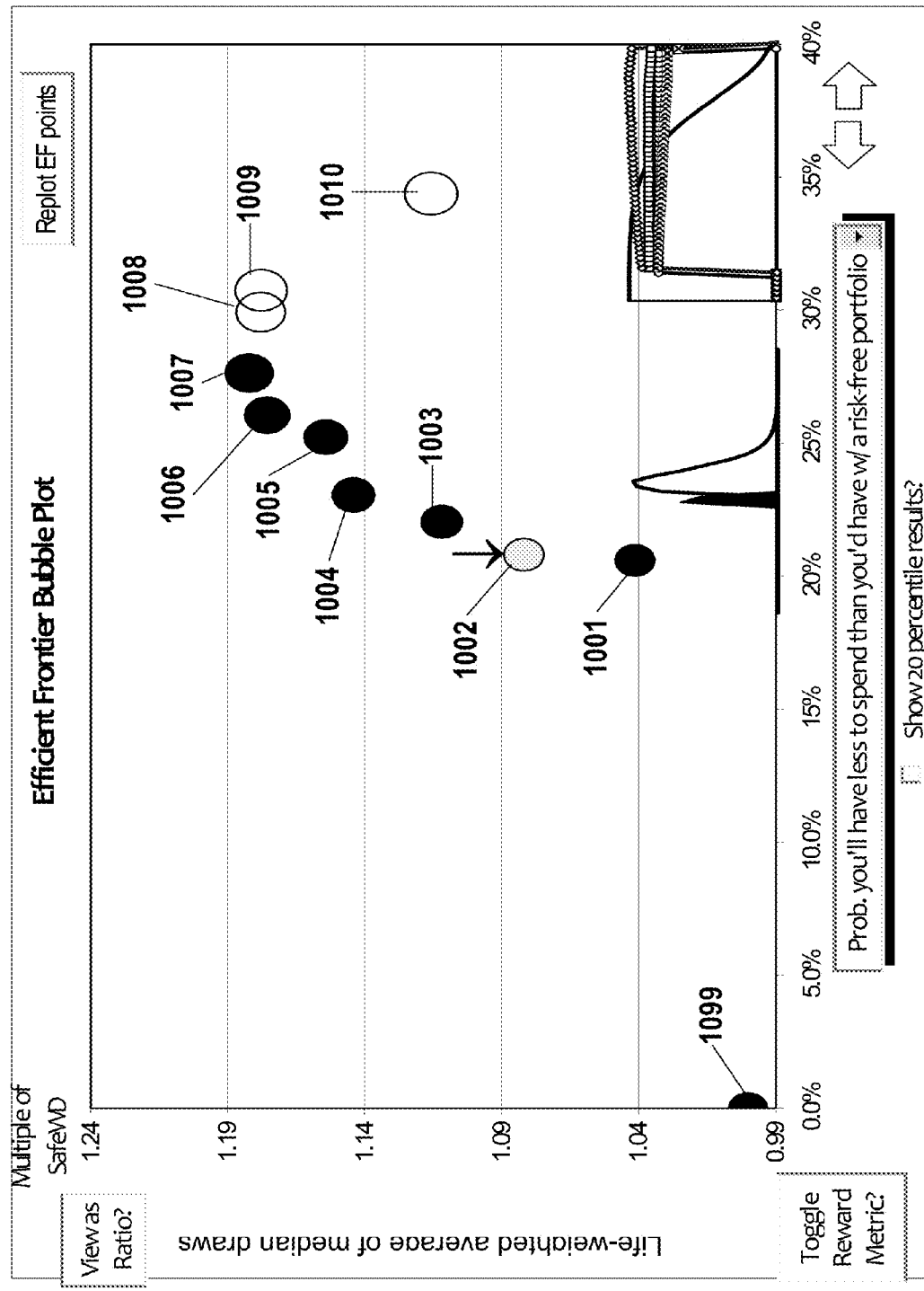

FIGS. 9-15 illustrate two types of risk with which to represent the mixed portfolios in the risk-reward space of the modified efficient frontier plots. In FIGS. 9-12 and 15-16, the risk selected to represent the x-coordinate of each mixed portfolio is the life-weighted shortfall risk. In FIG. 13, the risk selected to represent the x-coordinate of each mixed portfolio is the simulated percentage of life-weighted average retirement budgets, given the user's retirement budget constraints and risky asset category return and volatility expectations, that end up less than the sustainable retirement budget supported by the amortized baseline portfolio.

Figure 10:
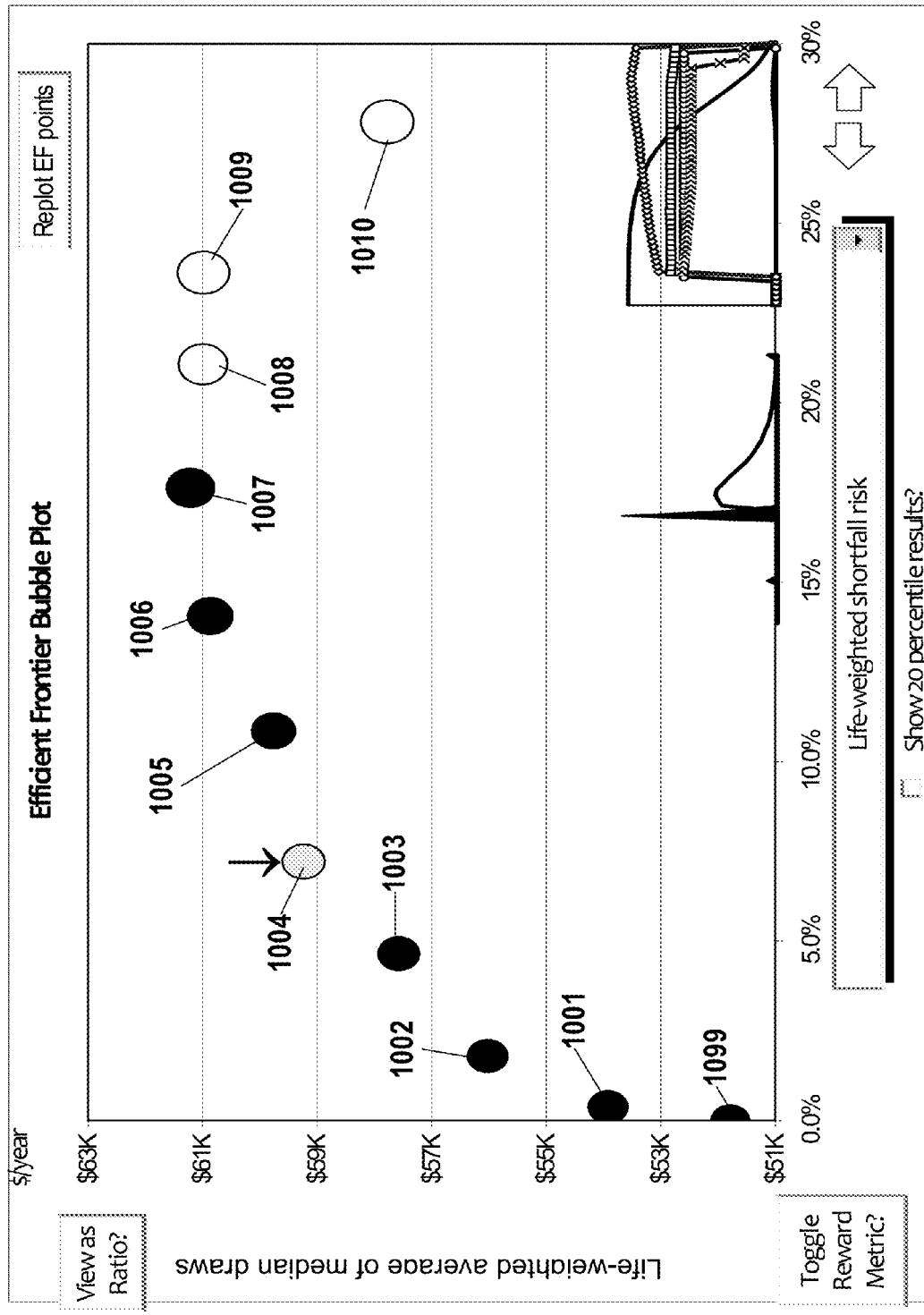
Figure 14:
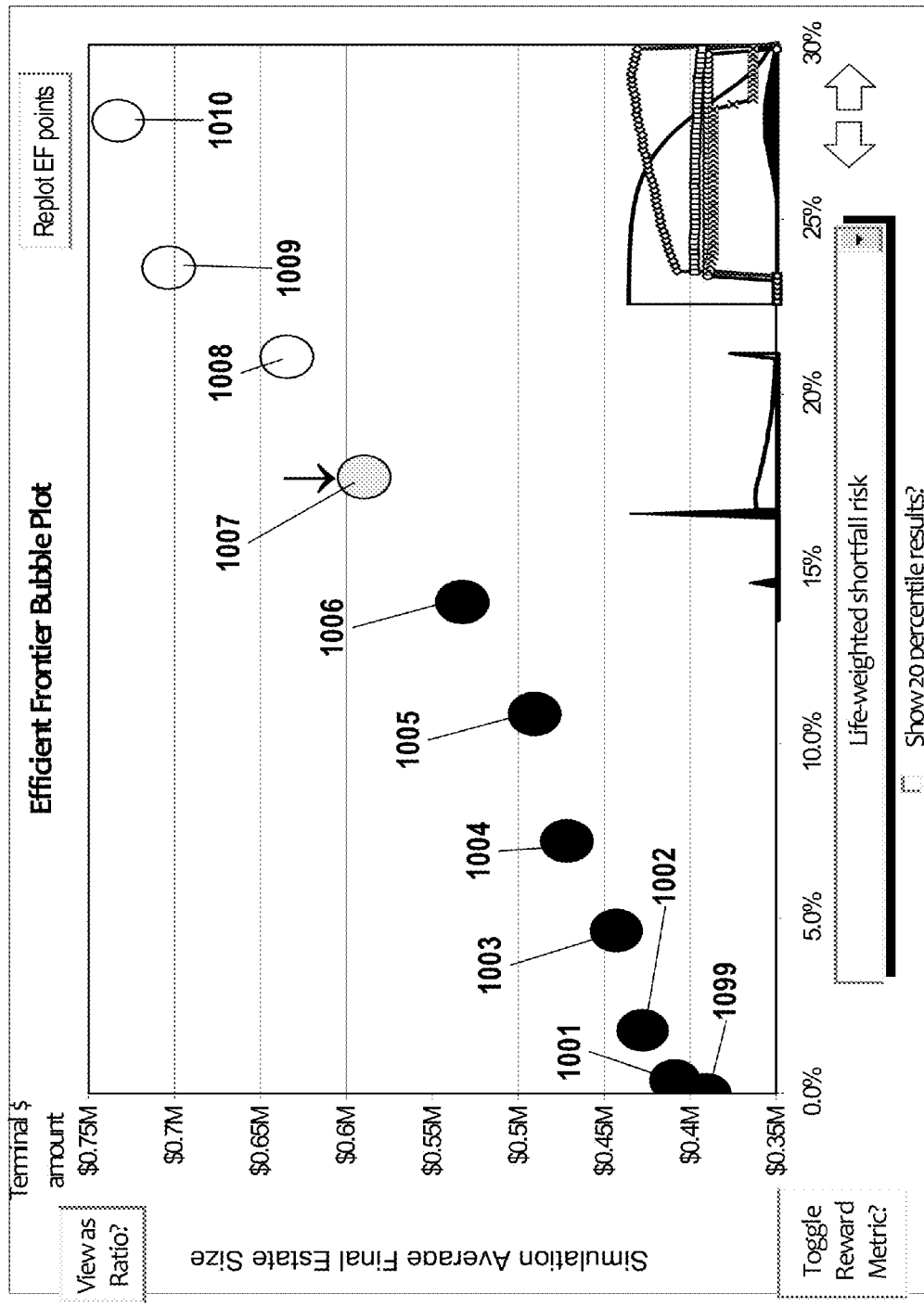

FIGS. 9-15 illustrate four types of reward with which to represent the mixed portfolios in the risk-reward space of the modified efficient frontier plots. In FIG. 10, the reward selected to represent the y-coordinate of the bubble is the life-weighted average, in dollars, of the 50-percentile (median) simulated series of retirement budgets supported by the mixed portfolio. In FIGS. 9 and 11-13, the reward selected to represent the y-coordinate of the bubble is the ratio of the simulated average or median retirement budgets supported by the mixed portfolio over the estimated sustainable retirement budget supported by a baseline, minimum-risk portfolio. In FIG. 14, the reward selected to represent the y-coordinate of each bubble is the simulated terminal estate size, in dollars, of the mixed portfolio. In FIG. 15, the reward selected to represent the y-coordinate of each bubble is the ratio of the simulated terminal estate size of the mixed portfolio over the expected terminal estate size from the baseline portfolio.

Each of the efficient frontier plots 1000, 1100, 1200, 1300, 1400, 1500, and 1600 also includes a bubble 1099 representing the corresponding reward characteristic of the baseline, minimum-risk portfolio. The baseline portfolio has an expected volatility parameter that is less than or equal to the expected volatility parameter of all the mixed portfolios on the plot. The baseline portfolio also has an expected return parameter that is greater than or equal to the expected return parameters of all the mixed portfolios on the plot, if any, having the same volatility parameter. By displaying bubble 1099 on the plot, the relative simulated "rewards" of every mixed portfolio are profiled in comparison to the expected reward of a baseline, minimum-risk portfolio. Moreover, in plots 1000, 1200, 1300, 1400, and 1600, the relative simulated "reward" of each mixed portfolio is explicitly characterized in terms of a ratio over the expected multi-period performance result of the baseline, minimum-risk portfolio.

FIGS. 9-15 illustrate additional indicia indicative of the risk and reward associated with each mixed portfolio. In FIGS. 9-13, the area of each bubble is a function of the relative simulated terminal size of the estate, based upon the simulation results and the users' actuarial inputs. In FIGS. 14 and 15, the area of each bubble is a function of the relative average simulated retirement budget. In FIG. 11, each mixed portfolio is also characterized by a negative error bar 1210 that illustrates the 20-percentile result, also in terms of a ratio over the estimated sustainable retirement budget supported by the baseline portfolio.

Additional features of the modified efficient frontier plots of FIGS. 9-15 further assist investors in the comparative evaluation of different portfolios. In each of the modified efficient frontier plots, the portfolios lying on the modified "efficient frontier" are represented distinctly (e.g., solid black circles) from the other portfolios (e.g., empty circles) not lying on the modified efficient frontier. Each plot also has a user interface control 1015 (e.g., arrows) that singles out a selected portfolio using a pointer 1019 while also filling the corresponding bubble with a distinct color or shade. Each plot is also accompanied by a table 1020 (FIG. 9) that illustrates statistics corresponding to a selected portfolio. Each plot is also accompanied by a histogram 1060 that illustrates the distribution of retirement budgets generated by multiple simulations of the selected portfolio, and an overlay plot 1070 that comparatively illustrates the five, fifty, and ninety-five percentile simulation series to the series of sustainable retirement budgets supported by a risk-free portfolio, overlaid by a life expectancy curve for the users.

One especially useful application of the modified efficient frontier of FIGS. 9-15 is to a set of mixed portfolios that have previously been located on the mean-variance efficient frontier. A mean-variance optimizer either separate from or incorporated into the system 100 can be used to identify efficient mixes of risky assets that lie on the mean-variance efficient frontier. The overall mean return and standard deviation for each of the frontier mixes is then input into the parameter input list 117, and blended, at several different percentage allocations, with a relatively risk-free asset or asset category. The system 100 then tests each blend of mean-variance frontier mixes and plots the results on the modified efficient frontier.

FIG. 12 illustrates three different sets 1301-1303 of mixed portfolios on the modified efficient frontier plot 1300. Each set 1301-1303 comprises ten mixed portfolios with asset allocations of between 10 and 100%, in 10% increments, in a risky asset category. The risky asset category of each set 1301-1303 has a different expected return distribution. The risky asset category of set 1301 is characterized by 2% risk premium and 15% standard deviation. The risky asset category of set 1302 is characterized by 5% risk premium and 30% standard deviation. The risky asset category of set 1301 is characterized by 9% risk premium and 45% standard deviation.

In summary, it is believed that representations of risk and reward for mixed portfolios illustrated in the efficient frontier plots of FIGS. 9-15, and their visible relationship to the risk and reward of a baseline, minimum-risk portfolio, better assist current and future retirees in deciding whether, and how much, to invest in highly volatile assets such as equities.

9. Taxes

Another embodiment of the financial planner and simulation system 100) targets, constrains, and/or models an after-tax retirement budget; models a tax-efficient plan of deferred-to-Roth IRA rollovers; models a tax-bracket maximization strategy; and models a tax-efficient series of withdrawals. The modified system asks for additional user inputs, including anticipated inflation, a tax bracket goal, expected pre-retirement income, and tax rate information. The user specifies where existing and future savings would be and would go: in tax-deferred, tax-free, or regularly taxable accounts. The taxable account is further subdivided into bonds and equities, along with an equity basis. The modified system also distinguishes between the tax-deferred accounts of two spouses, in order to take required minimum distributions into account. Pseudo-code for the tax portion of an algorithm for tax-sensitive embodiment of the system 100 is set forth in Appendix A of provisional application No. 61/233,476.

10. Reports

Yet another embodiment of the financial planner and simulation system 100 generates professional reports based upon both the user's inputs and the system's simulation outputs. Illustrations of two reports are set forth in Appendices C, E, and G of provisional application No. 61/233,413. Each report includes a cover page, a contents section, a disclosure section, an inputs section, a modeling assumptions section, and an outputs section. The outputs section is further subdivided into a text-based "Analysis" section, a simulation "Chart" section, a "Table" section; and an "Asset Allocation: Big Picture" section.

The simulation "Chart" section shows the series of retirement budgets supported by, and corresponding portfolio size, of differently ranked simulation trials, like those shown in FIGS. 6k and 6l. The "Table" section shows the average simulated retirement budget and final estate size for differently ranked simulation trials. The "Asset Allocation: Big Picture" includes a chart like that shown in FIG. 7 and another chart showing the success rate as a function of asset allocation.

Each report is generated by a computer-executed report module that conditionally populates the report based on the inputs that went into a simulation. One embodiment of such a report module is illustrated in Appendices E and F to provisional application No. 61/233,476.

11. Calculating the Probability of One Survivor Living to a Given Year

Through much of this application, we have discussed taking the "life weighted average" of various statistical series. Many of the equations presented in this application include the factor L(t), which represents the probability that either an investor, or his or her spouse, if any, would survive to year t. In this section, we explain how we calculate L(t) for each year t.

To calculate the probability of one survivor living to a given year, we start with a period life table. The Social Security Administration publishes a period life table that provides the probability that a male or female of a given age, of between 0 and 119 years old, will die within one year. The probability L(t) that an investor, or his or her spouse, would survive to year t is given by the following formula:

$$L(t) = 1 - \left(1 - \prod_{j=m}^{m+t} (1 - d_m(j))\right) \times \left(1 - \prod_{j=f}^{f+t} (1 - d_f(j))\right) \quad (51)$$

where the current ages of the husband and wife are m and f, respectively, $d_m(j)$ is the probability of the husband, at age j, of dying within one year, and $d_f(j)$ is the probability of the wife, at age j, of dying within one year.

11. Conclusion

When the specification or claims use the word "calculate" or "compute," it refers to a problem solved by a machine, such as a computer, calculator, or a software routine or program of instructions running on a computer processor, circuit, or other computer-readable medium. The invention encompasses systems 100 that run on different hardware architectures, including a multi-processor computer and a server-client architecture. For example, in embodiment, the system 100 comprises a user's home computer, a spreadsheet application, and a spreadsheet with macro code embodying much the system 100. In another example, the system 100 comprises a computer based in the United States that is used to receive user inputs, graph system 100 outputs, and/or publish reports, but all or most of the calculations are performed on one or more remote computers, which may or may not be located in the United States. Other, especially fast embodiments, would utilize a multi-processor computer operable to run multiple trials of the simulation in parallel.

The system 100 has been described as modeling mixed portfolios using inputs that reflect the annual expected returns and standard deviations of at least two asset categories. The system 100 has also been described as modeling withdrawals on an annual basis. But the invention can easily be extended—albeit perhaps at the cost of performing various computations more frequently—to systems that model returns and withdrawals using daily, weekly, monthly, quarterly, or other intervals. Therefore the invention is not limited, unless and to the extent expressly so limited in the claims, to "annual" return inputs or "annual" withdrawals.

The system 100 has also been described using real, inflation adjusted return rates for the relatively risk-free and risky asset classes. The system 100 can be easily adapted to accept nominal return rates and an estimated inflation rate. Therefore the invention is not limited, unless and to the extent expressly so limited in the claims, to "real" return inputs.

Advanced embodiments of the system 100 also include various goal-seek capabilities that iteratively test different asset allocation strategies, savings strategies (including working longer and/or delaying retirement), and/or spending strategies to find one or more strategies, one of which may be optimal, that meets one's stipulated goals.

The foregoing description describes various ways of characterizing the simulated portfolio results of a mixed portfolio in relation to the corresponding portfolio result expected from a baseline, minimum-risk portfolio. One such way is to display the baseline portfolio result on the same plot as the mixed portfolio result. Another way is to characterize the mixed portfolio result as a ratio over the expected baseline portfolio result. Yet another way is to characterize the simulated mixed portfolio result as a percentage of or above or below the expected baseline portfolio result. And yet another way is to characterize the simulated mixed portfolio result as an amount above or below the expected baseline portfolio result.

It will also be understood that there are other ways of characterizing the volatility or variability besides variance or standard deviation. Therefore the invention is not limited, unless and to the extent expressly so limited in the claims, to characterizations of volatility or variability in terms of variance or standard deviation.

Although the foregoing specific details describe various embodiments of this invention, persons reasonably skilled in the art will recognize that various changes may be made in the details of the method and apparatus of this invention without departing from the spirit and scope of the invention as defined in the appended claims. Therefore, it should be understood that, unless otherwise specified, this invention is not to be limited to the specific details shown and described herein.

I claim:

1. A computer-assisted method for evaluating the risks and rewards, over a plurality of consecutive time intervals, of a mixed portfolio in relation to a comparatively low risk baseline portfolio, the method comprising:
   employing a computer including a processor and a graphical user interface to spatially arrange a user's inputs on a computer screen and visually display a user's inputs and at least one graphical output;
   modeling the baseline portfolio as being entirely allocated to low-risk assets;
   modeling the mixed portfolio as having assets that are subdivided between the low-risk assets and comparatively more volatile assets;
   modeling retirement budgets drawn from the mixed portfolio with computer-performed computations that constrain the size of each interval's retirement budget as a function of a remaining balance of the mixed portfolio;
   receiving at least one simulated portfolio performance outcome, generated by computer-performed computations that are a function of the modeled retirement budgets drawn from the mixed portfolio;
   receiving a baseline portfolio performance outcome that is a function of computer-performed computations of a baseline retirement budget drawn from the baseline portfolio, to compare with the simulated portfolio performance outcome; and
   publishing, on the graphical user interface, both the simulated portfolio performance outcome and the baseline portfolio performance outcome in proximity to each other to facilitate comparative visualization of the performance outcomes;
   wherein the method is performed through at least one of the following hardware arrangements:
   (a) the computer that visually displays the user's inputs and publishes the portfolio performance outcomes also performs at least some of said computer-performed computations; and
   (b) the computer that visually displays the user's inputs and portfolio performance outcomes is connected to a network and receives, via the network connection, the portfolio performance outcomes from other network-connected computers that perform at least some of said computer-performed computations.

2. The computer-assisted method of claim 1, further comprising the step of publishing both the simulated portfolio performance outcome and the baseline portfolio performance outcome on a common computer plot.

3. The computer-assisted method of claim 1, wherein the function of modeling the mixed portfolio comprises performing multiple simulation trials of the mixed portfolio, wherein each trial simulates a gain or loss to the mixed portfolio over each of the consecutive time intervals, and wherein the simulated portfolio performance outcome received for the mixed portfolio is an average of the retirement budgets modeled in the simulation trials of the mixed portfolio.

4. The computer-assisted method of claim 3, wherein the average is an actuarially-weighted average that is a function of the ages of one or more persons expected to expend the retirement budgets.

5. The computer-assisted method of claim 1, wherein the function of modeling the mixed portfolio comprises performing a set of simulation trials of the mixed portfolio, wherein each trial simulates a gain or loss to the mixed portfolio over each of the consecutive time intervals, and wherein the computer-assisted method further comprises the steps of:
   selecting, from the set of simulation trials of the mixed portfolio, a sample of low-percentile, median, and high-percentile trials, each trial being ranked according to a central tendency statistic of the retirement budgets modeled in the trial;
   receiving a computer-generated computation of a retirement budget that the baseline portfolio is expected to be capable of supporting over the plurality of consecutive time intervals; and
   plotting, on a common computer-generated plot, the sample of low-percentile, median, and high-percentile trials of the mixed portfolio, in relation to the sustainable retirement budget expected from the baseline portfolio.

6. The computer-assisted method of claim 1, further comprising the computer-assisted steps of:
   generating, for each of multiple simulation trials, a series of retirement budgets supported by the mixed portfolio; and
   ranking each series of retirement budgets on the basis of an actuarially-weighted average value of the series of retirement budgets;

wherein the actuarially-weighted average value is a function of the ages of one or more persons expected to expend the retirement budgets.

7. The computer-assisted method of claim 1, further comprising the computer-assisted steps of:
   receiving one or more expected annualized return or return premium user inputs for the volatile assets;
   modeling the volatile assets as one or more return distributions each centered about an expected arithmetic return value; and
   computing one or more estimated variance drag correction values to convert the return or return premium user inputs into one or more corresponding arithmetic return values.

8. The computer-assisted method of claim 1, further comprising the computer-assisted steps of:
   receiving one or more expected annualized return or return premium user inputs for the volatile assets; and
   for at least one of the one or more expected annualized return or return premium user inputs, scaling a series of historical returns to yield the expected annualized return or return premium specified by the user input, thereby producing a mean-scaled but otherwise historical return data set; and
   modeling at least a corresponding portion of the volatile assets through exploratory simulation of the mean-scaled but otherwise historical return data set.

9. The computer-assisted method of claim 1, further comprising the computer-assisted step of processing user inputs defining at least one of the following:
   a) a number of years before initiation of the series of retirement budgets;
   b) pre-retirement contributions to be added before commencement of the series of retirement budgets;
   c) marital status; and
   d) the manner in which at least a portion of portfolio earnings are taxed.

10. The computer-assisted method of claim 1, wherein the low-risk assets consist essentially of inflation-adjusted income instruments.

11. The computer-assisted method of claim 1, further comprising the computer-assisted steps of:
    receiving user inputs defining portfolio duration and specific portfolio inflows and outflows; and
    calculating and displaying, in real time, the baseline portfolio performance outcome in response to changes in the user inputs pertaining to portfolio duration or specific portfolio inflows and outflows.

12. The computer-assisted method of claim 1, wherein a person and his or her spouse, if any, are expected to expend the retirement budgets, the method further comprising the step of displaying a plot of a probability, versus time, of the person and his or her spouse, if any, surviving to some distant point in time.

13. The computer-assisted method of claim 1, further comprising the computer-assisted steps of:
    conducting multiple computer-generated simulation trials of the mixed portfolio, each computer-generated simulation trial simulating a performance of the mixed portfolio over a series of consecutive time intervals;
    for each simulation trial, generating series of retirement budgets corresponding to the consecutive time intervals, wherein each retirement budget is constrained by a function of a remaining balance of the mixed portfolio;
    for each simulation trial, computing an average of the corresponding series of retirement budgets;
    ranking each of the simulation trials by the computed average;
    identifying series of consecutive retirement budgets corresponding to the low-percentile, median, and high-percentile ranked simulation trials; and
    plotting the series of retirement budgets versus time corresponding to the low-percentile, median, and high-percentile ranked simulation trials of the mixed portfolio.

14. The computer-assisted method of claim 13, further comprising the step of plotting at least one ranked series of retirement budgets supported by the mixed portfolio in relation to the sustainable retirement budget supportable by the baseline portfolio.

15. A computer-assisted method for evaluating the risks and rewards, over a plurality of consecutive time intervals, of a comparatively risky portfolio in relation to a comparatively safe baseline portfolio, the method comprising:
    employing a computer including a processor and a graphical user interface to spatially arrange a user's inputs on a computer screen and visually display a user's inputs and at least one graphical output;
    modeling the baseline portfolio as being allocated to comparatively safe assets;
    modeling the comparatively risky portfolio as containing comparatively more volatile assets, wherein the comparatively more volatile assets are more volatile than the comparatively safe assets of the baseline portfolio;
    computer modeling a first retirement budget that is constrained as a function of a remaining balance of the baseline portfolio;
    computer modeling a second retirement budget that is constrained as a function of a remaining balance of the comparatively risky-asset portfolio;
    receiving at least one simulated portfolio performance outcome, generated by computer-performed computations, for the comparatively risky-asset portfolio;
    receiving a baseline portfolio performance outcome, generated by computer-performed computations, to compare with the simulated portfolio performance outcome; and
    publishing, on the graphical user interface, both the simulated portfolio performance outcome and the baseline portfolio performance outcome in proximity to each other to facilitate comparative visualization of the performance outcomes;
    wherein the method is performed through at least one of the following hardware arrangements:
    (a) the computer that visually displays the user's inputs and publishes the portfolio performance outcomes also performs at least some of the computer modeling of the first and second retirement budgets or the computations to generate the portfolio performance outcomes; and
    (b) the computer that visually displays the user's inputs and portfolio performance outcomes is connected to a network and receives, via the network connection, the portfolio performance outcomes from other network-connected computers that perform at least some of the computer modeling of the first and second retirement budgets or the computations to generate the portfolio performance outcomes.

16. The computer-assisted method of claim 15, wherein the baseline portfolio consists essentially only of inflation-adjusted income instruments.

17. The computer-assisted method of claim 15, further comprising the computer-assisted steps of:
- receiving at least one expected annualized return or return premium user input for a corresponding portion of the comparatively risky-asset portfolio; and
- scaling a series of corresponding historical returns to yield the expected annualized return or return premium specified by the user input, thereby producing a mean-scaled but otherwise historical return data set; and
- modeling the corresponding portion of the comparatively risky-asset portfolio through exploratory simulation of the mean-scaled but otherwise historical return data set.

18. The computer-assisted method of claim 15, further comprising the computer-assisted steps of:
- generating multiple computer-generated simulation trials of the comparatively risky-asset portfolio, each computer-generated simulation trial simulating a performance of the comparatively risky-asset portfolio over a series of consecutive time intervals;
- for each simulation trial, generating series of retirement budgets corresponding to the consecutive time intervals, wherein each retirement budget is constrained by a function of a remaining balance of the comparatively risky-asset portfolio;
- computing an average of each series of retirement budgets;
- ranking each of the simulation trials by the computed average;
- identifying series of consecutive retirement budgets corresponding to the low-percentile, median, and high-percentile ranked simulation trials; and
- plotting the series of retirement budgets versus time corresponding to the low-percentile, median, and high-percentile ranked simulation trials of the comparatively risky-asset portfolio.

19. The computer-assisted method of claim 15, further comprising the step of plotting at least one ranked series of retirement budgets supported by the mixed portfolio in relation to the sustainable retirement budget supportable by the baseline portfolio.

20. The computer-assisted method of claim 15, further comprising the computer-assisted steps of:
- receiving user inputs defining specific inflows and outflows to and from the baseline portfolio; and
- calculating and displaying, in real time, the baseline portfolio performance outcome in response to changes in the user inputs pertaining to specific inflows and outflows to and from the baseline portfolio.

* * * * *